US012617610B2

(12) United States Patent
Bates et al.

(10) Patent No.: US 12,617,610 B2
(45) Date of Patent: May 5, 2026

(54) GRID FRAMEWORK STRUCTURE

(71) Applicant: Ocado Innovation Limited, Hatfield (GB)

(72) Inventors: Martyn Bates, Hatfield (GB); Felix Faber, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 597 days.

(21) Appl. No.: 17/908,802

(22) PCT Filed: Mar. 2, 2021

(86) PCT No.: PCT/EP2021/055217
§ 371 (c)(1),
(2) Date: Sep. 1, 2022

(87) PCT Pub. No.: WO2021/175872
PCT Pub. Date: Sep. 10, 2021

(65) Prior Publication Data
US 2023/0339679 A1 Oct. 26, 2023

(30) Foreign Application Priority Data

Mar. 3, 2020 (GB) ..................................... 2003054
May 29, 2020 (GB) ..................................... 2008116

(51) Int. Cl.
*B65G 1/04* (2006.01)
*B65G 1/06* (2006.01)
(52) U.S. Cl.
CPC ............. *B65G 1/0464* (2013.01); *B65G 1/06* (2013.01)
(58) Field of Classification Search
CPC ...... B65G 1/0464; B65G 1/0492; B65G 1/06; B65G 1/065; B65G 57/20; B65G 57/22;
(Continued)

(56) References Cited

U.S. PATENT DOCUMENTS 9,315,322 B1 4/2016 Majed et al.
10,106,321 B2 10/2018 Otto et al.
(Continued)

FOREIGN PATENT DOCUMENTS

BE 566639 A 4/1958
CN 205206232 U 5/2016
(Continued)

OTHER PUBLICATIONS

Office Action (Communication) issued on Jul. 26, 2024, by the European Patent Office in corresponding European Patent Application No. 21 709 936.5. (4 pages).
(Continued)

*Primary Examiner* — Glenn F Myers
(74) *Attorney, Agent, or Firm* — Gregory Matt McCloskey

(57) ABSTRACT

A grid framework structure for supporting a load handling device operative to move one or more containers includes: plural upright columns arranged to form vertical storage locations for containers to be stacked and be guided by the upright columns in a vertical direction. The upright columns are interconnected at their top ends by a first set of grid members extending in a first direction and a second set of grid members extending in a second direction, the second set running transversely to the first set in a substantially horizontal plane to form a grid structure having grid cells. The first and second sets of grid members are sub-divided into plural grid elements such that adjacent grid elements extending in the first direction or the second direction are offset with respect to each other in the horizontal plane by at least one grid cell.

22 Claims, 43 Drawing Sheets

(58) Field of Classification Search
CPC ......... B61B 13/02; E01B 25/02; E01B 25/04;
E01B 25/06; E01B 25/00
USPC ........................................................ 414/266
See application file for complete search history.

(56) References Cited

U.S. PATENT DOCUMENTS

| | | | |
|---|---|---|---|
| 10,421,609 | B2 | 9/2019 | Otto et al. |
| 10,543,983 | B2 | 1/2020 | Otto et al. |
| 10,800,607 | B2 | 10/2020 | Otto et al. |
| 10,815,059 | B2 | 10/2020 | Otto et al. |
| 11,097,896 | B2 | 8/2021 | Otto et al. |
| 11,667,456 | B2 | 6/2023 | Lindbo et al. |
| 11,897,693 | B2 | 2/2024 | Otto et al. |
| 2008/0210529 | A1 | 9/2008 | Hau et al. |
| 2016/0129587 | A1* | 5/2016 | Lindbo .................. B25J 9/0096 |
| | | | 700/218 |
| 2017/0334644 | A1 | 11/2017 | Otto et al. |
| 2017/0334645 | A1 | 11/2017 | Otto et al. |
| 2017/0334696 | A1 | 11/2017 | Otto et al. |
| 2018/0142947 | A1 | 5/2018 | Bates et al. |
| 2018/0148259 | A1* | 5/2018 | Gravelle .................. B65G 1/04 |
| 2018/0170650 | A1 | 6/2018 | Lindbo et al. |
| 2018/0194571 | A1* | 7/2018 | Fryer .................. B65G 1/0478 |
| 2019/0092569 | A1 | 3/2019 | Otto et al. |
| 2019/0367273 | A1 | 12/2019 | Otto et al. |
| 2020/0122924 | A1 | 4/2020 | Otto et al. |
| 2021/0002074 | A1 | 1/2021 | Otto et al. |
| 2021/0032031 | A1* | 2/2021 | Kalouche ............... B25J 9/1697 |
| 2021/0403237 | A1* | 12/2021 | Austrheim .............. B66C 13/00 |
| 2023/0028034 | A1* | 1/2023 | Gravelle .............. B65G 1/0485 |

FOREIGN PATENT DOCUMENTS

| | | | | | |
|---|---|---|---|---|---|
| EP | 2392524 | A1 | 12/2011 | | |
| GB | 2517264 | A | 2/2015 | | |
| GB | 2564747 | A * | 1/2019 | .............. | B65G 1/02 |
| GB | 2571827 | A | 9/2019 | | |
| WO | 2015019055 | A1 | 2/2015 | | |
| WO | 2015185628 | A2 | 12/2015 | | |
| WO | 2017153563 | A1 | 9/2017 | | |
| WO | 2018146304 | A1 | 8/2018 | | |
| WO | 2019101367 | A1 | 5/2019 | | |

OTHER PUBLICATIONS

International Search Report (PCT/ISA/210) and Written Opinion (PCT/ISA/237) mailed on Jun. 8, 2021, by the European Patent Office as the International Searching Authority for International Application No. PCT/EP2021/055217. (14 pages).

Search and Examination Report dated Aug. 11, 2021 by the British Patent Office for Application No. 2102938.4 (6 pages).

Office Action (Examination Report No. 1) issued on Sep. 14, 2023, by the Australian Patent Office in corresponding Australian Patent Application No. 2021231203. (3 pages).

Office Action issued on Nov. 27, 2023, by the Canadian Patent Office in corresponding Canadian Patent Application No. 3,173,320. (4 pages).

Office Action issued on Jan. 13, 2025 by the Korean Patent Office in corresponding Korean Application No. 10-2022-7034156 (7 pages) corresponding to Applicant's U.S. Appl. No. 17/908,802.

Office Action issued on Jul. 3, 2025 by the Chinese Patent Office in corresponding Chinese Application No. 202180029352.8 (11 pages) corresponding to Applicant's U.S. Appl. No. 17/908,802.

* cited by examiner

30

32

34

36

38

39

10

117

114c

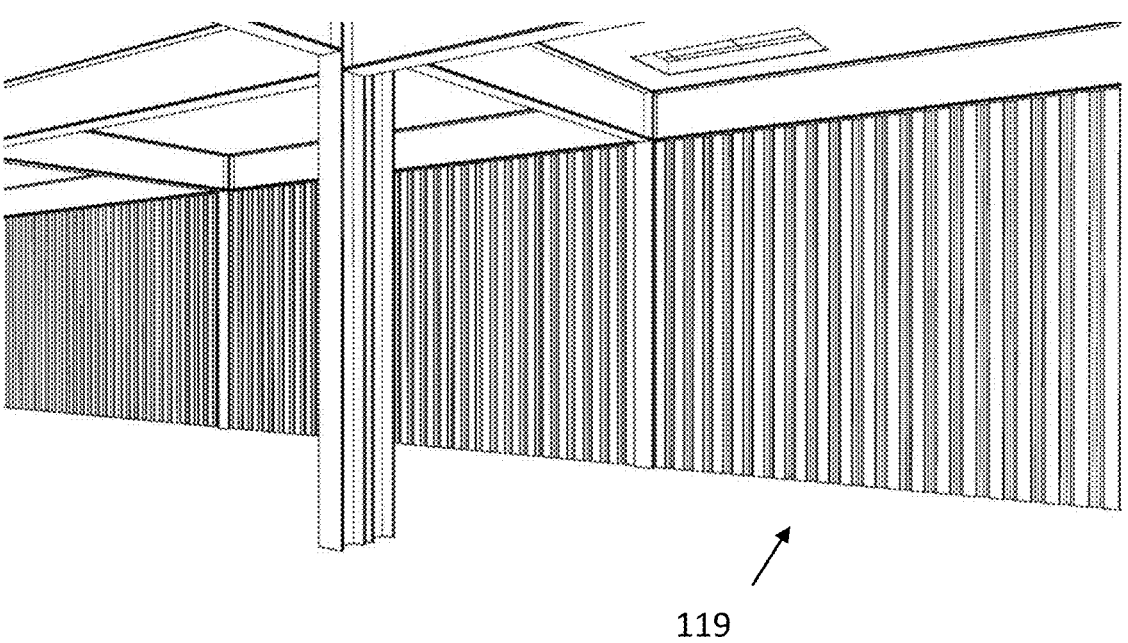
119
119
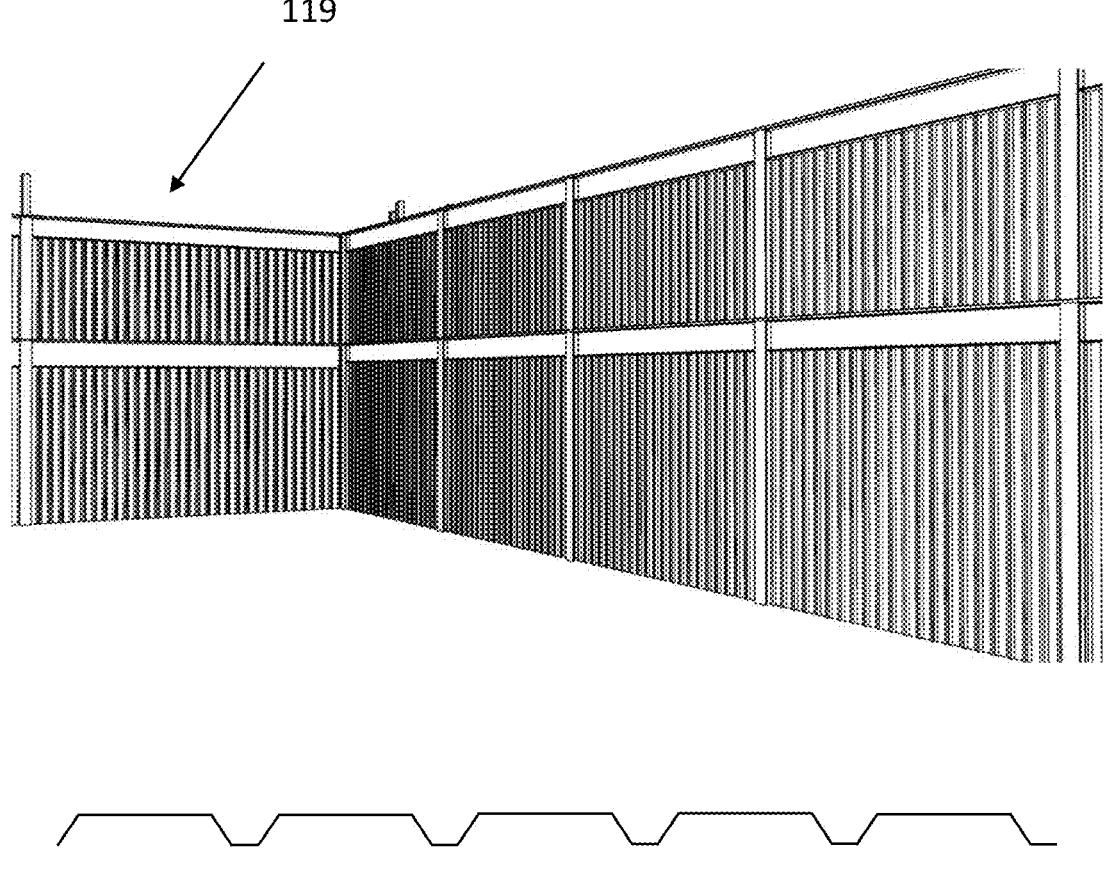
Figure 6e

96

90

94

92

98

108     120     96

102

106     104     106     100

(a)

(b)

(C)

Figure 12:
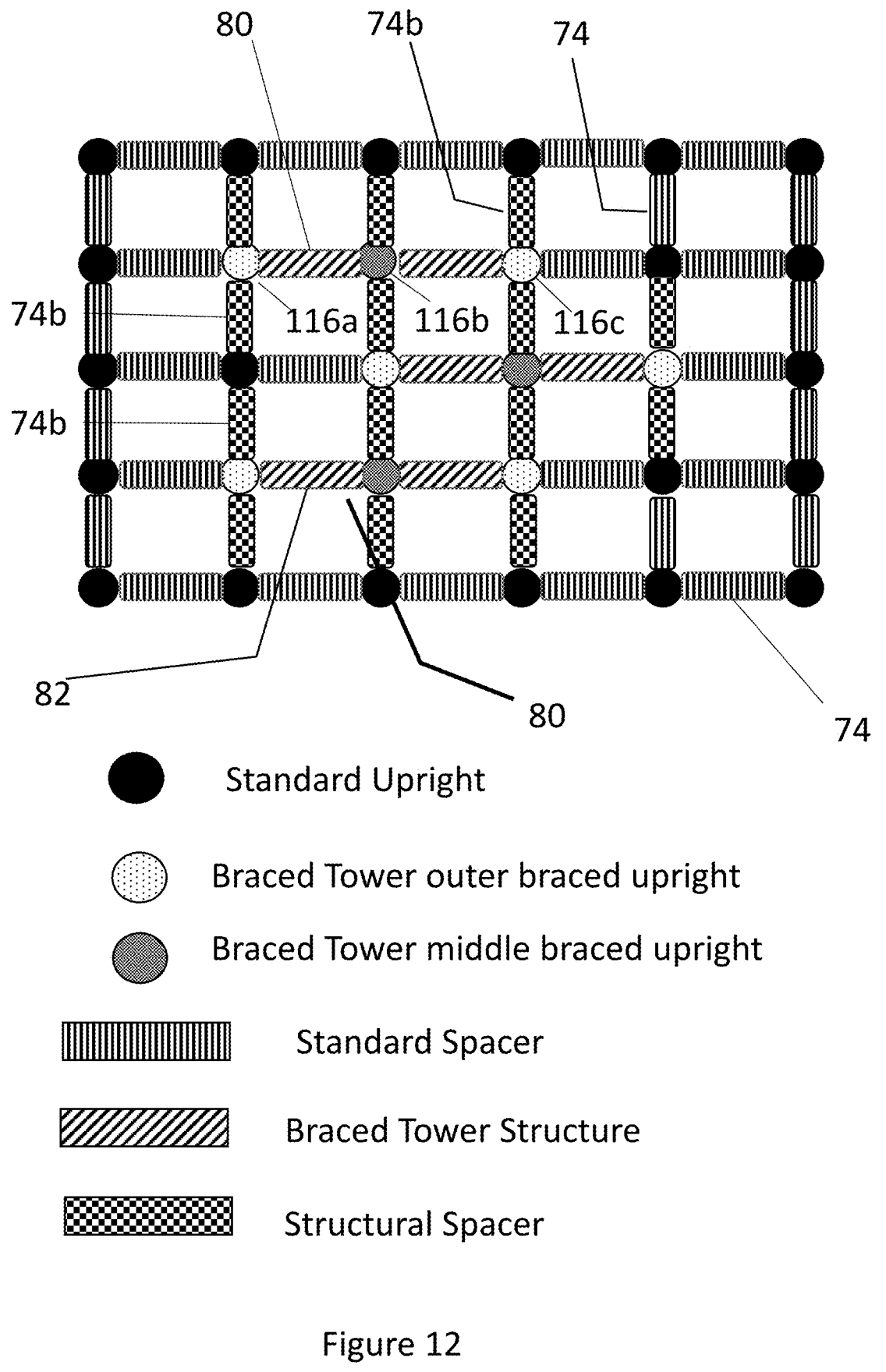

80      74b      74

74b 116a    116b    116c

74b

82

80

74

● Standard Upright

◉ Braced Tower outer braced upright

◉ Braced Tower middle braced upright

▥ Standard Spacer

▨ Braced Tower Structure

▩ Structural Spacer

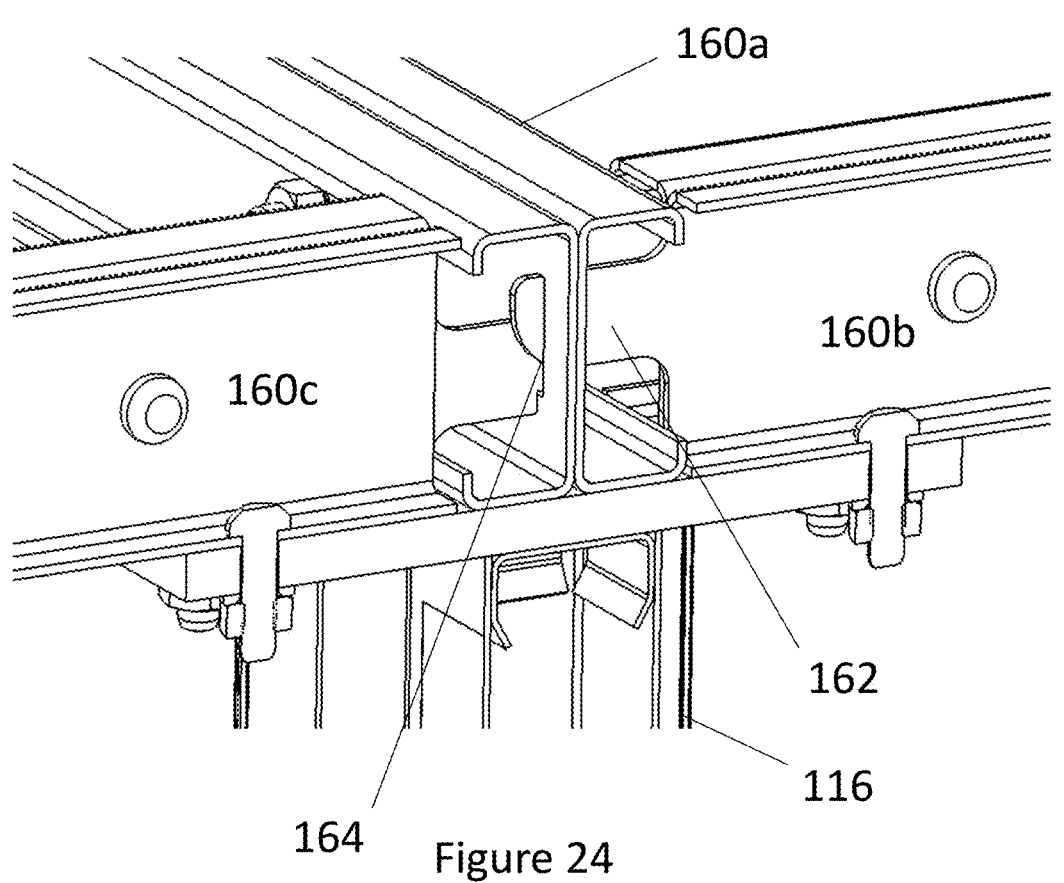
160a
160b
160c
162
116
164          Figure 24
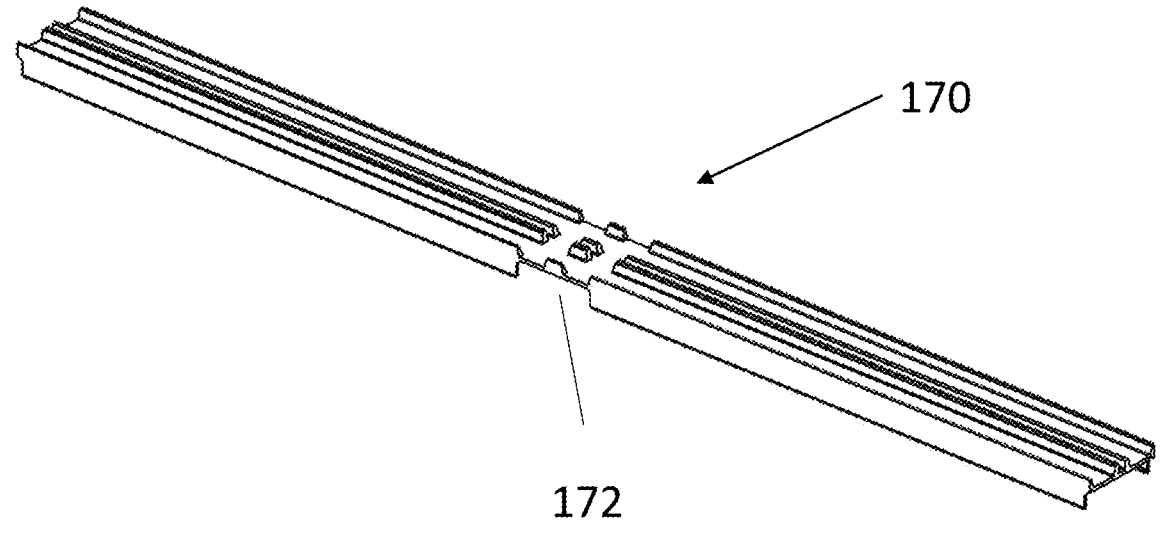
170
172
Figure 25

170a     170c

170b

250

252, D 215, 315

218

220

M = Bending moment

Chord

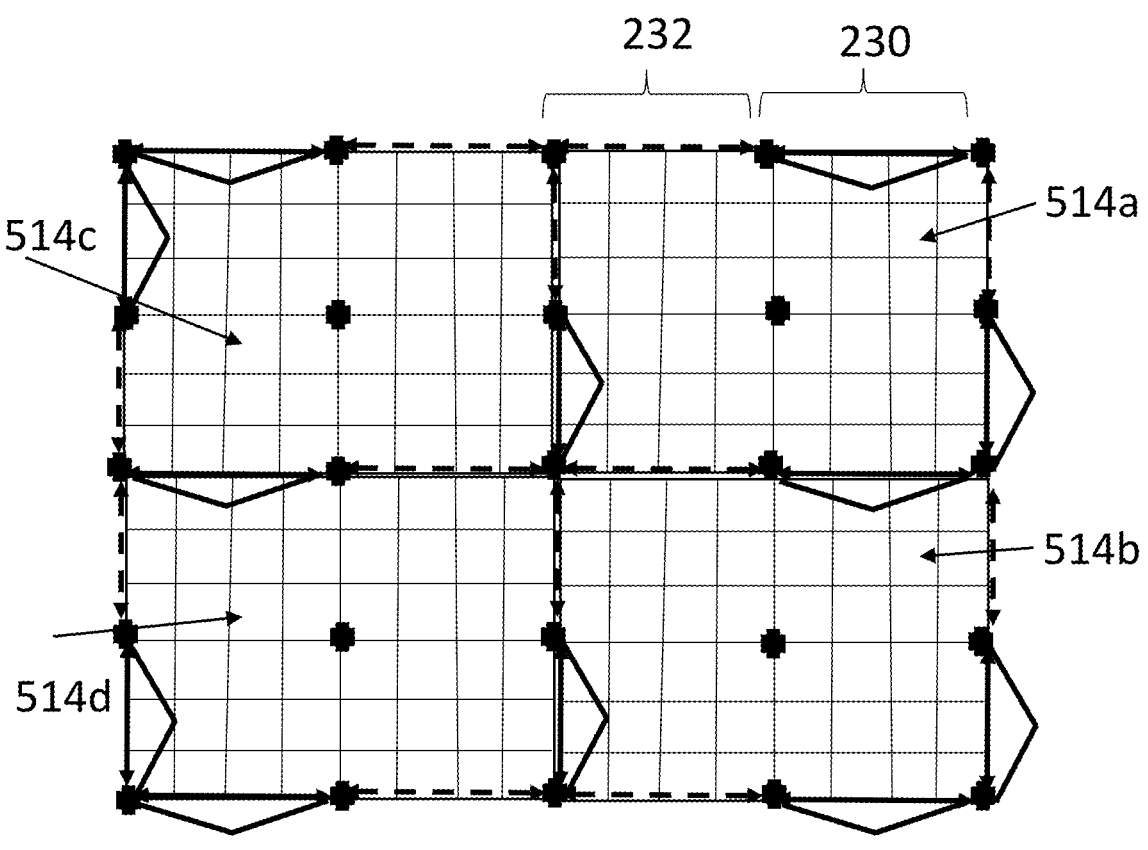
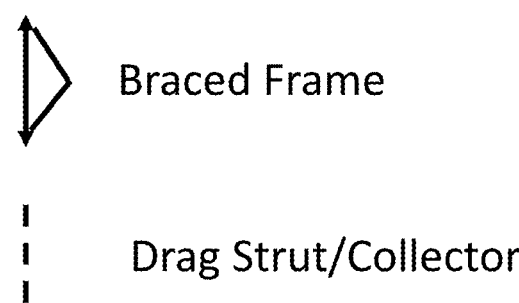
Braced Frame
Drag Strut/Collector
Modular Grid
Figure 40

| | |
|---|---|
| ▬▬▬ | SFRS |
| ▬▬▬ | mezzanine |

716

118

116

120

120

717

716

116

118

118

GRID FRAMEWORK STRUCTURE

FIELD OF INVENTION

The present invention relates to the field of remotely operated load handling devices on tracks located on a grid framework structure for handling storage containers or bins stacked in the grid framework structure, more specifically to a grid framework structure for supporting the remotely operated load handling devices.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as bins or containers 10, are stacked on top of one another to form stacks 12. The stacks 12 are arranged in a grid framework structure 14 in a warehousing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members or upright columns 16 that support horizontal members 18, 20. A first set of parallel horizontal grid members 18 is arranged perpendicularly to a second set of parallel horizontal grid members 20 and arranged in a grid pattern to form a grid structure comprising a plurality of grid cells or grid spaces supported by the upright members 16. The members 16, 18, 20 are typically manufactured from metal and typically welding or bolted together or a combination of both. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIGS. 4 and 5 comprises a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting a pair of wheels on the front of the vehicle body 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the set wheels are driven to enable movement of the vehicle in X and Y directions respectively along the rails. One or both sets of wheels can be moved vertically to lift each set of wheels clear of the respective rails, thereby allowing the vehicle to move in the desired direction.

The load handling device 30 is equipped with a lifting device or crane mechanism to lift a storage container from above. The crane mechanism comprises a winch tether or cable 38 wound on a spool or reel (not shown) and a grabber device 39. The lifting device comprise a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving space 40, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

However, the grid framework structure is subjected to various external and internal forces. These include but are not limited to ground movement which can be attributed to the composition of the ground or soil type, forces developed by the movement of the load handling devices on the grid framework structure which can weight in excess of 100 kg, movement as a result of nearby constructions or moving vehicles such as trains or even during an earthquake or storm. It is paramount to keep the individual elements within the grid framework structure intact as a result of such external forces experienced by the grid framework.

To ensure stability of the grid framework structure, prior art storage systems are largely dependent on various supports and bracing arranged within or at least partly along the periphery of the grid. However, the use of various supports and bracing (anti-movement braces) to stabilise the grid framework structure from internal and external forces is disadvantageous for a number of reasons. The grid framework structure occupies space or area which could be utilised by the grid to store containers; in that it prevents optimum usage of available space or area for the storage of containers. The need of a supporting structure may limit the available options for positioning of the grid framework structure since any auxiliary grid supporting structure often requires connection to a surrounding structure such as the inner walls of a building and the requirement of a supporting structure that is not cost efficient.

WO2019/101367 (Autostore Technology AS) teaches a grid supporting structures for integration in a storage grid structure of an automated storage system arranged. The grid supporting structure is made up of four storage columns interconnected by multiple vertically inclined support struts. The storage column profiles has a cross-section comprising a hollow centre section and four corner sections, each corner section comprises two perpendicular bin guiding plates for accommodating a corner of a storage bin. The support struts has a width which allows them to fit in between two parallel guiding plates so as to not compromise the ability of the storage columns to accommodate a stack of containers or storage bins.

An alternative grid framework structure is thus required that minimises the impact of the available space or area for the storage of containers so as to provide a free-standing storage grid or at least requiring a less extensive auxiliary grid support structure.

Much of the world's population is located along seismic fault lines or in the paths of powerful storms such as hurricanes and tornadoes. Locating the grid frame structure in such areas are at risk of structural damage from seismic and storm events as the current grid framework structure may not hold the grid structure together. Powerful seismic and storm events may result in the failure of their structural integrity e.g. as a result in the inability of the structural fasteners to keep the grid firmly attached to the upright members. Earthquakes can be labelled into four categorises labelled as Type A, B, C, or D depending on the severity of the earthquake, whereby Type A is considered the least powerful earthquake and Type D is considered the most powerful earthquake. Type A-D can be graded by their spectral acceleration which is the maximum acceleration measured in g that an object, above ground level, will experience during an earthquake. Type D considered to represent the most powerful seismic event and typically, has a measured spectral acceleration in the region 0.5 g to 1.83 g (short period spectral response acceleration SDS see https://www.fegstructural.com/seismic-design-category-101/) and is the result of most failure of buildings. As powerful seismic events act on a structure, the three dimensional dynamic forces compromise the structural fasteners holding the grid framework structure together, causing them to work their way loose or out of the members in which they are embedded or, if they remain in place, they may tear their way through a structural fastener.

Many jurisdictions, such as the US states, have passed laws mandating that all new buildings, residential or commercial be constructed with certain seismic bracing features incorporated therein. A grid framework structure comprises internal bracing features incorporated within the grid framework structure whereby one or more of the upright members are braced together by one or more bracing members or bracing towers is shown in FIG. 6. Typically, the bracing members are distributed internally throughout the grid framework structure. The distribution of the internal bracing is largely dependent on the size of the grid framework structure, the ground condition and the environmental condition such as temperature. However, whilst the grid framework structure is able to withstand very low level seismic events having a spectral acceleration less than 0.3 g, presently there are no earthquake restraint system for a grid framework structure that is able to withstand more powerful Type C and Type C seismic events categorised by a spectral acceleration in the region of 0.5 g to 1.83 g.

An earthquake restraint grid framework structure is thus required that is able to withstand powerful seismic events.

This application claims priority from UK patent application no. GB2003054.0 filed 3 Mar. 2020 and UK patent application no. GB2008116.2 filed 29 May 2020, the content of those applications hereby being incorporated by reference.

SUMMARY OF INVENTION

The present applicant has mitigated the above problem by providing a grid framework structure for supporting a load handling device operative to move one or more containers, said grid framework structure comprising:

a plurality of upright columns arranged to form a plurality of vertical storage locations for one or more containers to be stacked between the upright columns and be guided by the upright column in a vertical direction, wherein the plurality of upright columns are interconnected at their top ends by a first set of grid members extending in a first direction and a second set of grid members extending in a second direction, the second set of grid members running transversely to the first set of grid members in a substantially horizontal plane to form a grid structure comprising a plurality of grid cells;

characterised in that:

the first and the second sets of grid members are subdivided into a plurality of grid elements such that each of the plurality of grid elements are arranged to extend or span across the top end of a single upright column.

The interconnections of the grid members at each of the upright channels that is arranged to extend or span across the top of a single upright column rather than just supporting the ends of the grid elements results in a grid pattern having a woven-like or brick-like appearance As a result, the structural integrity of the grid, particularly at the intersections where the grid members cross at the top of the upright columns, is improved. For the purpose of the present invention, a grid element spans or extends across a single upright column is construed to provide a continuous surface without separation across a single upright column rather than the ends of the grid elements butting up to the top of the upright column.

In order for each of the plurality of grid elements to extend or span across a single upright column, preferably, the first set of grid members is sub-divided into a first subset of grid members and a second subset of grid members extending in the first direction, the second subset of grid members is spaced apart from the first subset of the grid members in the second direction, the first subset of grid members is sub-divided into a first set of grid elements and the second subset of grid members is sub-divided into a second set of grid elements, wherein the first set of grid elements is offset from the second set of grid elements in the first direction by single grid cell. The grid elements are staggered in the first direction such that adjacent grid elements in a first direction is offset by a single grid cell, i.e. parallel grid elements in the first direction are offset by a single grid cell. Preferably, each of the first and the second subset of grid members comprises at least one grid member. The at least one grid members are broken down into a plurality of grid elements that a linked together at the intersections.

The same pattern of grid elements applies in the second direction, whereby the first set of grid members is sub-divided into a first subset of grid members and a second subset of grid members extending in the second direction, the second subset of grid members is spaced apart from the first subset of the grid members in the first direction, the first subset of grid members is sub-divided into a first set of grid elements and the second subset of grid members is sub-divided into a second set of grid elements, wherein the first set of grid elements is offset from the second set of grid elements in the second direction by single grid cell.

By breaking down the grid members into a plurality of grid elements and arranging the grid elements in the first direction and in the second direction to span or extend across a single upright channel, the plurality of upright columns are interconnected at their top ends by supporting an end of a first grid element extending in the first direction and a centre of a second grid element extending in the second direction.

Preferably, each of the plurality of grid elements of the first and the second set of grid members comprise interlock-ing features that are arranged to interlock with each other at the top ends of the plurality of upright columns. More preferably, each of the plurality of grid elements of the first set of grid members extending in the first direction interlock with corresponding grid elements of the second set of grid members extending in the second direction by a hook receivable in a corresponding opening. Optionally, each of the plurality of grid elements of the first set of grid members and the second set of grid members comprise at least one hook at their distal or opposing ends and an opening substantially mid-way between the opposing ends, i.e. mid-way along the length of the grid element, such that the at least one hook of a grid element is receivable in the opening of an adjacent grid element to interlock with each other at the intersection where the grid elements cross at the upright column. As half the length of each of the grid elements in the first direction and in the second direction is sized to repre-sent the length of a grid cell, connection mid-way between the opposing ends of the grid element creates a pattern where the grid elements are offset by at least one grid cell in the first direction and in the second direction.

The staggered arrangement of the grid elements in the first direction and in the second direction is preferably provided by having the length of each of the plurality of grid elements of the first set of grid members extending in the first direction to be substantially the same and the length of each of the plurality of grid elements of the second set of grid members extending in the second direction to be substan-tially the same, and wherein the length of each of the plurality of grid elements of the first set of grid members is different to the length of each of the plurality of grid elements of the second set of grid elements. Here, the length of each of the grid elements are the same in the first direction and in the second direction but are different in both the first and the second direction. The different lengths in the first direction and in the second direction provides substantially rectangular grid cells that are sized to accommodate the container or storage bins which are generally rectangular in shape.

To interconnect the plurality of the upright columns at their top ends in the grid framework structure, preferably a cap plate is secured to the top end of each of the plurality of upright columns, said cap plate is shaped as cross having four perpendicular ends, each of the four perpendicular ends being configured for connecting with at least one of the plurality of grid elements such that the cap plate is arranged to connect to at least one grid elements extending in the first direction and at least one grid element extending in the second direction. The cap plate of the present invention is configured as a cross connection plate having four ends perpendicular to each other. The ends of the cap plate are configured to connect to the grid elements. For example, connected to the ends of the grid elements and/or along the grid element, i.e. substantially mid-way along the length of the grid element.

More preferably, each of the plurality of upright columns has a cross-section comprising a hollow centre section (e.g. box section) and four corner sections, the cap plate com-prises a spigot arranged to be snap fitted into the hollow centre section. The spigot in mounted to the underside of the cap plate. Extending from the spigot are that four perpen-dicular ends for connecting to the grid elements.

Optionally, each of the first and second set of grid members is an assembly of back-to-back C-beams. For the purpose of the present invention, C-beams can also be termed a channel beam and has a cross section of a C. Preferably, each of the grid elements of the first and second set of grid members comprises a first C-beam element and a second C-beam element, each of the first and the second C-beam elements comprises at least one interlocking feature at one its distal end, the first and second C-beams are arranged back to back to form the grid element such that the at least one interlocking feature is at the distal or opposing ends of each of the grid elements. Assembling the C-beams back-to-back creates an I beam, i.e. a beam which a I shaped cross section. Each of the first C-beam element and the second C-beam element comprises an interlocking feature at one of its ends. The first C-beam element and the second C-beam element are assembled back to back to form the grid element so that the interlocking feature of the first C-beam element is at one end of the grid element and the interlocking feature of the second C-beam element is at an opposing end of the grid element. Preferably, the interlocking feature at opposing ends of the grid element is a hook.

Preferably, the first and the second set of grid members supports a first and a second set of tracks respectively. More preferably, each of the first and the second set of tracks are respectively mounted to the first and the second set of grid members in a snap-fit arrangement. Each of the tracks having engaging features that engage with the grid members in a snap-fit arrangement. Similarly to the grid members discussed above, the tracks is preferably laid down on the grid in a woven-lie or brick-like pattern. Preferably, the first and the second set of tracks are sub-divided into a plurality of track elements such that each of the plurality of track elements are arranged to extend or span across the top end of a single upright column.

To create a woven-like or brick-like appearance, prefer-ably the first set of tracks is sub-divided into a first subset of tracks and a second subset of tracks extending in the first direction, the second subset of tracks is spaced apart the first subset of tracks in the second direction, the first subset of tracks is sub-divided into a first set of track elements and the second subset of tracks is sub-divided into a second set of track elements, wherein the first set of track elements is offset from the second set of track elements in the first direction by a single cell. Parallel adjacent tracks elements in the first direction are staggered so that parallel track elements are offset by a single grid cell. Similarly, the second set of tracks is sub-divided into a first subset of tracks and a second subset of tracks extending in the second direction, the second subset of tracks is spaced apart the first subset of tracks in the first direction, the first subset of tracks is sub-divided into a first set of track elements and the second subset of tracks is sub-divided into a second set of track elements, wherein the first set of track elements is offset from the second set of track elements in the second direction by a single cell. Parallel adjacent tracks elements in the first direction and in the second direction are staggered so that parallel track elements are offset by a single grid cell.

Preferably, each of the first and the second subset of tracks in the first direction and in the second direction comprises at least one track. The at least one track in each of the first direction and in the second direction are broken down into track elements that are joined together at the upright column. Preferably, each of the plurality of track elements of the first and second set of tracks comprise interconnecting features such that each of the plurality of track elements of the first set of tracks are arranged to interconnect with corresponding track elements of the second set of tracks at the top ends of the plurality of upright columns. More preferably, each of the track elements of the first and the second set of tracks comprise a cut-out that is arranged to cooperate with the ends of corresponding track elements of the first and second set of tracks at the top ends of the plurality of upright columns. Preferably, the cut-out is half way along the length of the track. The cut-out is necessary so as to accommodate the cap plate when the track elements are assembled on the grid elements at the junction where the grid elements cross at the upright column.

A further aspect of the present invention provides a storage system comprising:

i) a grid framework structure of the present invention;

ii) a plurality of stacks of containers arranged in storage columns located below the grid, wherein each storage column is located vertically below a grid cell;

iii) a plurality of load handling devices for lifting and moving containers stacked in the stacks, the plurality of load handling devices being remotely operated to move laterally on the grid above the storage columns to access the containers through the substantially rectangular frames, each of said plurality load handling devices comprises:

a) a wheel assembly for guiding the load handling device on the grid;

b) a container-receiving space located above the grid; and c) a lifting device arranged to lift a single container from a stack into the container-receiving space.

For the purpose of the present invention, the term "vertical storage location", "storage location", "storage column", "storage columns" and "grid column" are used interchangeably throughout the description to mean the same feature.

The pattern of grid members can be claimed in other ways and falls within the scope of the present invention. These include:

A1. A grid framework structure for supporting a load handling device operative to move one or more containers, said grid framework structure comprising:

a plurality of upright columns arranged to form a plurality of vertical storage locations for one or more containers to be stacked between the upright columns and be guided by the upright column in a vertical direction, the plurality of upright columns are interconnected at their top ends by a first set of grid members extending in a first direction and a second set of grid members extending in a second direction, the second set of grid members running transversely of the first set of grid members in a substantially horizontal plane to form a grid structure comprising a plurality of grid cells;

characterised in that:

the first and the second set of grid members are sub-divided into a plurality of grid elements such that the plurality of grid elements along a sub-set of the first and the second set of grid members are arranged to alternate across the plurality of upright columns in the first direction or the second direction to extend across the top end of a single upright column.

B1. A grid framework structure for supporting a load handling device operative to move one or more containers, said grid framework structure comprising:

a plurality of upright columns arranged to form a plurality of vertical storage locations for one or more containers to be stacked between the upright columns and be guided by the upright column in a vertical direction, the plurality of upright columns are interconnected at their top ends by a first set of grid members extending in a first direction and a second set of grid members extending, the second set of grid members running transversely of the first set of grid members in a substantially horizontal plane to form a grid structure comprising a plurality of grid cells;

characterised in that:

the first and the second set of grid members is sub-divided into a plurality of grid elements such that adjacent grid elements in the first direction or the second direction are offset with respect to each other in the horizontal plane by a single grid cell.

B2. The grid framework structure of claim B1, wherein the plurality of grid elements along a sub-set of the first set of grid members are arranged to interdigitate with the plurality of grid elements along an adjacent sub-set of the first set of grid members.

DESCRIPTION OF DRAWINGS

Further features and aspects of the present invention will be apparent from the following detailed description of an illustrative embodiment made with reference to the drawings, in which:

FIG. 6e is an illustration of the paneling around the grid framework structure.

FIG. 12 is a plan view of the distribution of the braced tower within the grid framework structure according to an embodiment of the present invention.

FIG. 24 is a perspective cross sectional view along the line X-X in FIG. 20 showing the joint between adjacent grid elements at the intersections according to an embodiment of the present invention.

FIG. 25 is a perspective view of a track element according to an embodiment of the present invention.

FIG. 40 is a top plan view showing modularity of the seismic grid framework structure according to an embodiment of the present invention.

FIG. 43 is a top plan view of a fulfilment centre incorporating a mezzanine according to the embodiment of the present invention.

DETAILED DESCRIPTION

Grid Framework Structure

Figure 1:
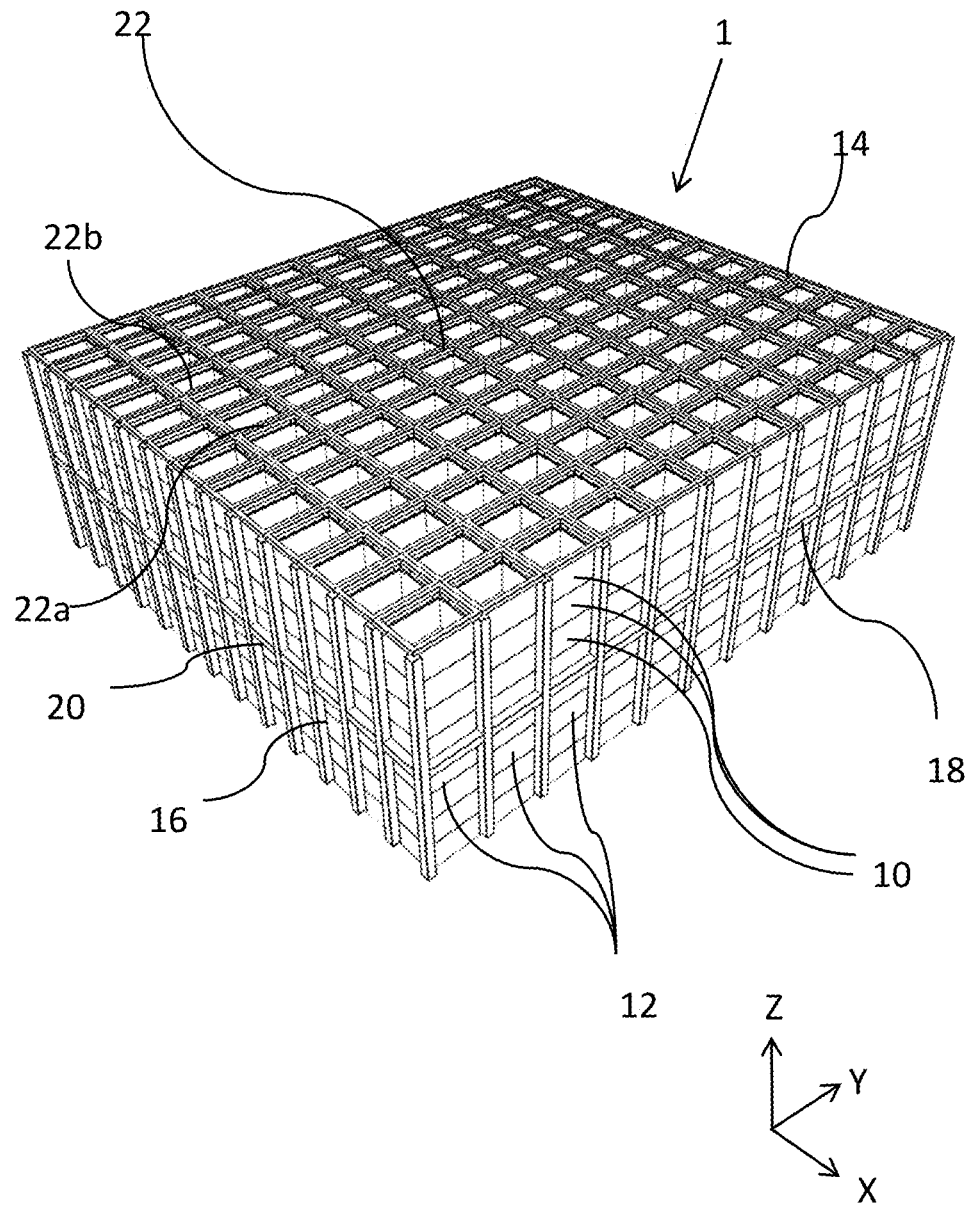
FIG. 1 is a schematic diagram of a grid framework structure according to a known system.
Figure 2:
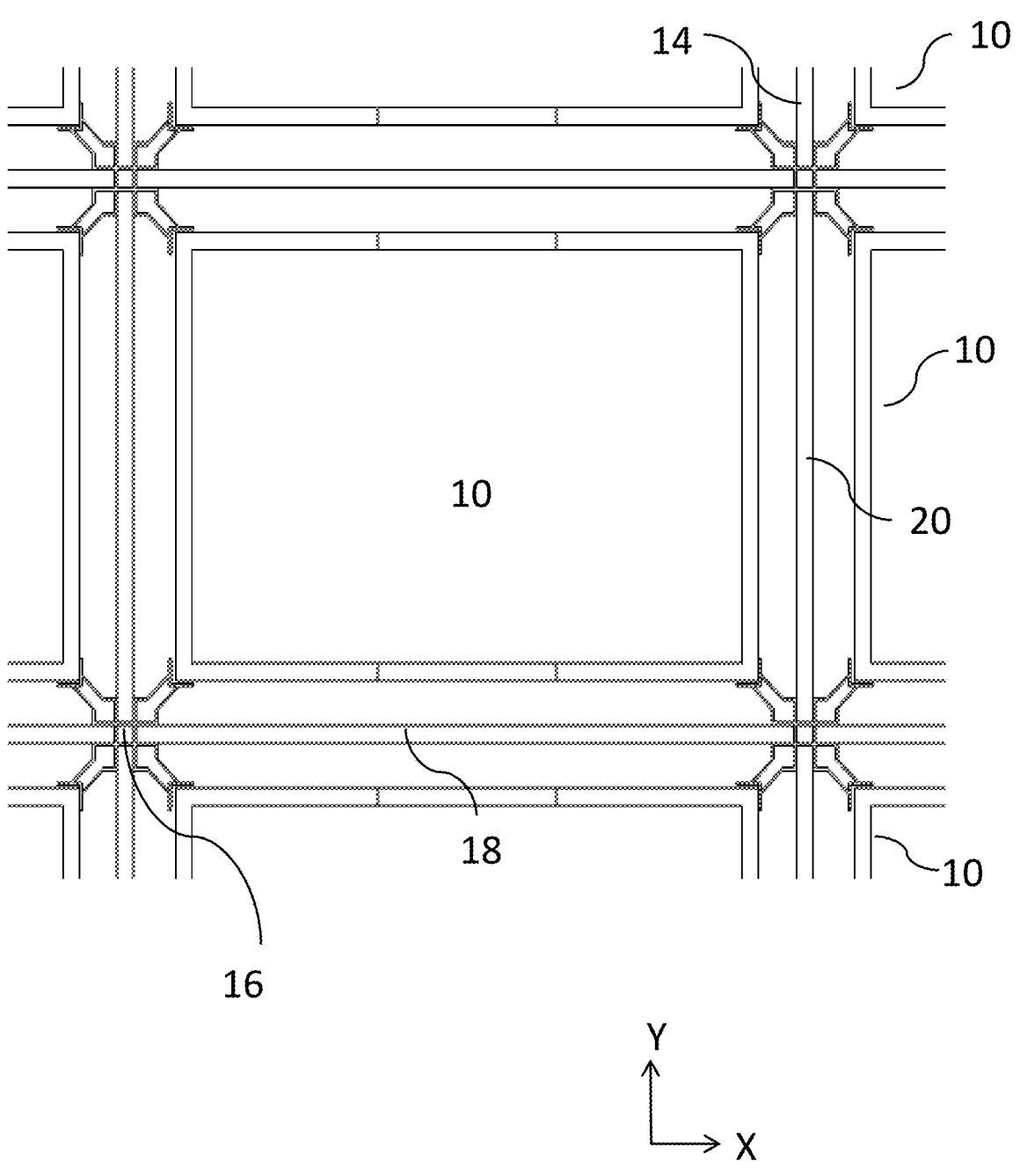
FIG. 2 is a schematic diagram of a top down view showing a stack of bins arranged within the framework structure of FIG. 1.
Figure 3:
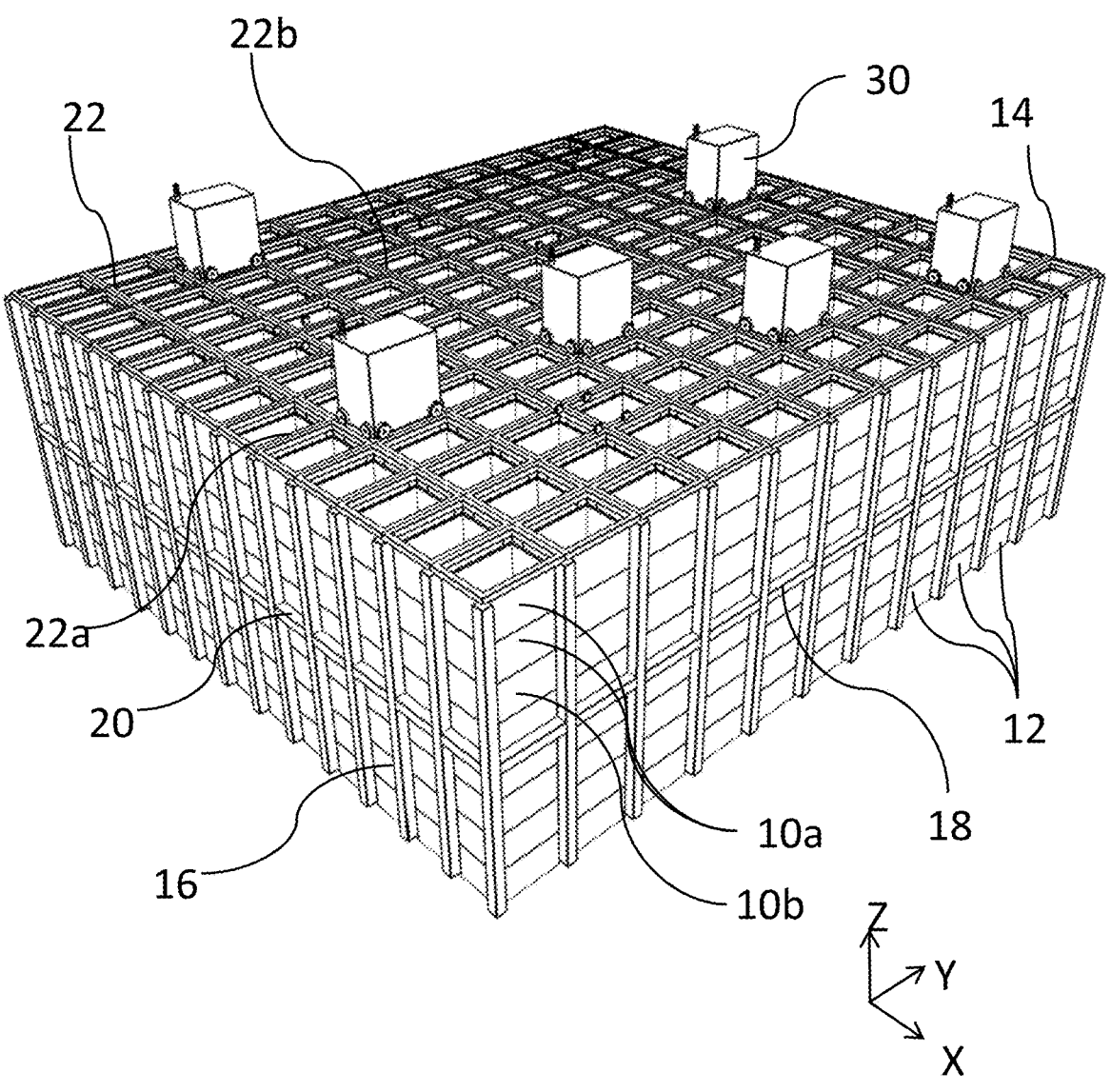
FIG. 3 is a schematic diagram of a system of a known load handling device operating on the grid framework structure.
Figure 4:
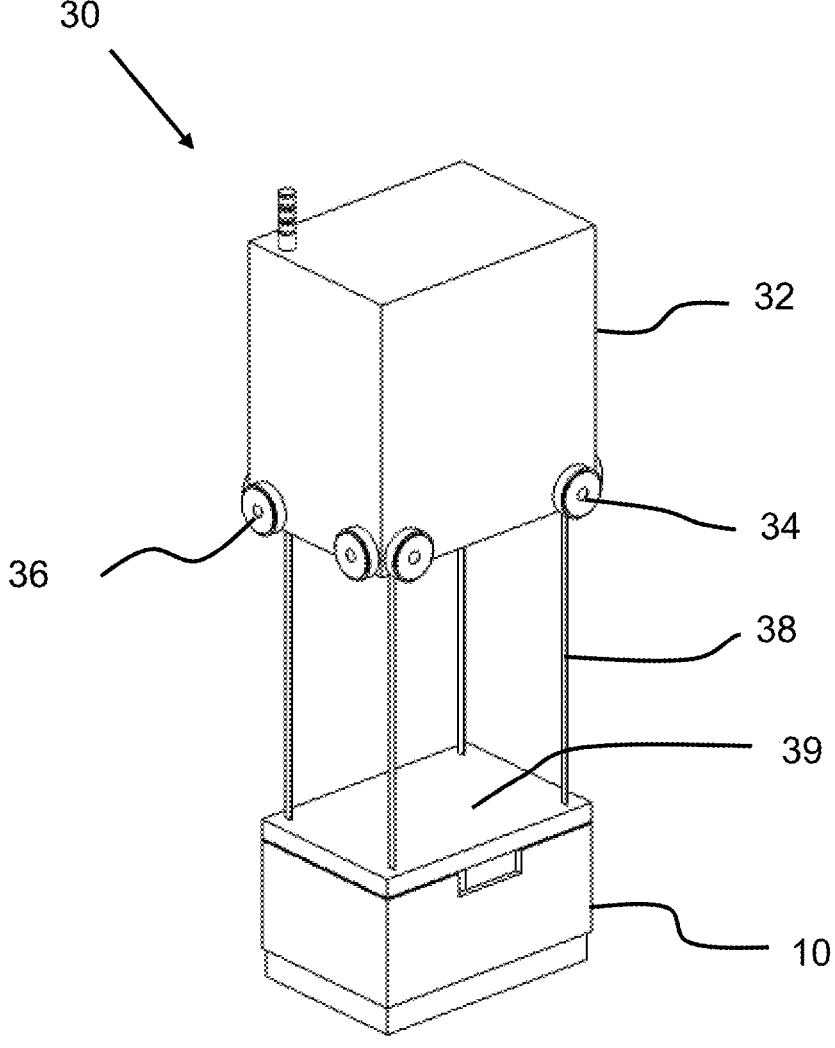
FIG. 4 is a schematic perspective view of the load handling device showing the lifting device gripping a container from above.
Figure 5:
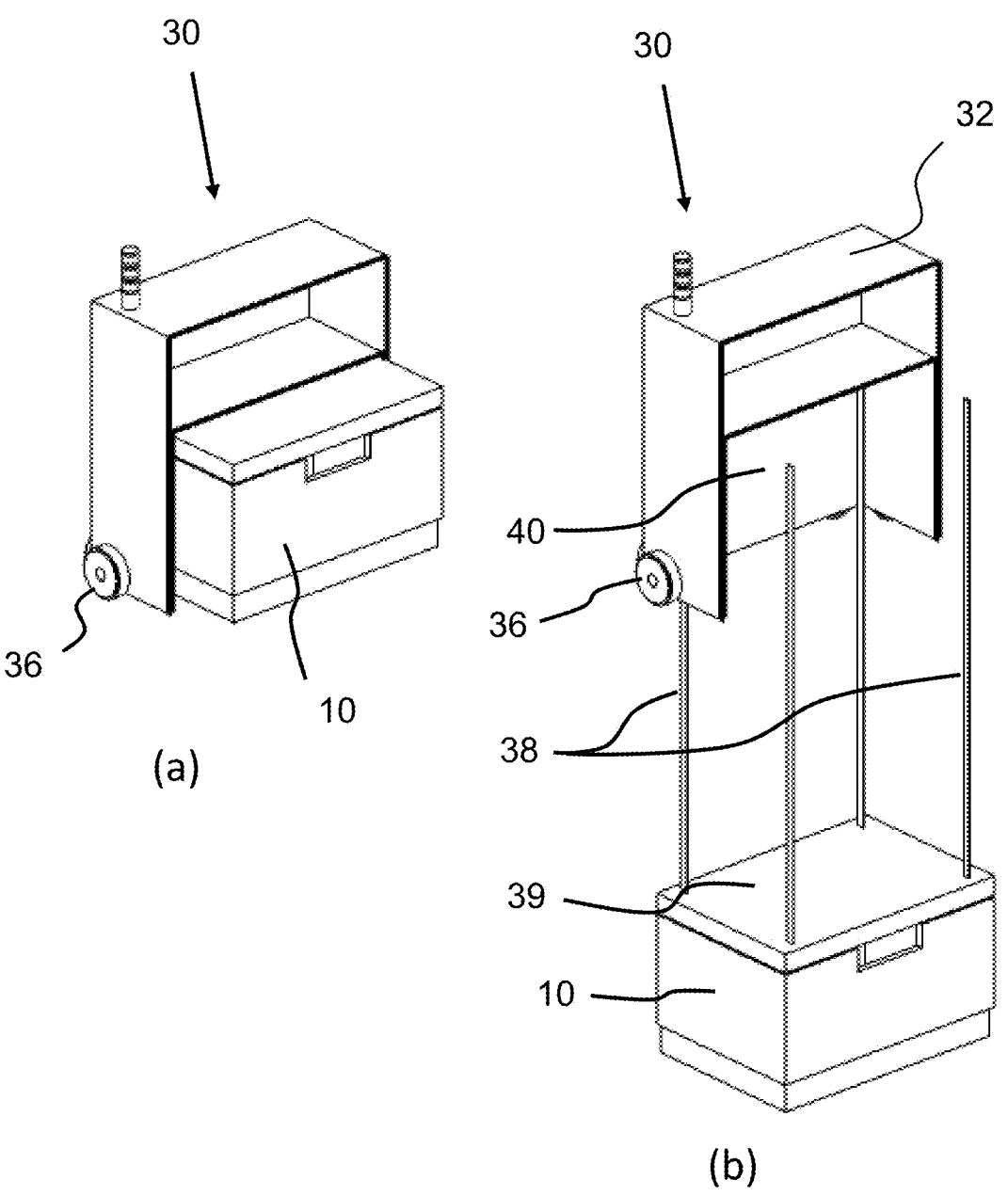
FIGS. 5(a) and 5(b) are schematic perspective cut away views of the load handling device of FIG. 4 showing (a) the container receiving space of the load handling device and (b) a container accommodating the container receiving space of the load handling device.
Figure 6:
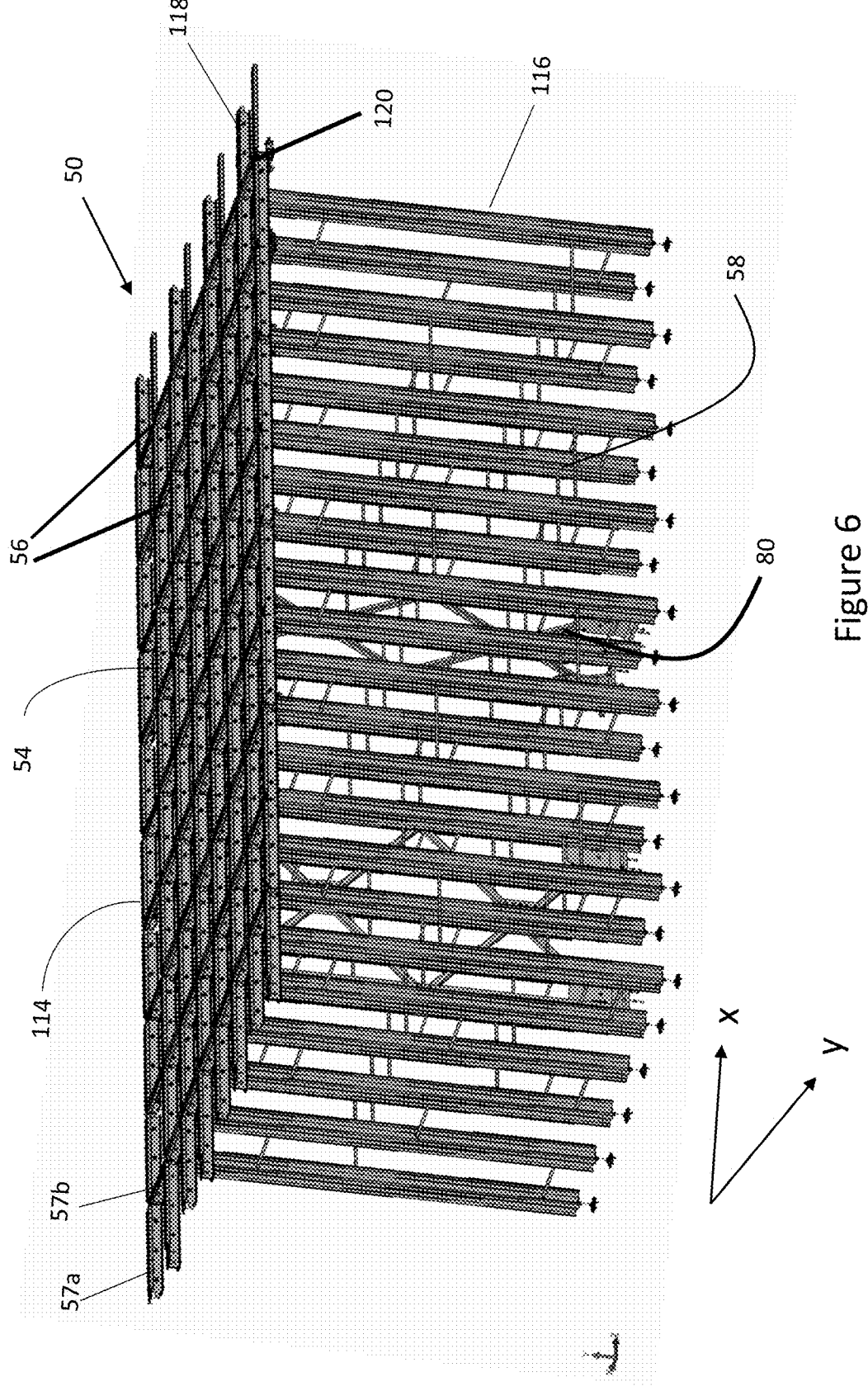
FIG. 6 is a perspective view of the grid framework structure according to an embodiment of the present invention.

FIG. 6 shows a perspective view of a grid framework structure 114 according to an embodiment of the present invention. The basic components of the grid framework structure 114 according to the present invention comprises a grid 50 lying in a horizontal plane mounted to a plurality of upright columns or upright members 116. The terms "upright member(s)" and "upright column(s)" and "vertical column(s)" are used interchangeably in the description to mean the same thing or feature. As shown in FIG. 6, the grid 50 comprises a series of horizontal intersecting beams or grid members 118, 120 arranged to form a plurality of rectangular frames 54, more specifically a first a set of grid members 118 extend in a first direction x and a second set of grid members 120 extend in a second direction y, the second set of grid members 120 running transversely to the first set of grid members 118 in a substantially horizontal plane. The first and the second set of grid members supports a first and a second set of tracks 57a, 57b respectively for a load handling device to move one or more containers on the grid framework structure. For the purpose of explanation of the present invention, the intersections 56 constitute nodes of the grid structure. Each of the rectangular frames 54 constitute a grid cell and are sized for a remotely operated load handling device or bot travelling on the grid framework structure to retrieve and lower one or more containers stacked between the upright columns 116. The grid 50 is raised above ground level by being mounted to the plurality of upright columns 116 at the intersections or nodes 56 where the grid members 118, 120 cross so as to form a plurality of vertical storage locations 58 for containers to be stacked between the upright columns 116 and be guided by the upright columns 116 in a vertical direction through the plurality of substantially rectangular frames 54. For the purpose of the present invention, a stack of containers can encompass a plurality of containers or one or more containers. The grid framework structure 114 can be considered as a rectilinear assemblage of upright columns 116 supporting the grid 50 formed from intersecting horizontal grid members 118, 120, i.e. a four wall shaped framework. Two or more of the upright columns are braced by at least one diagonal bracing member to provide one or more braced towers 80 within the grid framework structure 114. For the purpose of the present invention, the term "vertical upright column", "upright column" and "upright member" are used interchangeably through the description.

Upon receipt of the order, a load handling device operative to move on the tracks is instructed to pick up a storage bin containing the item of the order from a stack in the grid framework structure and transport the storage bin to a pick station whereupon the item can be retrieved from the storage bin and transferred to one or more delivery containers. Typically, the pick station comprises a container transport assembly to transport one or more containers to an access station where the contents of the containers can be accessed. The container transport assembly is typically a conveyor system comprising multiple adjacent conveyor units.

Figure 6B:
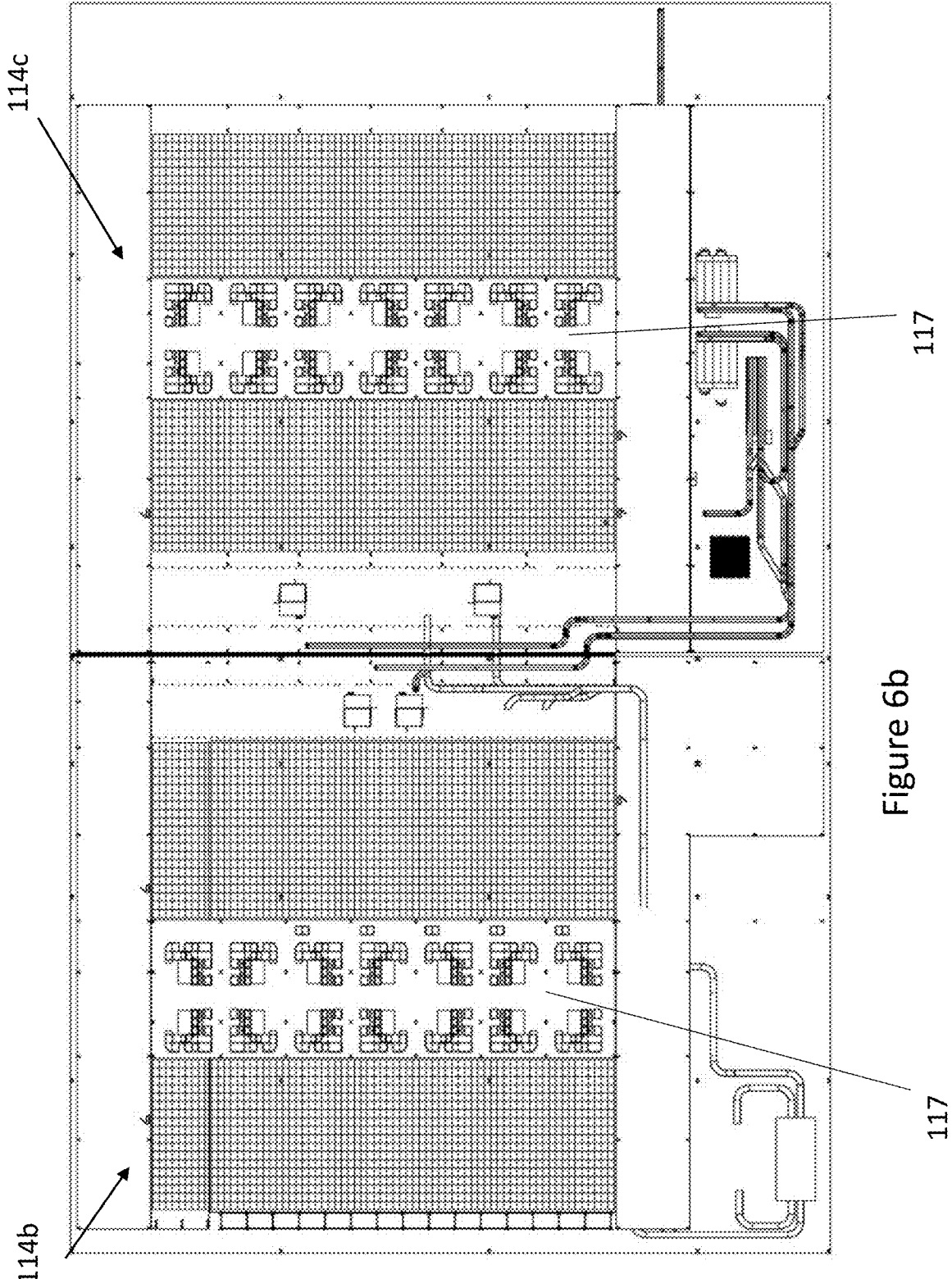
FIG. 6b is a top plan view showing the layout of the grid framework structure in a typical fulfilment centre according to an embodiment of the present invention.

A typical layout of a fulfilment centre for fulfilment of an order is shown in FIG. 6b. The fulfilment centre comprises two distinct grid areas known as an ambient grid area 114b and a chill grid area 114c. Each of the ambient grid area 114b and the chill grid area 114c comprises a grid framework structure, i.e. the ambient grid area 114b comprises a first grid framework structure 114b and the chill grid area 114c comprises a second grid framework structure 114c. For the purpose of the present invention, the ambient grid area 114b stores food and grocery commodities at an ambient controlled temperature. For the purpose of the present invention, the ambient controlled temperature coves a range between substantially 4° C. to substantially 21° C., preferably substantially 4° C. to substantially 18° C. Likewise, the chill grid area 114c stores food and grocery commodities at a chilled temperature. For the purpose of the present invention, the chilled temperature covers a range between substantially 0° C. to substantially 4° C. The two grid areas—ambient and chill—are filled with containers (otherwise known as storage containers, totes, or bins) containing various grocery products. The containers may be plastic, or any other suitable material. Each grid area 114b, 114c can differ in height. For example, in the fulfilment centre illustrated in FIGS. 6b and 6c, the bulk of the ambient grid area comprises a 21 high container stack (approx. 7.7 m), and the chill grid area comprises an eight high container stack (approx. 3.0 m), with a region of the grid above the pick station comprising a stack one container high (approx. 448 mm). The containers are stacked on the floor on top of each other and fit between the grid columns.

Figure 6C:
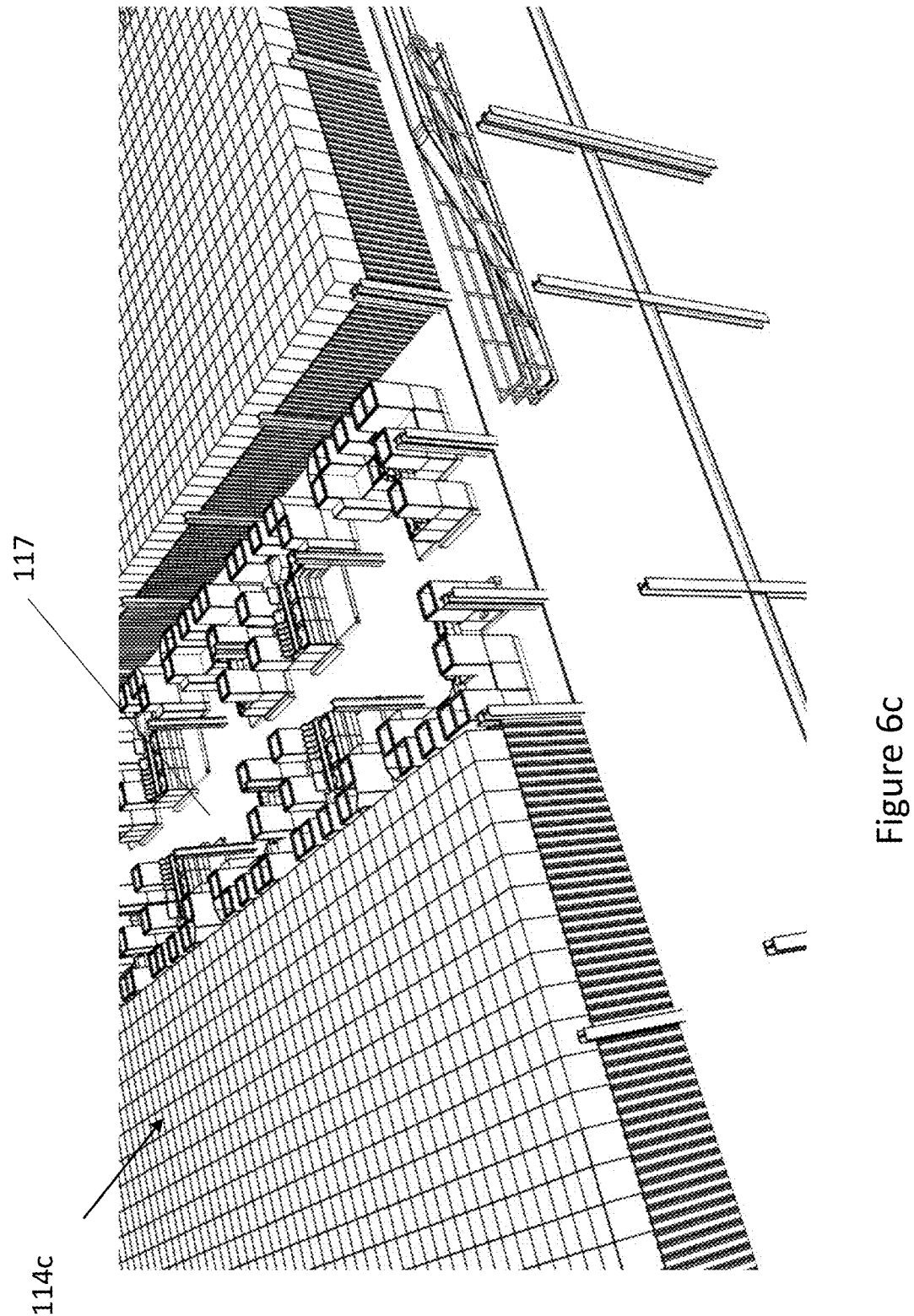
FIG. 6c is a side view model of a typical fulfilment centre according to an embodiment of the present invention.

Each grid area comprises a tunnel 117 known as a pick aisle, which houses one or more pick stations for commodity items to be picked from the storage bins or containers and transferred to one or more delivery containers. FIG. 6c shows a side view model of the chill grid area 114c showing the pick aisle 117 between two grid areas. Also shown in FIG. 6c is a separate area provided by incorporating a mezzanine supported by vertical beams in amongst adjacent grid framework structures. The mezzanine can be a stand-alone structure. The mezzanine provides a tunnel to accommodate, for example, a pick station and/or any one of the above described stations.

Figure 6D:
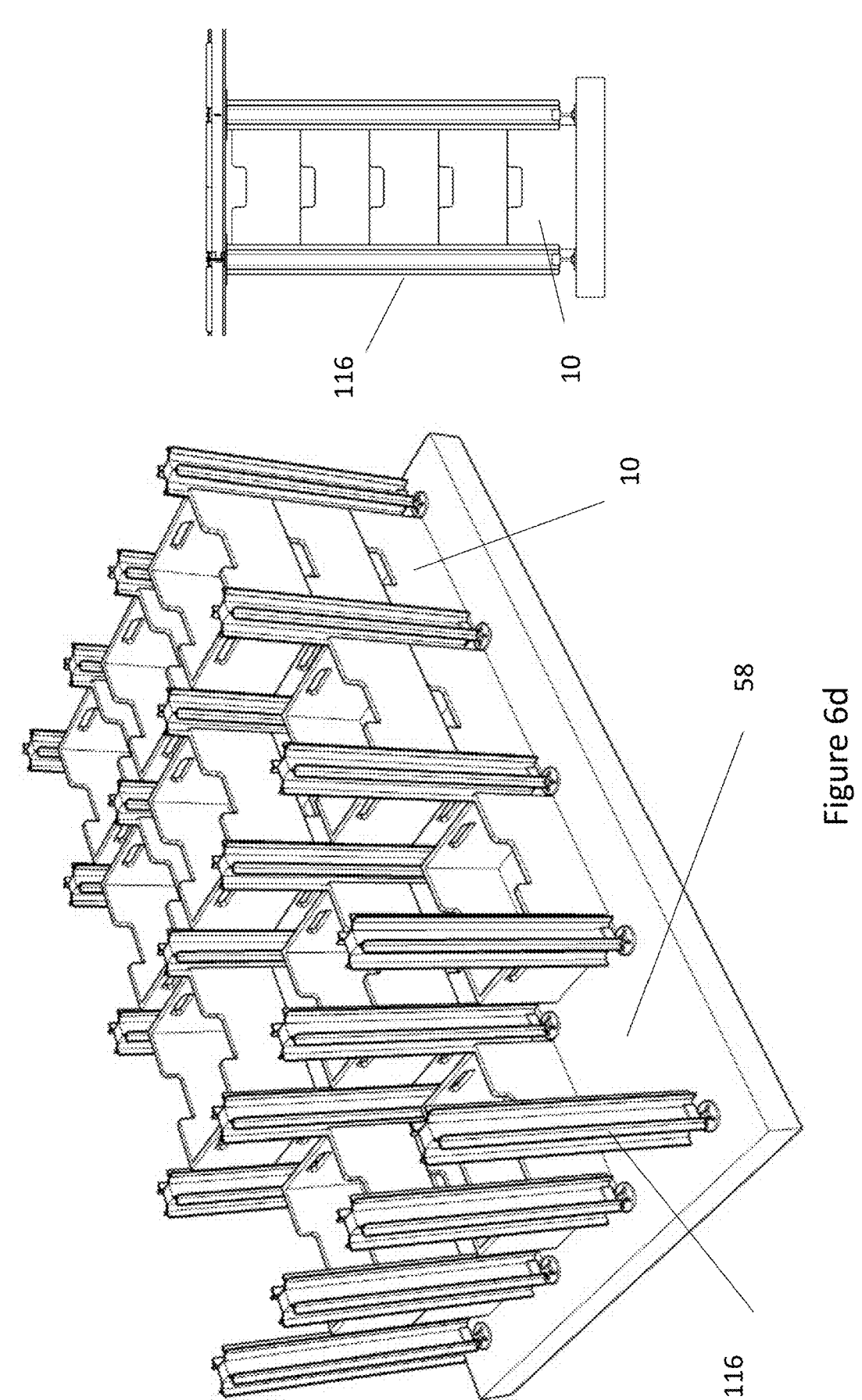
FIG. 6d is a perspective view showing the arrangement of the upright columns forming vertical storage locations or grid columns for containers to be stacked between the upright columns according to an embodiment of the present invention.

Storage containers or bins storing commodity and grocery items are transported by load handling devices operative on the grid to a pick station in the pick aisle, where one or more items are picked from the storage bin or container at the pick station and transferred to one or more delivery containers. FIG. 6d shows a perspective view of the upright columns being arranged to form vertical storage locations 58 for containers 10 to be stored within the vertical storage locations 58. The bottom of FIG. 6d shows a representation of the vertical stack up of the containers 10 between the upright columns 116.

Figure 6F:
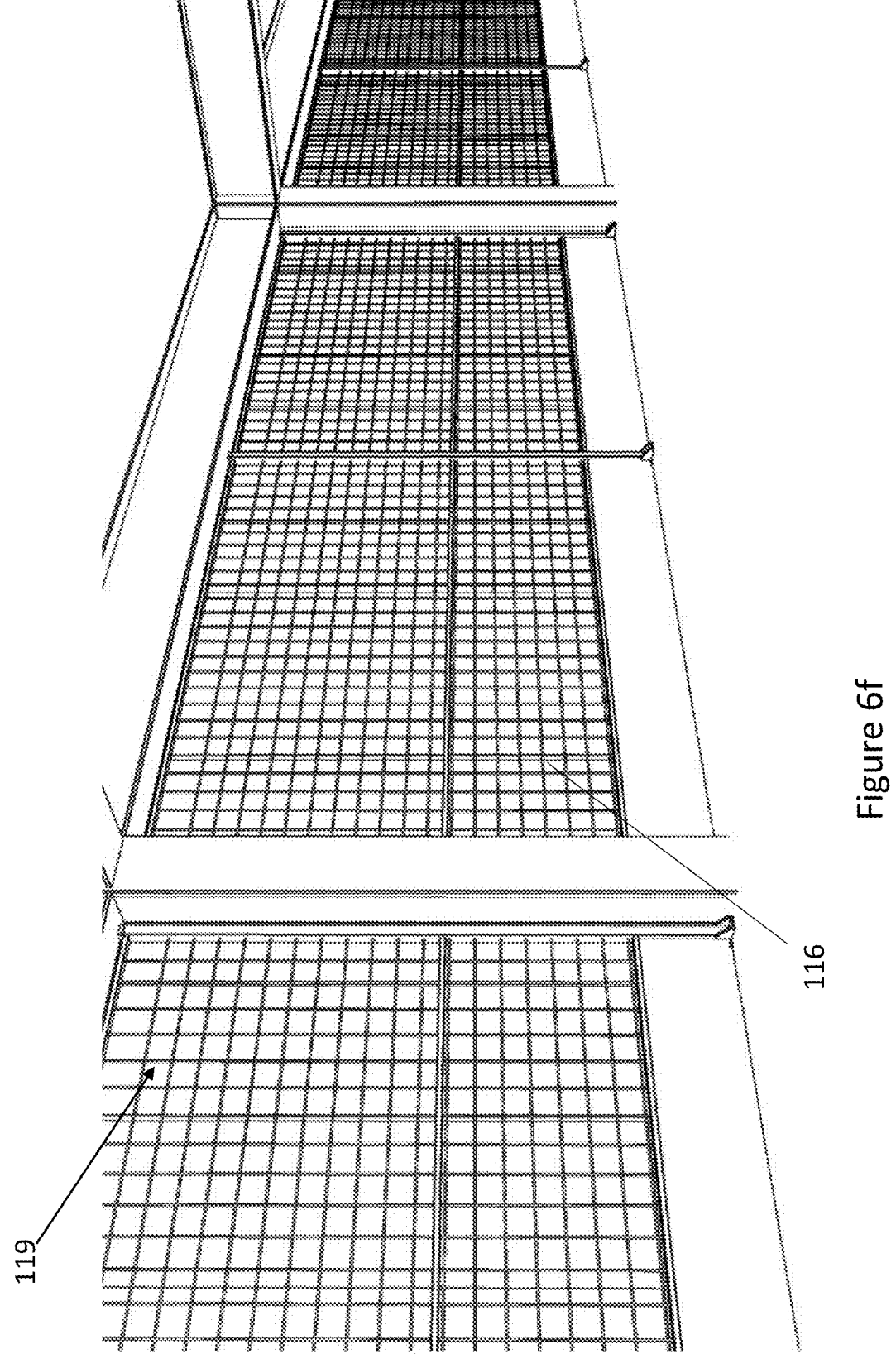
FIG. 6f is an illustration of a mesh paneling according to an embodiment of the present invention.
Figure 6G:
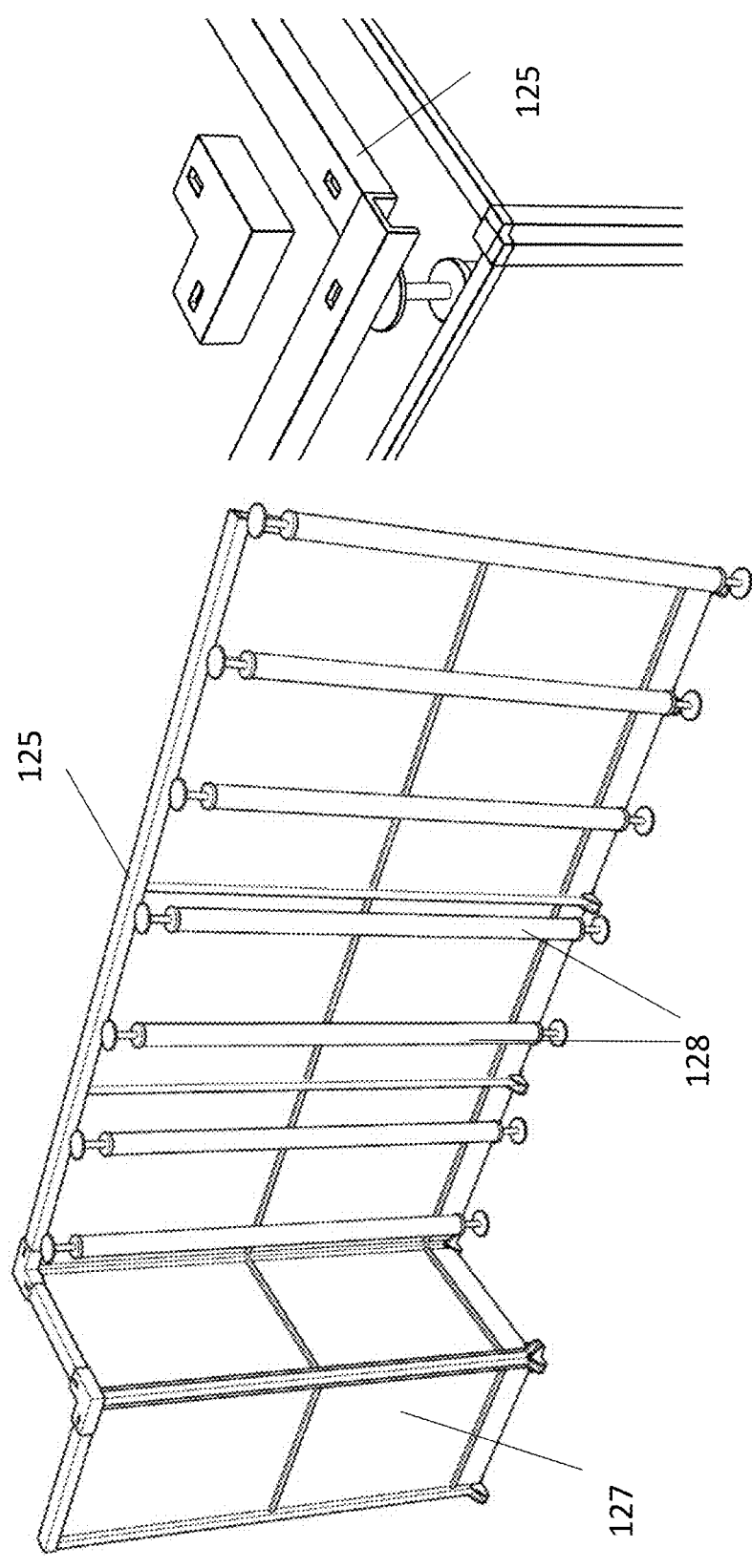
FIG. 6g is a perspective view of the paneling and supporting structure according to an embodiment of the present invention.

Paneling 127 is used to limit and contain access into the grid framework structure for Health and Safety and operational reasons. Paneling 127 is attached directly to a building structure or to mezzanine columns or to paneling support columns 128. Different types of paneling are used in different locations around the grid framework structure, depending on different structural requirements. These include a trapezoidal paneling which is a corrugated metal sheet and used throughout the fulfilment centre to separate the grid areas from walkways (see FIG. 6e). The profile of the trapezoidal paneling shape is shown at the bottom of FIG. 6e. Paneling separating the pick aisle in the chill area may be built of mesh to enable air circulation. The upright columns 116 can be seen through the mesh paneling in FIG. 6fPaneling support posts 128 and panels 127 are fixed along the mezzanine columns using appropriate beam clamps (see FIG. 60. The paneling 127 is attached to paneling support posts 128 as shown in FIG. 6g. The bottom of the paneling is secured to a kick plate (not shown) and the top of the paneling is secured with a capping rail 125 as shown in FIG. 6g. The capping rail 125 is clearly shown in an expanded view to the right of FIG. 6g.

Further detail of the components of the grid framework structure 114 is discussed below.

Upright Columns or Upright Members or Vertical Columns

Figure 7:
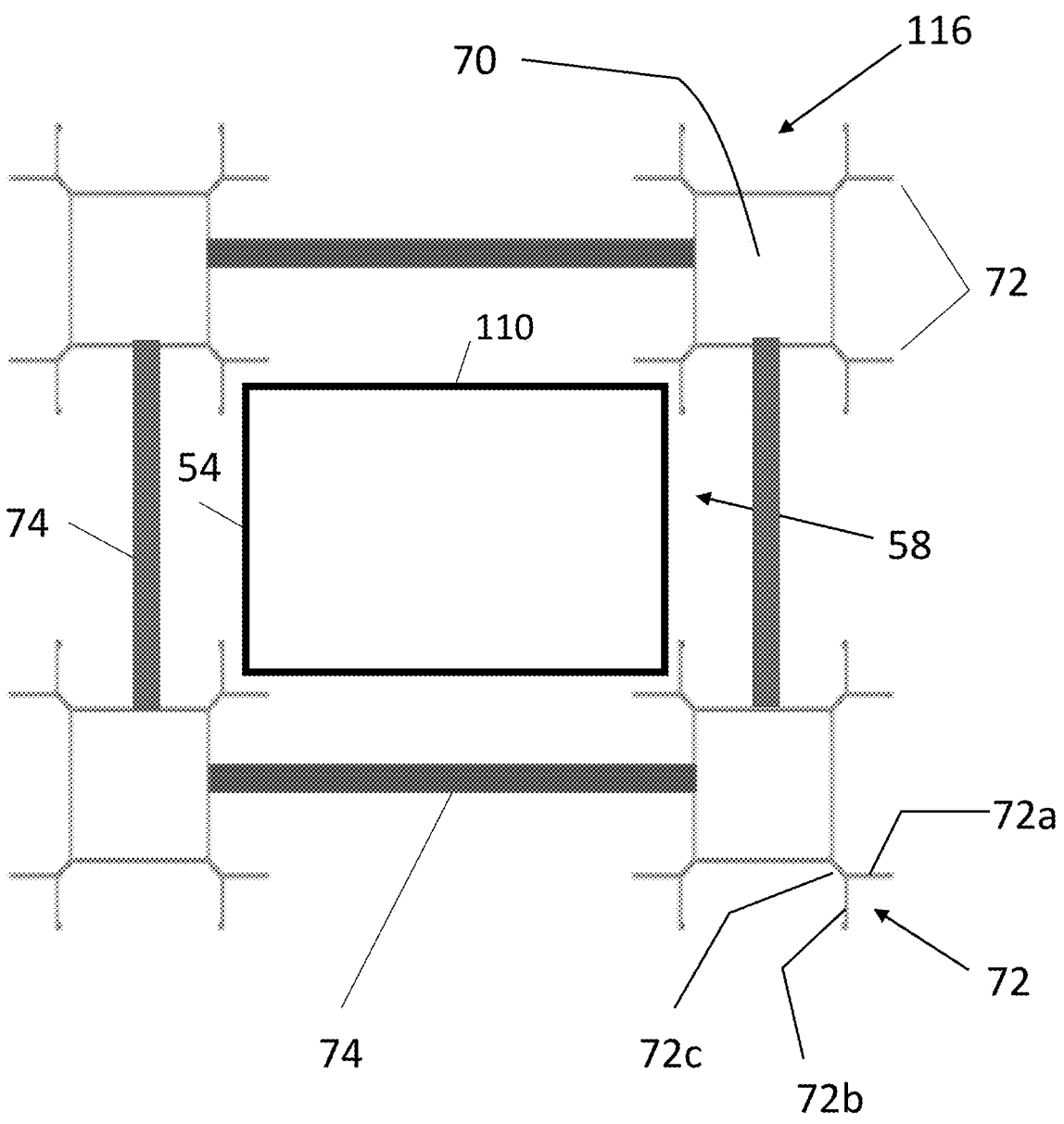
FIG. 7 is a schematic representation of cross-sectional top down view of the arrangement of the upright columns or members in the grid framework structure according to an embodiment of the present invention.

FIG. 7 shows a cross-sectional top view of the upright columns 116 of the present invention arranged within the grid framework structure to provide storage locations 58 (see FIG. 8) for containers 110 in a stack to be guided along the upright columns 116 and through a grid cell 54. The spacing between the upright columns is sized to accommodate one or more containers or storage bins 110 which are generally rectangular in a stack. Each of the upright columns are generally tubular. In transverse cross-section in the horizontal plane of the storage location 58 in FIG. 8, each of the upright columns 116 comprises a hollow centre section 70 with one or more guides 72 mounted to or formed to at least one wall of the upright column 116 that extends along the longitudinal length of the upright column 116 for guiding the movement of the containers. The hollow centre section 70 of the upright columns aides to the low weight of the grid framework structure. In the particular embodiment shown in FIG. 7, the hollow centre section 70 of the upright column is a box section. To at least one corner of the box section is mounted or formed a guide or corner section 72. However, there is no restriction to the cross-sectional shape of the hollow centre section of the upright column being a box section as other shaped cross-sectional sections such as circular, triangular, are applicable in the present invention.

The upright columns 116 are spaced apart as shown in FIG. 7 so that the guides 72 mounted to the corners of different box sections cooperate with each other to provide a single storage location 58 for guiding the movement of containers vertically in a stack along the upright columns. Depending on the position of the upright columns 116 in the grid framework structure, guides 72 are mounted to one or all four corners of the box section of the upright column 116. For example, when forming part of an exterior wall-shaped framework of the grid framework structure only one or two of the corners of the hollow centre section can comprise a guide or corner section 72 so as to cooperate with one or two corners of a container in a stack. In the case, where the upright column 116 is positioned within the interior of the grid framework structure, all four corners of the box centre section comprises a guide or corner section 72, each of the upright columns 116 are arranged for cooperating with the corners of four containers 110.

In the particular embodiment of the present invention, each of the guides 72 are shown as V-shaped or has a 90° cross-sectional profile that is shaped to butt up against or accommodate the profile of the corners of the containers, which are generally rectangular in shape. As shown in FIG. 7, the guides comprises two perpendicular plates 72a, 72b (two container guiding plates perpendicular to each other) that extend longitudinally along the length of the upright column 116. An additional plate 72c shown in FIG. 7 extending along the length of the upright column is used to join the V-shaped guide at the apex of the V-shaped guide to the corner of the hollow centre section 70. The additional plate 72c is used to space the V-shaped guide away from the corner of the hollow centre section 70 so that the guide 72 including the spacer 72c has an overall Y-shaped cross-sectional profile.

The upright columns 116 of the present invention can be formed as a single body, e.g. by means of extrusion. Different materials can be used to fabricate the upright columns including but are not limited to metals, e.g. aluminium, steel or even composite materials that has sufficient structural rigidity to support the grid and the load bearing devices traveling on the grid structure.

Figure 8:
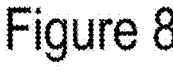
FIG. 8 is a perspective view of a storage space or column within a grid framework structure according to an embodiment of the present invention.

At least a portion of the plurality of the upright columns 116 are held in space relation with each other in the grid framework structure by one or more spacers or struts 74 connected between adjacent upright columns 116 (see FIG. 8). The spacers 74 extend transversely to (or perpendicular to) the longitudinal direction of the upright column 116 and are bolted or riveted to opposing walls of two adjacent upright columns by one or more bolts or rivets. The length of the spacers or struts 72 are sized such that adjacent upright columns 116 are spaced apart sufficiently to occupy one or more containers in a stack between the upright columns 116. FIG. 8 shows a perspective view of four upright columns 116 held in spaced apart relation with each other by one or more spacers or struts 74 to form a storage column or storage location 58 that is sized to accommodate one or more containers in a stack.

The spacers 74 are sized to fit between the corner sections comprising the guides 72 of the upright column 116 so as to allow the upright columns to accommodate a stack of containers between the adjacent upright columns 116, i.e. the spacers do not impede or cross the area (or vertical storage location) occupied by the guides 72 or guiding plates at the corners of the upright column (see FIG. 7). One or more spacers/struts 74 are distributed in spaced apart relation along the length of two adjacent upright columns 116 in the grid framework structure (see FIG. 8). FIG. 8 shows an example of a storage location or storage column of the present invention for occupying one or more containers in a stack comprising four adjacent upright columns held in spaced apart relation within the grid framework structure by one or more spacers or struts 74.

It is essential that the level of the grid in the horizontal plane is substantially flat for the load handling devices, which are largely remotely operated, to travel on the grid structure and to prevent any of the tracks or rails being put under strain due to a variation in the height of one or more of the upright members 116 in the grid framework structure. To mitigate the possible height variation of one or more of the upright columns 116 in the grid framework structure, the height of the grid and thus, its level is adjusted by an adjustable foot 90 at a lower end (first end) of one or more of the upright columns 90 (see FIG. 8).

Figures 9, 10:
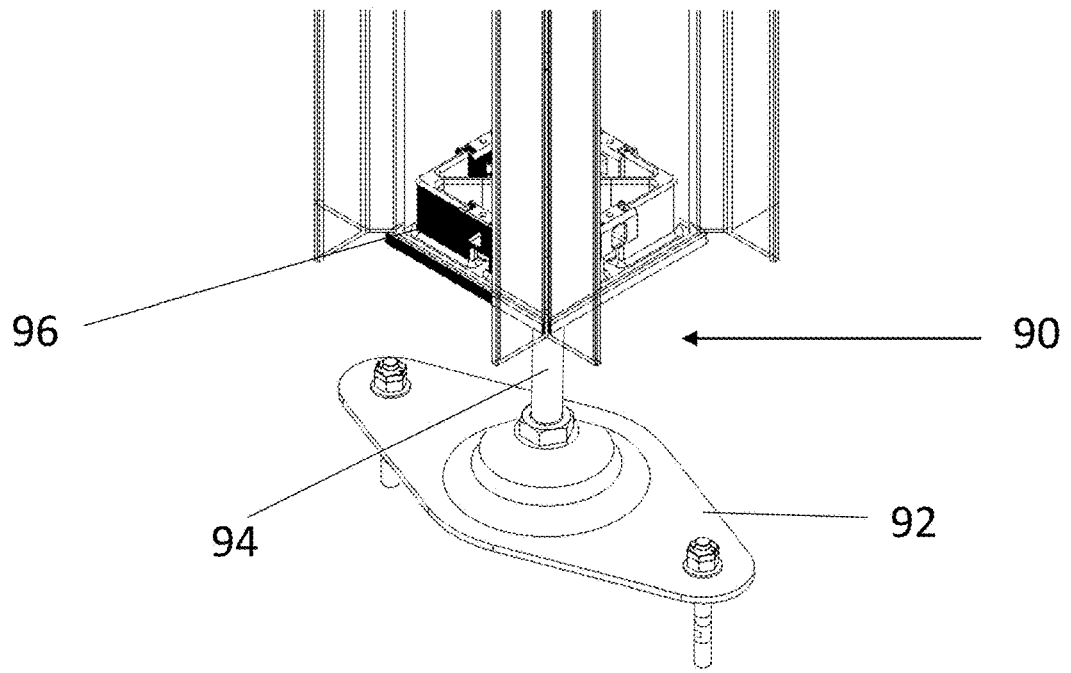
FIG. 9 is a perspective view of an adjustable foot according to an embodiment of the present invention.
FIG. 10 shows a perspective view of the insert portion or cap of the adjustable foot according to the embodiment of the present invention.

The adjustable foot 90 as shown in FIG. 9 comprises a base plate 92 and a threaded spindle or rod 94 that is threadingly engagable with a separate push fit cap or plug 96 as shown in FIG. 10. The push fit cap 96 is arranged to be fitted to the lower end of the upright column 116 in a tight fit so as to adjust the height of the upright column. The push fit cap 96 as shown in FIGS. 9 and 10 comprises an insert portion 98 that is shaped to be inserted into the hollow centre section of the upright column. A lip 100 is formed around the periphery of the insert portion 98 that is arranged to butt up against the rim of the hollow centre section 70 when the insert section 98 is received within the hollow centre section of the upright column. The push fit cap or plug 96 comprises one or more compression clips or retaining clips 102 arranged around the insert portion 98 so as to form a tight fit when the insert portion 98 of the push fit cap or plug 96 is inserted into the hollow centre section 70 of the upright column 116. In the particular embodiment of the present invention, the insert portion 98 is shaped to form a tight fit when inserted into the box section of the upright column. To create a tight fit between the insert portion 98 and the hollow centre section of the upright column 116, the insert portion 98 comprises four walls 104 with one or more cut outs 106 in each of the walls 104 to seat one or more of the retaining clips or compression clips 102. The one or more retaining clips 102 can be composed of a resilient material, e.g. rubber. Together with the retaining clips 102, the insert portion 98 is slightly oversized than the hollow centre section 70 (which is a box section) of the upright column 116 so as to form a tight fit when the insert portion 98 is inserted into the box section 70 of the upright column 116. Another way of describing the push fit cap or plug 96 comprises four corner sections, wherein each of the four corner sections comprises two perpendicular strips or plates that is arranged at a corner of a base plate of the push fit or plug 96. Spaces between the corner sections are sized to receive one or more retaining clips 102.

The push fit cap 96 comprises a threaded hole 108 to threadingly engage with the threaded spindle 94 of the adjustable foot 90. One or more webs 115 extending from each apex of the corner sections to the threaded hole 108 reinforce the structural integrity of the push fit cap 96. The push fit cap 96 of the present invention can fabricated from metal or other suitable material, e.g. metal, plastics, ceramic, and can be formed from separate parts, preferably formed as a single body, e.g. casting or moulding.

In use, the threaded spindle 94 threadingly engages with the threaded hole 108 of the push fit cap 96. Rotation of the threaded spindle 94 varies the distance between the base plate 92 resting on the floor and the push fit cap 96 and thereby, varies the height of the upright column in the grid framework structure.

Braced Tower

The grid framework structure 114 can be considered as a free standing (or self-supporting) rectilinear assemblage of a plurality upright columns 116 supporting a grid formed from intersecting horizontal beams or grid members, i.e. a four wall shaped framework. While the spacers or struts 74 connecting adjacent upright columns 116 provide some degree of structural rigidity of the grid framework structure 114, structural rigidity and moment resistance of the grid framework structure is largely provided by incorporating one or more truss assemblies or braced towers 80 at least partially around the periphery and/or within the body of the grid framework structure (see FIG. 6). The truss assembly may have a triangular or other non-trapezoidal shape. For example, the truss assembly can be any type of truss that provides structural rigidity to the grid framework structure against lateral forces including but are not limited to Warren Truss or a K Truss or a Fink Truss or a Pratt Truss or a Gambrel Truss or a Howe Truss. Bolts or other suitable attachment means may be used to secure the diagonal braces to the upright columns.

Figure 11:
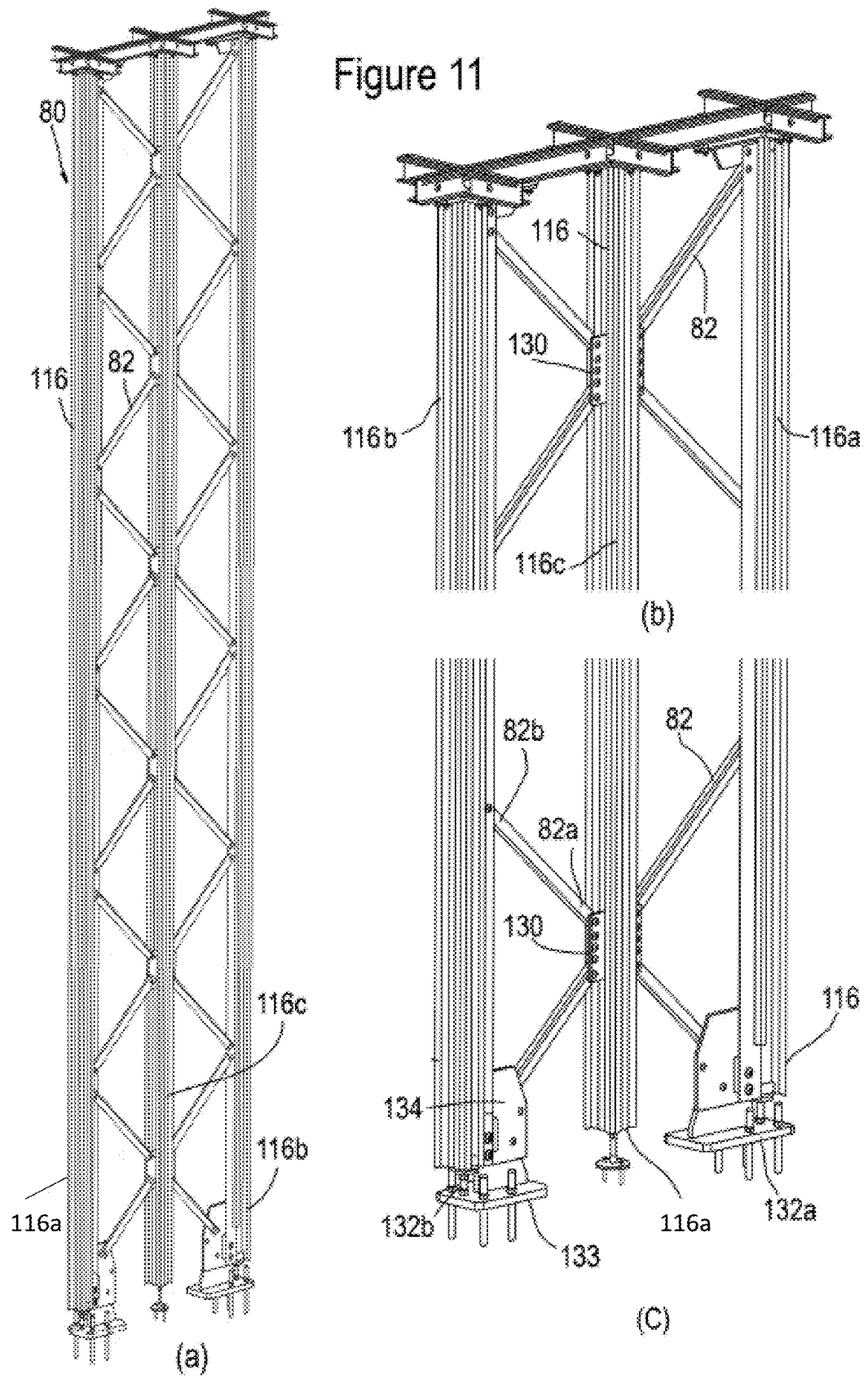
FIG. 11(a to c) is a schematic view of a braced tower according to an embodiment of the present invention.

The braced tower 80 as shown in FIG. 11 according to an embodiment of the present invention can be formed by rigidly joining a sub-set or sub-group of the plurality of upright or vertical columns 116 by one or more angled or diagonal braces or diagonal bracing members 82. For the purpose of the present invention, the diagonal braces 82 cooperate with the upright columns 116 in a braced tower 80 to form one or more triangles. The sub-set of the plurality of upright columns that are braced together to form the braced tower 80 of the present invention can be two or more adjacent upright columns 116 lying in a same or in a single vertical plane and joined together by one or more diagonal braces 82. Putting it another way, two or more adjacent upright columns 116 connected by one or more diagonal braces 82 lie in the same or single vertical plane, i.e. they are co-planar. By bracing one or more sub-groups of the upright columns 116 internally within the grid framework structure by one or more diagonal braces 82, the structural rigidity of the grid framework structure is improved.

Not all of the upright columns 116 are rigidly connected together by a bracing assembly. The remaining upright columns that do not form part of the braced tower 80 are held in space relation within the grid framework structure by one or more spacers or struts 74 as discussed above (see FIG. 8). Typically, the one or more spacers 74 are fabricated from sheet metal, e.g. steel. FIG. 12 shows a top plan view or a bird's eye view of a portion of the grid framework structure showing the distribution of the braced towers and the spacers linking adjacent upright columns 116 together according to one example of the present invention. Here, three braced towers 80 can each be shown as a sub-group of three upright columns 116a, 116b, 116c, each of the three braced towers lie in a single vertical plane, i.e. they are co-planar. The remaining upright columns that are not connected by one or more diagonal braces, are held in spaced apart relation in the grid framework structure by one or more spacers or struts 74, 74b. In comparison to the one or more diagonal braces 82 connecting adjacent upright columns 116a, 116b, 116c in a braced tower 80, the spacers or struts 74, 74b extend in a direction perpendicular to the longitudinal direction of the upright column 116. This can be clearly shown in the example of a storage column shown in FIG. 8.

FIG. 12 shows the distribution of the spacers 74, 74b separating the upright columns 116. FIG. 12 shows that there are two types of spacers 74, 74b connecting adjacent upright columns to the upright columns 116 forming the braced tower 80. The upright columns 116a, 116b, 116c forming the braced tower 80 are connected to one or more diagonal braces 82. The spacer 74b lying or extending in a vertical plane perpendicular to the vertical plane in which the upright columns of the braced tower 80 lie are largely structural spacers 74b and the spacers 74 extending laterally or to the side of the braced tower 80 to adjacent upright columns 116 are largely a standard spacer 74. The two different types of spacers 74, 74b is dependent on whether one or more spacers are lying in a plane perpendicular to the vertical plane in which the upright columns 116a, 116b, 116c of the braced towers 80 lie or lying in the same vertical plane as the braced tower 80 (braced tower lie in a single plane). In an example of the present invention, upright columns 116a; 116b, 116c forming the braced tower 80 can be connected to adjacent upright columns by one or more structural spacers or struts 74b that extend in the vertical plane perpendicular to the vertical plane in which the braced tower lie. Putting it another way, the upright columns 116a, 116b, 116c making up the braced tower 80 lie in a first vertical plane and the structural spacers 74b connecting the braced tower 80 to adjacent upright columns 116 lie in a second vertical plane; the second vertical plane being perpendicular to the first vertical plane. A structural spacer 74b is different to the spacer (standard spacer) 74 connecting the other remaining upright columns together within the grid framework structure in that it is more substantial comprising one or more reinforcements to structurally support the spacer 74*b*. The reinforcements include but are not limited to the thickness or gauge of the sheet metal making up spacer or the inclusion of a reinforcement beam. However, there is no restriction to the same type of spacer that is used to space the upright columns 116 within the grid framework structure being used to connect the remaining upright columns 116 adjacent the braced tower 80 of the present invention, i.e. the remaining upright columns that are not braced by one or more diagonal braces are spaced apart by a standard spacer 74 throughout the grid framework structure.

The number of sub-groups of the upright columns rigidly connected together by the brace assembly (one or more diagonal braces) within the grid framework structure to form the braced tower 80 of the present invention and thus, the distribution of braced towers 80 is dependent on a number of factors including but is not limited to ground condition, e.g. soil condition, environmental factors such as temperature, and the lateral forces generated by the load handling devices. In a particular embodiment of the present invention, braced towers 80 are distributed within the grid framework structure to provide support from external forces in the x and y direction. To do this, one or more of braced towers 80 are oriented within the grid framework structure 114 such that one or more of the braced towers 80 lie in a first vertical plane and one or more braced towers lie in a second vertical plane, the first vertical plane being perpendicular to the second vertical plane. In another example, the braced towers 80 can alternate amongst the upright columns 116 within the body of the grid framework structure such that each braced tower is adjacent to an equal number of upright columns 116. The braced towers 80 are separated from adjacent upright columns within the grid framework structure by one or more spacers or struts 74, 74*b* as discussed above. In a given storage system comprising a grid framework structure, the number of upright columns occupied by the braced tower (i.e. rigidly connected together one or more diagonal braces) is in the region of 2% to 50% of the upright columns.

To maximise the available space or area for the storage of containers, a sub-set or sub-group of adjacent upright columns 116 forming the braced tower 80 and the one or more diagonal braces 82 connecting the sub-set of upright columns together all lie in the same or single vertical plane, i.e. they are co-planar. The one or more diagonal braces 82 connecting the sub-set of adjacent upright columns 116 in a braced tower constitute a bracing plane. In the braced tower of the present invention, the upright columns of the braced tower lie in a vertical plane that is parallel to the bracing plane. By bracing one or more adjacent upright columns lying in a single vertical plane or which are co-planar, the ability of the upright columns being arranged to accommodate a stack of containers is not compromised, i.e. increases the density of containers that can be stored in the grid framework structure. In other words, the bracing members 82 do not cross a storage location in which containers are stacked nor does it impede with the containers being guided along adjacent upright columns.

In the particular embodiment of the present invention shown in FIG. 11, each of the braced towers 80 comprise three upright columns in parallel relation and lie in a single vertical plane (co-planar) that are rigidly connected together by a plurality of diagonal braces 82. Two of the three upright columns 116*a*, 116*b* are laterally disposed either side of a middle upright column 116*c* and the two laterally disposed upright column 116*a*, 116*b* are rigidly connected to the middle upright column 116*c* by a plurality of diagonal braces 82. Another way of describing the braced tower 80 is two outer upright columns 116*a*, 116*b* either side of a middle upright column 116*c*. In each of the braced towers 80, the outer upright columns 116*a*, 116*b* are joined together by one or more cross bracing members with the middle upright column 116*b* meeting at the intersection of a cross brace (more specifically, bracing members 82 are used connect the outer upright column to the middle upright column 116*c* either side of the middle upright column) as shown in FIG. 11.

In the braced tower 80 of the present invention, one end of a diagonal bracing member 82 is connected to the middle upright column by a joining plate 130. The joining plate 130 is inserted into a slot through the hollow centre section of the middle upright column 116*c* in a direction perpendicular to the longitudinal direction of the upright column. As shown in the expanded view of the middle upright column in FIG. 14, the joining plate 130 is inserted through a slot in opposing walls of the hollow centre section 70 of the upright column.

Each of the diagonal bracing members 82 has a width that allows them to fit between two of the parallel guiding plates or guides at the corners sections 72 of an upright column 116 and therefore, the diagonal braces 82 does not compromise the ability of the upright column 116 to accommodate a stack of containers. Putting it in a different way, the diagonal bracing members 82 do not intersect or cross an adjacent guide or guiding plates 72 at the corner of the upright column (see FIG. 7). To prevent the bracing members 82 impeding adjacent guide plates and thereby, compromise the area or storage location to accommodate a stack of containers, the slot for accommodating the joining plates 130 extends between the guides 72 at the corners of the upright column 116 such that when the bracing members 82 are connected to the joining plate 130, the bracing members 82 do not impede the guides 72 for guiding a container vertically along the upright columns 116.

Figure 13:
FIG. 13 is a schematic view of a flange connecting the diagonal braces to the braced tower according to the embodiment of the present invention.

Opposing ends of the joining plate 130 comprises one or more holes to fixedly attach to the end of the diagonal bracing members 82 by means of suitable bolts. Both ends of the joining plate 130 are fixedly attached to the diagonal bracing members 82 either side of the middle upright column 116*c* such that the joining plate 130 is put under tension in the braced tower 80. A second end 82*b* of the bracing members 82 is bolted to the outer upright column 116*a*, 116*b* by means of a flange plate 122 fixedly attached to the outer upright column 116*a*, 116*b* (see FIG. 13)—a first end 82*a* of the diagonal brace 82 is connected to the joining plate 130. In the particular embodiment of the present invention shown in FIG. 13, the flange 122 comprises a steel angle bolted 123 to the outer upright columns 116*a*, 116*b*. To ensure that the ends of the diagonal braces 82 are connected between the guides 72 and therefore, do not interrupt with one or more containers travelling along the guides, the flange 122 is fixedly attached between the guides 72 and enables the second end 82*a* of the diagonal braces 82 to connect between the guides 72.

Figure 14:
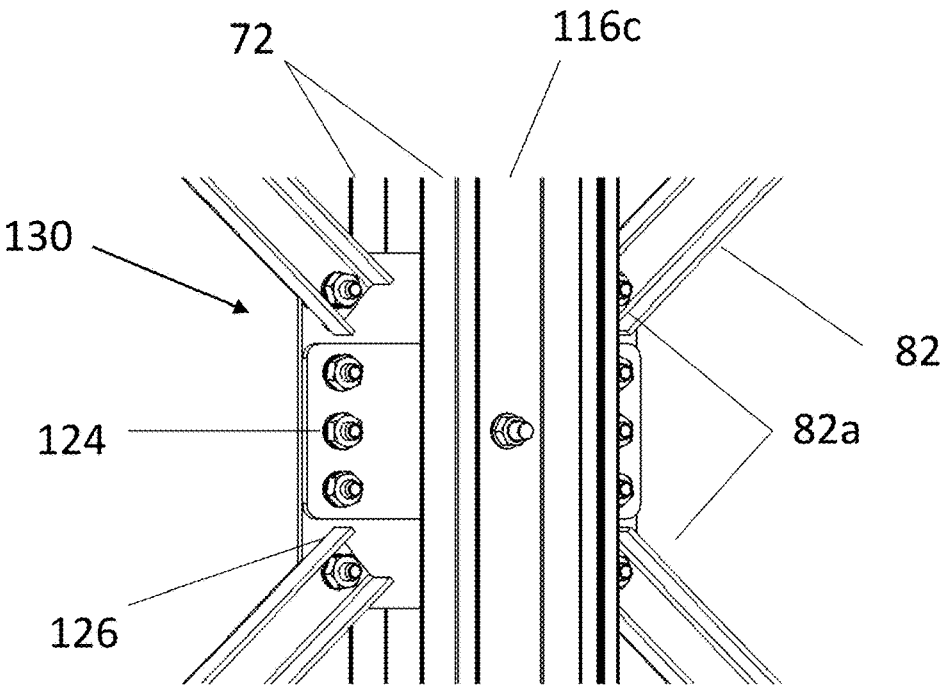
FIG. 14 is an expanded view of the braced tower showing the connection of the diagonal braces to the middle upright column according to an embodiment of the present invention.

To fix the diagonal bracing members 82 to the joining plate 130 according to a first embodiment of the present invention shown in FIG. 14, the joining plate 130 comprises an insert plate 124 arranged to be inserted through the slot extending through the hollow centre section 70 of the middle upright column 116*c*. Bolted to either side of the insert plate 124 are wing plates 126 for connecting the bracing member 82 to the joining plate 130. The use of multiple plates 124, 126 making up the joining plate 130 allows for a smaller insert plate 124 to be used and thus, the wing plates 126 bolted to the insert plate 124 bears the load applied to the joining plate 130. However, the problem with the joining plate 130 according to the first embodiment of the present invention shown in FIG. 14 is that multiple bolts are need to rigidly connect the bracing member 82 to the middle upright column 116c. In the particular embodiment of the present invention shown in FIG. 14, each of the wing plates 126 is bolted to the insert plate 124 by four bolts. An additional two bolts are used to connect the ends (second end) of the bracing member 82 to the top and bottom of each of the wing plates 126.

Figure 15:
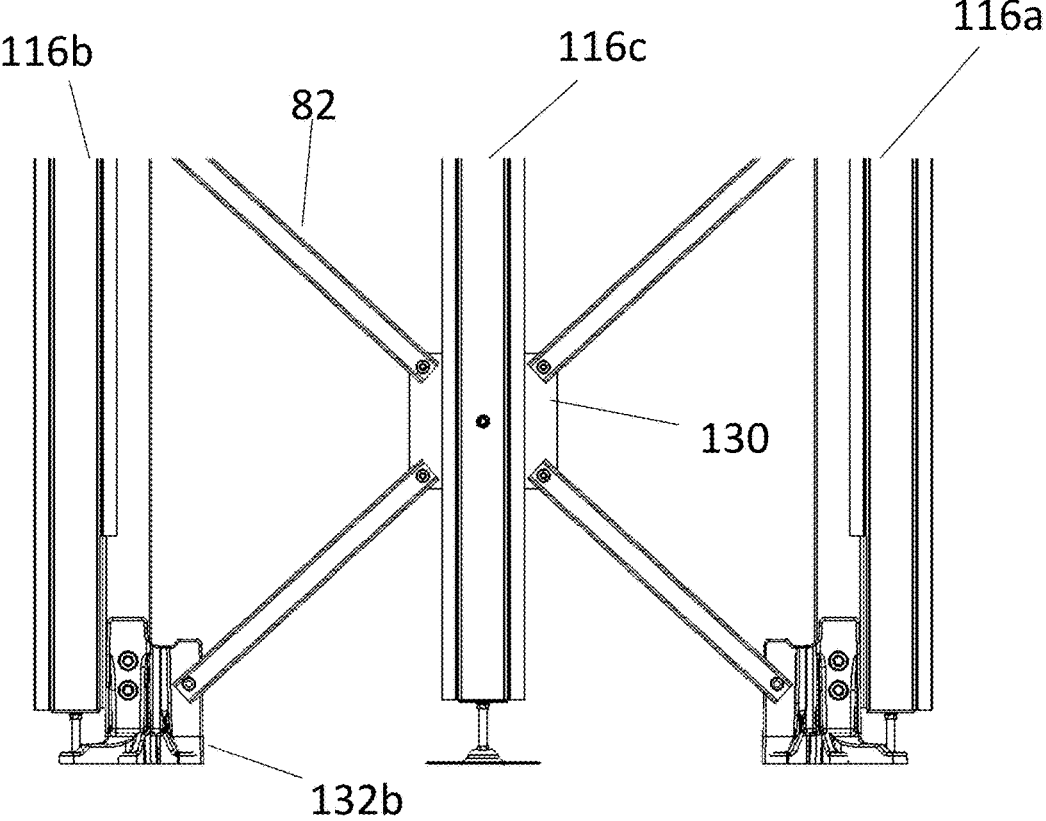
FIG. 15 is an expanded view of the braced tower showing the connection of the diagonal braces to the middle upright column according to another embodiment of the present invention.

In an improved version of the joining plate 130 according to a second embodiment of the present invention as shown in FIG. 15 is shown as a single joining plate 130 as opposed to multiple joined plates. The insert plate and the wing plate are fabricated as a single joining plate 130 that is sized to be inserted into a slot in the middle upright column 116c. The removal of the separate wing plates removes the need to bolt separate wings plate to the insert plate and thereby, removes the need to have multiple bolts to connect the diagonal bracing members 82 to the middle upright column 116c. In the particular embodiment of the present invention, a single joining plate 130 is inserted into a slot extending in the hollow central portion of the middle upright column 116c. Bracing members 82 are bolted to each corner of the joining plate 130. To accommodate the joining plate 130 according to a second embodiment of the present invention without affecting the structural integrity of the upright column and without affecting the storage location for accommodating a stack of containers between adjacent upright columns, the hollow centre section of each upright column can be made larger, i.e. the cross sectional area of the hollow centre section 70 is made bigger. In the case, where the hollow centre section of the upright column is a box section comprising four walls, the width of the walls are increased to provide a larger box section 70 to accommodate the joining plate 130 without impeding on the guides 72 at the corners of the box section 70.

Multiple joining plates 130 are spaced apart along the longitudinal length of the middle upright column 116c so that the diagonal bracing members 82 connected between the outer upright columns 116a, 116b and the middle upright column 116c form a series of triangular braces either side of the middle upright column 116c. The bracing members either side of the middle upright column 116c work together with the outer upright column 116a, 116b to provide a unitary truss assembly or braced tower 80 having a cross-brace.

Braced Tower Foot

One or more braced towers 80 are anchored to a concrete foundation. The braced towers 80 function to transfer the lateral forces experienced by the grid 50 to the floor. The braced towers 80 are anchored to the concrete foundation by one or more anchor feet 132 (see FIGS. 11 and 15). In the particular embodiment shown in FIG. 11 and FIG. 15, the outer upright columns 116a, 116b or the laterally disposed upright columns 116a, 116b are anchored to the concrete foundation by one or more anchor feet 132 and the middle upright column 116c is supported on an adjustable foot 90 as discussed above. The lower end (first end) of the braced tower is anchored to the concrete foundation by one or more anchor bolts. Various types of anchor feet 132a, 132b to rigidly anchor the braced tower to the concrete foundation is applicable in the present invention. The anchor foot functions to bear the upright column load and the bracing load of the bracing assembly 82 of the braced tower 80.

Figure 16A:
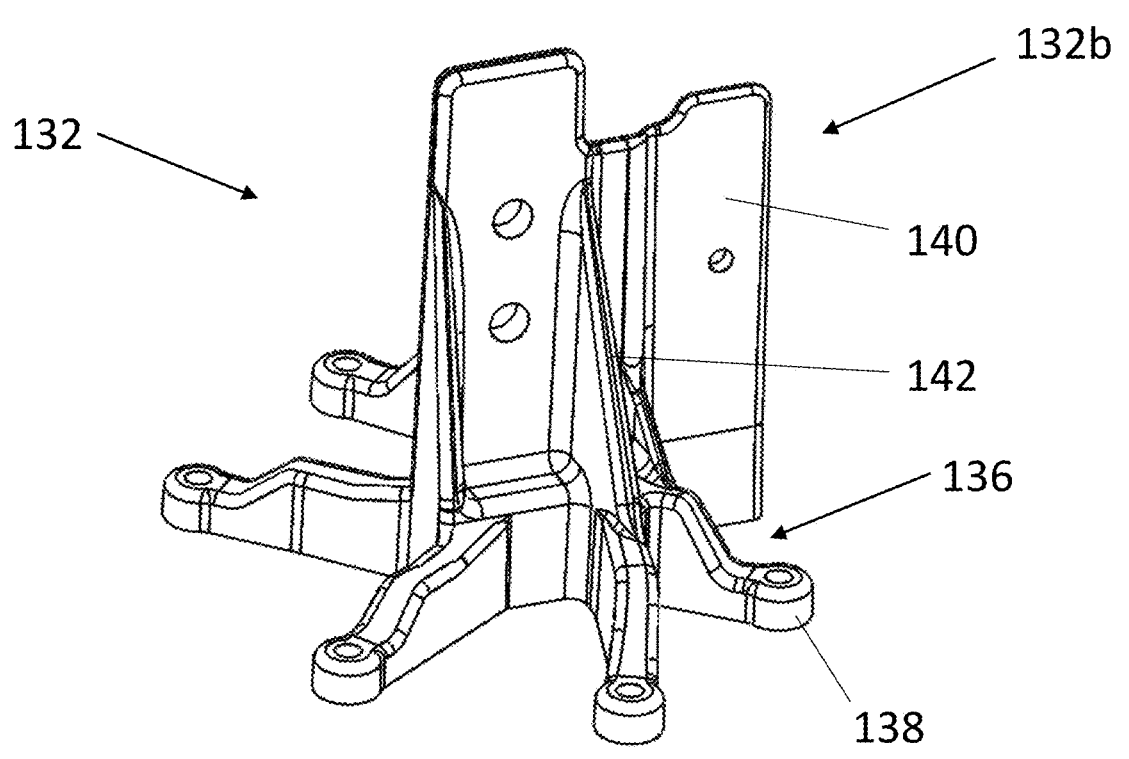
FIG. 16a is a side view of an anchor foot according to a second embodiment of the present invention.
Figure 16B:
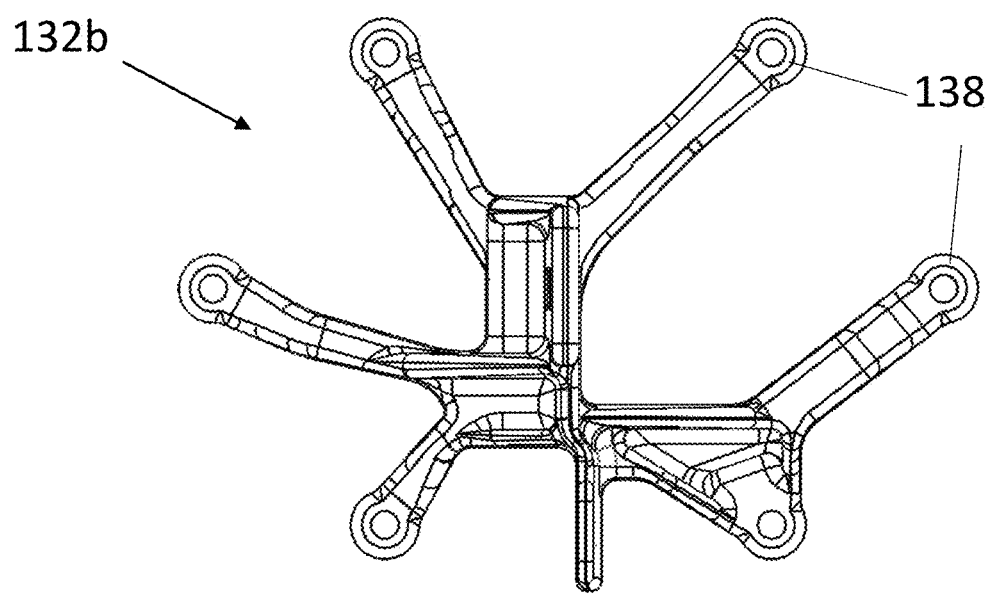
FIG. 16b is a top down view of the anchor foot according to the second embodiment of the present invention

FIGS. 11c and 16 show two examples of the anchor foot that is used to anchor the braced tower to the concrete foundation according to the present invention. In comparison to the anchor foot shown in FIG. 16, the anchor foot shown in FIG. 11c is more substantial in terms of size and weight in comparison to the anchor foot shown in FIG. 16. The anchor foot 132a shown in FIG. 11c is fabricated as a T-joint comprising a base plate 133 lying in a horizontal plane for anchoring to the floor by one or more anchor bolts and an anchor plate 134 perpendicular to the base plate 133 for attaching to the lower end of the upright column and the ends of the bracing member 82. The anchor plate 134 is orientated such that the surface of the anchor plate 134 with the greatest surface area lies in the same vertical plane as the three upright columns 116a, 116b, 116c of the braced tower 80, e.g. the surface of the anchor plate 134 with the greatest surface area and the upright members 116a, 116b, 116c of the braced tower 80 are co-planar. The problem with the anchor foot 132a shown in FIG. 11c is the substantial weight and thus, cost to fabricate the anchor foot.

FIG. 16 shows an alternative anchor foot 132b for anchoring the braced tower 80 to the concrete foundation according to second embodiment of the present invention. Instead of a solid rectangular base plate 133, the anchor foot is topology optimised that optimizes the materials layout within a given design space for a given set of loads. Two loads considered in the topology optimisation of the anchor foot are the loads from the upright columns 116a, 116b, 116c and the bracing members 82. Based on the constraints given by the applied loads, the anchor foot 132b of the present invention comprises a stabiliser 136 comprising a plurality of discrete fingers or digits 138 extending from an upright portion 140 such that loads are distributed amongst the plurality of fingers 138, e.g. separate fingers. In the particular embodiment of the present invention shown in FIG. 16, the upright portion 140 comprises an anchor plate arranged to rigidly connect to the upright column 116a, 116b and the diagonal brace 82 by one or more bolts so as to bear the load of the upright column 116a, 116b and the applied load of the diagonal brace 82. Like the anchor plate 134 of the first embodiment of the present invention shown in FIG. 11 c, the anchor plate 140 is oriented such that the surface of the anchor plate 140 with the greatest surface area lies in the same vertical plate as the three upright columns 116a, 116b, 116c making up the braced tower 80 of the present invention (see FIG. 11). Using the terminology of the present invention, the upright columns 116a, 116b, 116c, the diagonal braces 82 and the surface of the anchor plate 134, 140 all lie in the same plane, i.e. they are co-planar.

One or more of the discrete fingers 138 of the anchor foot 132b extend or span out or extend outwardly in two or more different directions from the upright portion 140 so as to provide improved stability of the anchor foot 132b. One or more of the fingers 138 are of different lengths to aid with the stability of the anchor foot 132b of the present invention. The length of the fingers 138 can be different so provide different levels of stability of the braced tower 80. One or more connecting webs 142 are used to support the one or more of the fingers 138 from axial movement. The anchor foot 132b is anchored to the concrete foundation by one or more bolts through holes in the fingers 138 of the anchor foot 132b.

In the particular embodiment of the present invention, five fingers 138 of varying length are shown (see FIG. 16b) that extend from the upright portion 140 with holes at the distal ends of the fingers 138 for anchoring the anchor foot to the ground via an anchor bolt. The anchor foot 132b according to the second embodiment of the present invention can be formed as a single body, e.g. casting, or separate parts joined together, e.g. welding.

Grid Structure

Figures 17, 18:
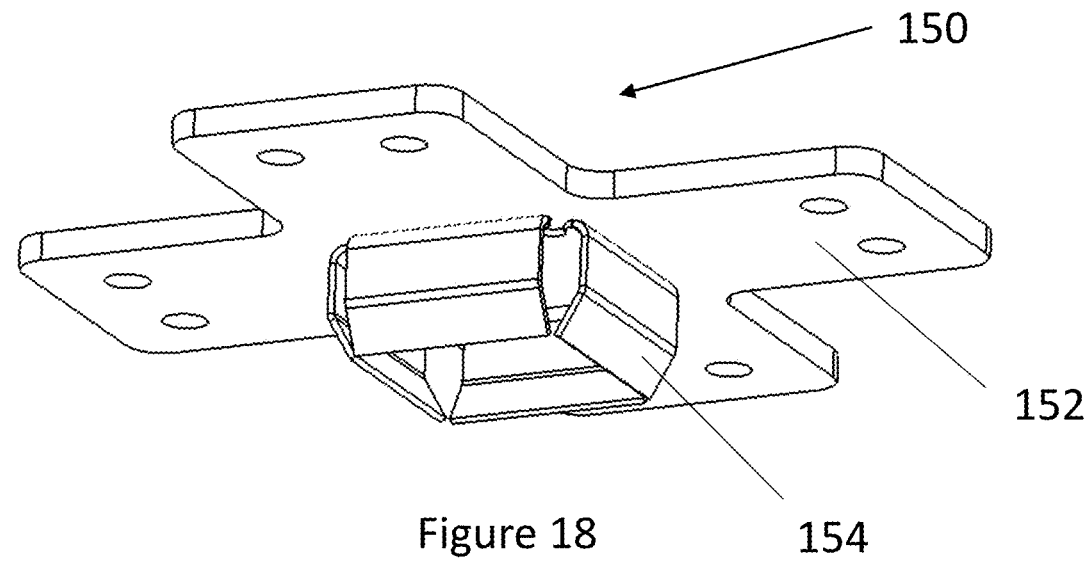
FIG. 17 is a perspective view showing the pattern the grid elements of the grid according to an embodiment of the present invention.
FIG. 18 is a perspective view of the cap plate for joining adjacent grid elements at the intersections according to an embodiment of the present invention

Mounted to the upright columns 116 is a grid 50 comprising a plurality of grid members 118, 120 arranged to form a grid pattern comprising one or more rectangular frames each of the rectangular frames constituting a grid cell 54 that are positioned above a storage location for one or more containers in a stack to be retrieved by a load handling device operative on the grid. The grid comprises a first set of parallel grid members 118 extending in a first direction x and a second set of parallel grid members 120 extending in a second direction y. The second set of grid members 118 is perpendicular to the first set of grid members 120 in a substantially horizontal plane to form a grid structure comprising a plurality of grid cells 54. As the grid lies in the horizontal plane, the first and the second direction are in the X axial direction and in the Y axial direction respectively (see FIG. 17). The plurality of upright columns are interconnected at their top ends by the first set of grid members 118 extending in the first direction and the second set of grid members 120 extending in the second direction. Further details of the interconnection between the grid members at the top end of the upright columns is discussed below. FIG. 17 shows a top view of a grid structure 50 according to an embodiment of the present invention.

Each of the grid members 118, 120 comprises a track support to which is mounted a track. The track can be a separate component to the grid member or alternatively, the track support is integrated into the grid member as a single body, i.e. forms part of the grid member. The load handling device is operative to move along the track of the grid. The grid is supported by a plurality of the upright columns at each of the intersections of the horizontal grid members 118, 120. The term 'intersections' is construed in the broadest sense to cover the junction where the grid members cross at an upper end of an upright column or the ends of the grid members 118, 10 meet at the upright columns. For the purpose of explanation, the lower end of the upright column mounted to the floor constitutes the first end of the upright column and the upper end of the upright column adjacent the grid 50 constitutes the second end of the upright column.

The sets of parallel grid members 118, 120 can be sub-divided into subsets of grid members extending in the first (118a, 118b) and/or second direction (120a, 120b) of the grid framework structure. A subset can constitute at least one grid member extending in either first direction or the second direction in a set, e.g. a single grid member. At least one grid member in a subset, e.g. a single grid member, can be sub-divided or sectioned into discrete grid elements (119a, 119b, 119c etc and 121a, 121b, 121c etc) that can be joined or linked together to form a grid member 118, 120 extending in the first direction or in the second direction. The discrete grid elements 119, 121 making up the grid extending in the first axial direction (119) and in the second axial direction (121) are shown in FIG. 17.

Figure 19:
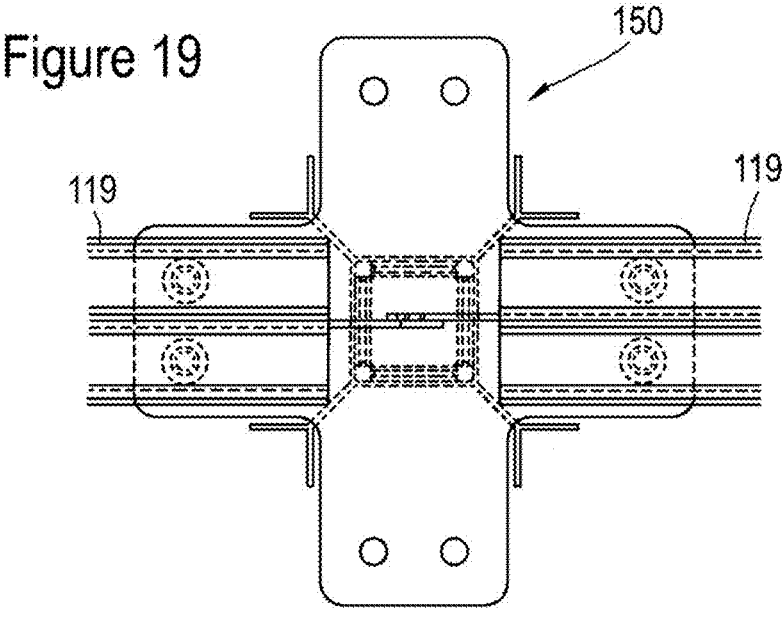
FIG. 19 is a perspective view of the cap plate linking adjacent grid elements by connecting the end of a grid element at the intersections according to an embodiment of the present invention.
Figure 20:
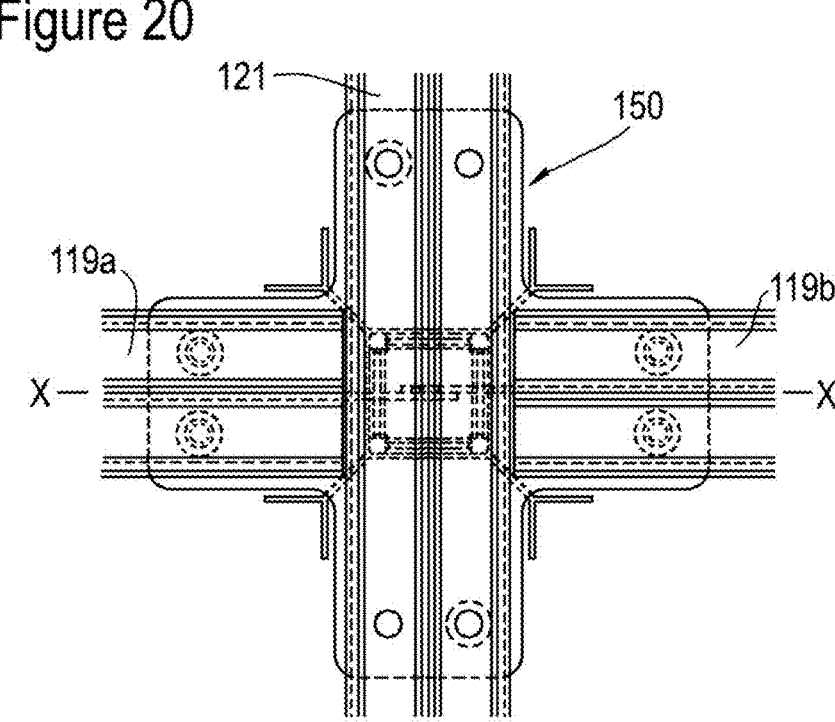
FIG. 20 is a perspective view of the cap plate linking adjacent grid elements at the intersections by connecting a centre section of a grid element and an end of an adjacent grid element according to the embodiment of the present invention.
Figure 21:
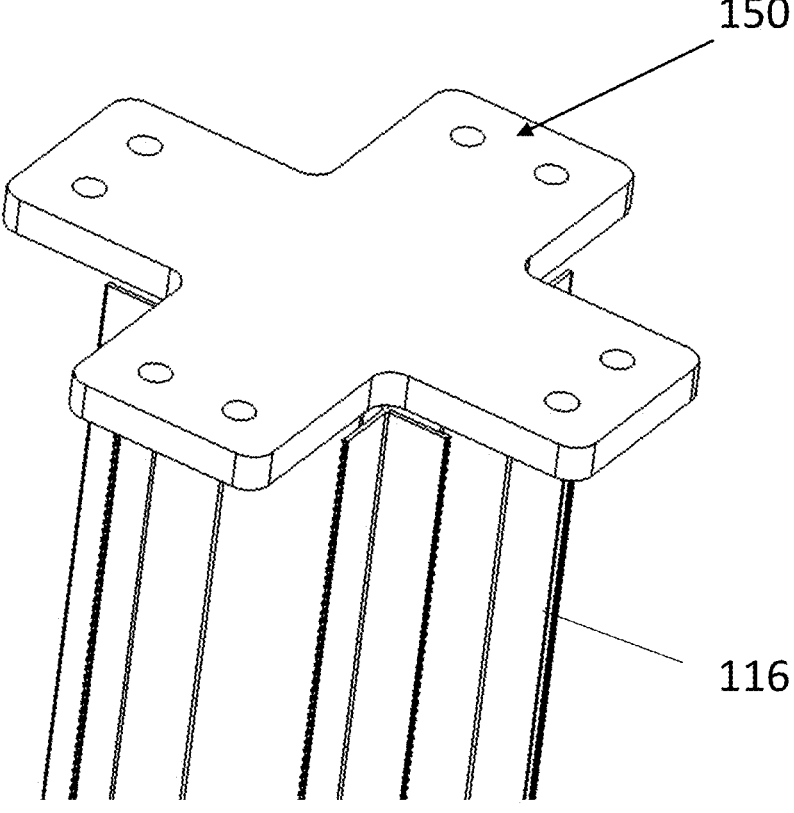
FIG. 21 is a perspective view of the cap plate fitted to an upright column for connecting adjacent grid elements together at the intersection where the grid elements cross according to an embodiment of the present invention.

A connection plate or cap plate 150 as shown in FIG. 18 can be used to link or join the individual grid elements (119a, 119b, 119c etc and 121a, 121b, 121c etc) together in a subset in both the first and the second direction at the junction where multiple grid elements cross in the grid structure, i.e. the cap plate 150 is used to connect the grid elements together to the upright columns 116. As a result, the upright columns are interconnected at their upper ends at the junction where the multiple grid elements cross in the grid structure by the cap plate 150. As shown in FIG. 18, the cap plate 150 is cross shaped having four connecting portions 152 for connecting to the ends or anywhere along the length of the grid elements 119, 121 at their intersections (see FIGS. 19 and 20). For example, the cap plate 150 can be used to connect to the ends of four grid elements 119, 121 as shown in FIG. 19. In FIG. 19, the ends of two grid elements 119a, 119b are connected to the cap plate 150. Alternatively, the cap plate 150 can used to connect to three grid elements by connecting to a point anywhere along the length of one grid element 121 and the ends of two other adjacent grid elements 119a, 119b as shown in FIG. 20. The cap plate 150 comprises a spigot or protrusion 154 that is sized to sit in the hollow central section 70 of the upright column 116 (at the second end of the upright column) in a tight fit for interconnecting the plurality of upright columns to the grid members as shown in FIG. 21. The connecting portions 154 are perpendicular to each other to connect to the grid members 118, 120/grid elements 119, 121 extending in the first direction and in the second direction. The cap plate is configured to be bolted to the ends of the grid elements or along the length of the grid elements. However, the cap plate does not necessarily need to be cross shaped as the number of connecting portions of the cap plate can be dependent on whether the cap plate is positioned at the corner of the grid framework structure or at one of the walls of the grid framework structure. For the purpose of explanation of the present invention, the intersections where the grid members cross at the upright columns constitute the nodes of the grid. Bending moments of the grid are concentrated at the nodes of the grid.

Various pattern arrangements of the grid members 118, 120 can be used to generate the grid 50 of the present invention. For example, the grid members in a sub-set can be sub-divided into multiple discrete grid-elements 119a, 119b in the first direction and multiple discrete grid-elements 121a, 121b in the second direction. Each of the multiple grid elements can be bolted to the cap plate 150 at their respective ends in the first direction and in the second direction (X- and and Y-direction), i.e. the grid elements are joined by their ends in the grid by the cap plates in the first direction and the second direction. Thus, the length of each of the grid elements in both axial directions are sized to lie between two adjacent upright columns 116.

The problem with this arrangement is that the grid would require multiple cuts of the grid elements to connect to each of the upright columns in the grid framework structure. As a result, lateral forces experienced by the grid are concentrated at the joints or nodes between the ends of the grid elements and the cap plate 150. Such an arrangement does not provide the best overall distribution of the lateral forces and structural integrity of the grid. An alternative arrangement to improve structural rigidity of the grid would be to have different lengths of the grid elements 119, 121 along either the first direction or the second direction or both. For example, two or more of the grid elements are sized to extend or span over one or more upright columns 116 in the first direction and connected to the cap plate 150 anywhere along the length of the grid element. In the second direction perpendicular to the first direction, the ends of the grid elements are connected to the cap plate. Whilst this arrangement may be beneficial in terms of improving the structural integrity of the grid, this may not be considered economical as multiple cuts of the grid members are necessary. Also, the need to assemble and connect different lengths of the grid elements to the upright columns adds to the complexity of assembling the grid.

The present applicant has realised that arranging the grid elements of the grid members to create a pattern having a woven-like appearance or brick like appearance so that adjacent parallel grid elements in the first direction are offset by at least one grid cell 54 as shown in FIG. 17 improves both the structural integrity of the grid as well as be able to use the same length grid elements in either the first direction and the second direction. Similarly, adjacent parallel grid elements are arranged in the second direction so as to be offset by at least one grid cell 54. In an exploded view of the grid pattern shown in FIG. 22, adjacent parallel grid elements (119*a* and 119*b;* 121*a* and 121*b*) are arranged in the grid so that the adjacent parallel grid elements in the first direction and the second direction are offset by a single grid cell 54. For example, in FIG. 22, grid element 119*a* is offset from grid element 119*b* in the first direction by a single grid cell 54. Similarly, grid element 121*a* is offset from grid element 121*b* in the second direction by a single grid cell 54. Such a woven-like appearance is termed a lamellar pattern according to the terminology used in the present invention. In this arrangement of the grid, the same size grid elements can be used throughout most of the grid structure—much like the same size bricks are used to create a brick-like appearance where the bricks are arranged in a staggered arrangement. As can be made apparent in FIG. 17, the pattern of grid elements are arranged so that adjacent grid elements in the first direction and in the second direction interdigitate.

To achieve this pattern, the length of one or more of the grid elements 119, 121 of a grid member 118, 120 are sized to extend or span across the upper ends of one or more upright columns in the first direction and/or in the second direction as opposed to all being sized to connect by its ends to the upright columns in the grid framework structure. As a result of this arrangement, one or more of the grid elements in the first direction 119 and in the second direction 121 are secured to the upright column via the cap plate 150 at various positions along the length of the grid. In the particular embodiment of the present invention as shown in FIG. 20, the length of each of the grid elements are sized to extend or span a single upright column.

As a result of this pattern arrangement, the upper end of an upright column 116 is connected to a first grid element 121 half way along its length in the first direction, and in the second direction the ends of two other adjacent grid elements 119*a*, 119*b* either side of the first grid element 121 (see FIG. 20), i.e. the upper end of the upright columns in the grid framework structure are interconnected by supporting an end of a grid element 119 and a centre of adjacent grid element 121. Sub-dividing a sub-set of grid members in the first direction and the second direction into a plurality of grid elements, and staggering the grid elements 119*a*, 119*b*, 119*c*, 121*a*, 121*b*, 121*c* in the first direction and in the second direction such that each of the grid elements extend or span a single upright column 116 results in an arrangement where the grid elements in the first direction and in the second direction are offset by at least one grid cell 54. More specifically, a first subset of grid members 118, 120 are sub-divided into a first and second grid elements extending in the first direction 119*a*, 119*b*, the second grid element 119*b* being spaced apart in the second direction from the first grid element 119*a*. The first and second grid elements 119*a*, 119*b* are staggered in the first direction such that the first grid element 119*a* and the second grid element 119*b* in the grid are offset by at least one grid cell 54. The same staggered arrangement of the grid elements apply in the second direction, whereby the first and second grid elements in the second direction 121*a*, 121*b* that are spaced apart in the first direction are offset in the second direction by at least one grid cell.

The present invention is not restricted to the first and the second grid elements being staggered in the first direction and/or the second direction being offset by a single grid cell. For example, one or more of the grid elements in the first direction and/or the second direction can be sized to span or extend across the upper ends of multiple upright columns and the staggered arrangement creates a pattern that is offset in the first direction and/or the second direction by one or more grid cells. Such an arrangement requires multiple connections along the length of the grid element with multiple upright columns rather than just in the middle of the grid element. The connection the grid members to the upright columns, particularly the cross-sectional shape of the grid elements is further discussed below.

Figures 22, 23:
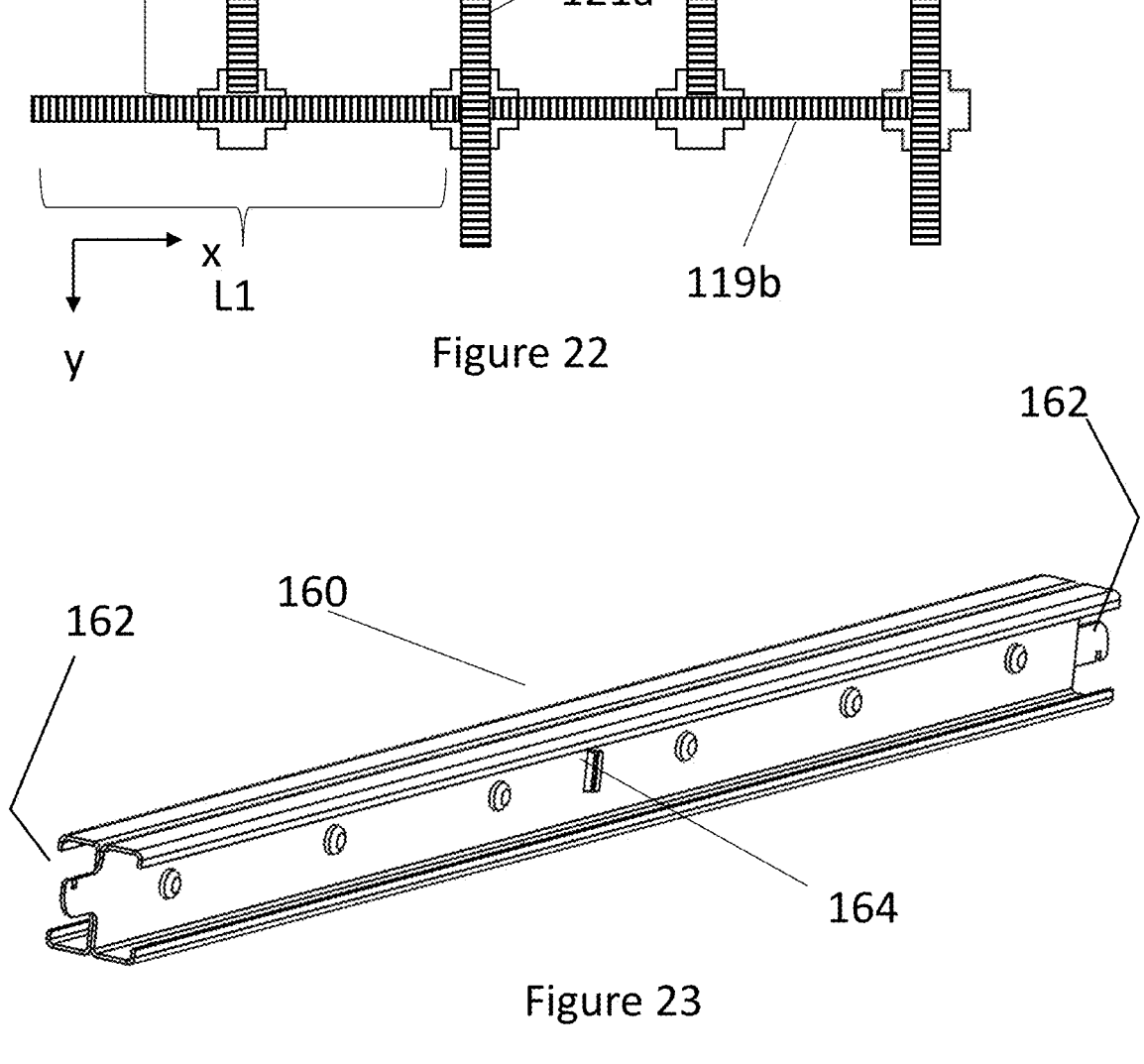
FIG. 22 is a perspective view showing the pattern of the grid elements at the intersections according to an embodiment of the present invention.
FIG. 23 is a perspective view of a grid element or track support according to an embodiment of the present invention.

The containers are generally rectangular in shape having a length longer than its width. The grid cells are rectangular to accommodate rectangular shaped containers. To achieve rectangular grid cells, the length of each of the grid elements 119 in the first axial direction (x or y direction) is longer than the length of each of the grid elements 121 in the second axial direction (y or x direction). The preferred grid arrangement shown in FIG. 17 and FIG. 22 provides optimal structural integrity of grid 50 of the present invention. In this arrangement, a subset of grid members 118, 120 are sub-divided into grid elements 119, 121 that extend across at least one upright column 116 in both the first and the second direction. In a more preferred embodiment of the present invention, the grid members are sub-divided so that each of the grid elements extend across a single upright column in both the first and second axial directions. In this arrangement, the length of each of the grid elements is the same in the first direction and the length of each of the grid elements is the same in the second direction but are different in both the first and second direction to provide a rectangular shaped grid cell. In other words and making reference to FIGS. 17 and 22, the subset of the grid members 119 in the first direction are sub-divided into a first grid element 119*a* and a second grid element 119*b*, each of the first grid element 119*a* and the second grid element 119*b* in the first direction has a length L1 (see FIG. 22). Similarly, the subset of grid members in the second direction 120 are sub-divided into a first grid element 121*a* and a second grid element 121*b*, each of the first grid element 121*a* and the second grid element 121*b* in the second direction has a length L2. To accommodate the rectangular containers, the length L1 of the grid elements in the first direction is different to the length L2 of the grid elements in the second direction.

Different portions of the grid can be arranged to have the lamellar pattern. To give the grid sufficient structural rigidity to support the moving load bearing devices, a greater proportion of the grid adopts the lamellar pattern of the present invention. For example, due to the grid elements being arranged to be offset by at least one grid cell in the first direction and the second direction, one or more of the grid elements at the periphery of the grid are cut short so as to meet at a common support beam. This is to prevent one or more grid elements overhanging at the edge of the grid structure, i.e. one or more grid elements over hanging a common support beam at the edge of the grid are cut.

Track Support

Each of the grid members 50 of the present invention can comprise a track support and/or a track or rail whereby the track or rail is mounted to the track support. The load handling device is operative to move along the track or rail of the present invention. Alternatively, the track can be integrated into the grid member 50 as a single body, e.g. by extrusion.

In the particular embodiment of the present invention, the grid member is the track support to which is mounted a separate track or rail, i.e. the track support is integrated into the grid member. The track support making up the grid in transverse cross section can be a solid support of C-shaped or U-shaped or I shaped cross section or even double C or double U shaped support. In the particular embodiment of the present invention, the track support is a double back-to-back C sections bolted together. The track support and/or the track can adopt a similar lamellar pattern discussed above with respect to the grid members. The track support is sub-divided into track support elements that are joined together in the first direction and in the second direction at the junction where the multiple track support elements cross in the grid structure, i.e. at the upper end of the upright column.

Using the same terminology above with respect of the grid members (see FIGS. 17 and 22), the grid comprises a first set of parallel track supports extending in the first direction and a second set of parallel track supports extending in the second direction, the second set of track supports is substantially perpendicular to the first set of track supports. In each of the first direction and in the second direction, the set of track supports comprises multiple parallel track supports. Like the sub-sets of grid members discussed above, the first set of track supports in the first direction is sub-divided in the first direction into a first sub-set of track supports and a second sub-set of track supports such that the second subset of track supports is spaced apart from the first sub-set of the track supports in the second direction, i.e., parallel sub-sets of track supports. The first sub-set of track supports and/or the second sub-set of tracks supports comprises at least one track support, e.g. a single track support. The first subset of track supports is sub-divided or broken down in the first direction into first track support elements. A second subset of track supports adjacent to the first subset of track supports is similarly sub-divided in the first direction into second track support elements. The first and second track support elements are arranged in the grid so that each of the first track support elements is offset from each of adjacent second set of track support elements in the first direction by at least one single grid cell, i.e. adjacent parallel track support elements are offset by at least one grid cell in the first direction. For example, a subset of the track supports comprising a single track support is broken down into multiple discrete track support elements that are joined together via the cap plates to form a single track support. Parallel discrete track support elements in the first direction are arranged in the grid to be offset by at least one grid cell. A similar pattern arrangement applies to the set of track supports extending in the second direction whereby the set of track supports are sub-divided in the second direction into a first sub-set and second sub-set of track supports. Each of the first and second sub-set of track support are broken down or divided into first and second track support elements. The first and second track support elements extending in the second direction are arranged in the grid so that each of the first track support elements is offset from each of the second track support elements in the second direction by at least one single grid cell. Putting it another way, laterally disposed parallel track elements in the first direction and in the second direction are offset by at least one grid cell.

An individual track support element 160 comprises back to back C sections that are bolted together according to an embodiment of the present invention is shown in FIG. 23. FIG. 24 shows a cross section of the grid elements 160 along the line X-X in FIG. 20 at the intersection. Each of the track support elements 160 are arranged to interlock with each other to from the grid according to the present invention. To achieve this, distal or opposing ends of each of the track support elements 160 comprises locking features 162 for interconnecting to corresponding locking features 164 of adjacent track support elements. In the particular embodiment of the present invention, opposing or distal ends of one or more track support elements comprises at least one hook 162 that is receivable in openings or slot 164 midway of an adjacent grid element at the junction where the track support elements cross in the grid. Referring back to FIG. 23 in combination with FIG. 24, the hooks 162 at the end of a track support element 160 are shown received in an opening 164 of an adjacent track support element extending across an upright column at the junction where the track support elements cross. Here, the hooks 162 are offered up to an opening 164 either side of a track support element. In the particular embodiment of the present invention, the opening 164 is half way along the length of the track support element 160 so that when assembled together, adjacent parallel track support elements in the first direction and in the second direction are offset by at least one grid cell. With reference to FIG. 20 and FIG. 24 the upright columns supports 116 the centre of a first track support element 160a and the ends of adjacent second 160b and third 160c track support elements either side of the first track support element 160a, i.e. each of the upright columns 116 supports three track support elements 160a, 160b, 160c. The second and third track support elements 160b, 160c, supported at their ends are approached in opposite directions to interlock mid-way along the first track support element 160a. Each of the track support elements 160a, 160b, 160c are interlocked by inserting the hooks 162 at the ends of the track support elements into openings 164 mid-way of an adjacent track support elements at the junction where the track support elements cross. By interlocking each of the track support elements in the grid through this manner the lamellar pattern as described above results.

Track or Rail

To complete the grid structure once the track support elements are interlocked together to form a grid pattern comprising track supports extending in the first direction and track supports extending in the second direction, a track is mounted to the track support elements. The track is either snap-fitted and/or fitted to the track support elements in a slid fit arrangement. Like the track support of the present invention, the track comprises a first set of tracks extending in the first direction and a second set of tracks extending in the second direction, the first direction being perpendicular to the second direction. A sub-set of the first set of tracks is sub-divided into multiple track elements in the first direction such that adjacent parallel track elements in the first direction are offset by at least once grid cell. Similarly, a sub-set of the second set of tracks is sub-divided into multiple track elements in the second direction such that adjacent track elements in the second direction are offset by at least one grid cell. A sub-set of the first set and/or the second set of tracks comprises at least one track, e.g. a single track that is broken down into multiple track elements. An example of a single track element 170 is shown in FIG. 25. The fitting of the track element to the track support comprises an inverted U-shaped cross-sectional profile that is shaped to cradle or overlap the top of the track support element 160 shown in FIG. 23. One or more lugs extending from each branch of the U shape profile engage with the ends of the track support in a snap fit arrangement.

Figure 26:
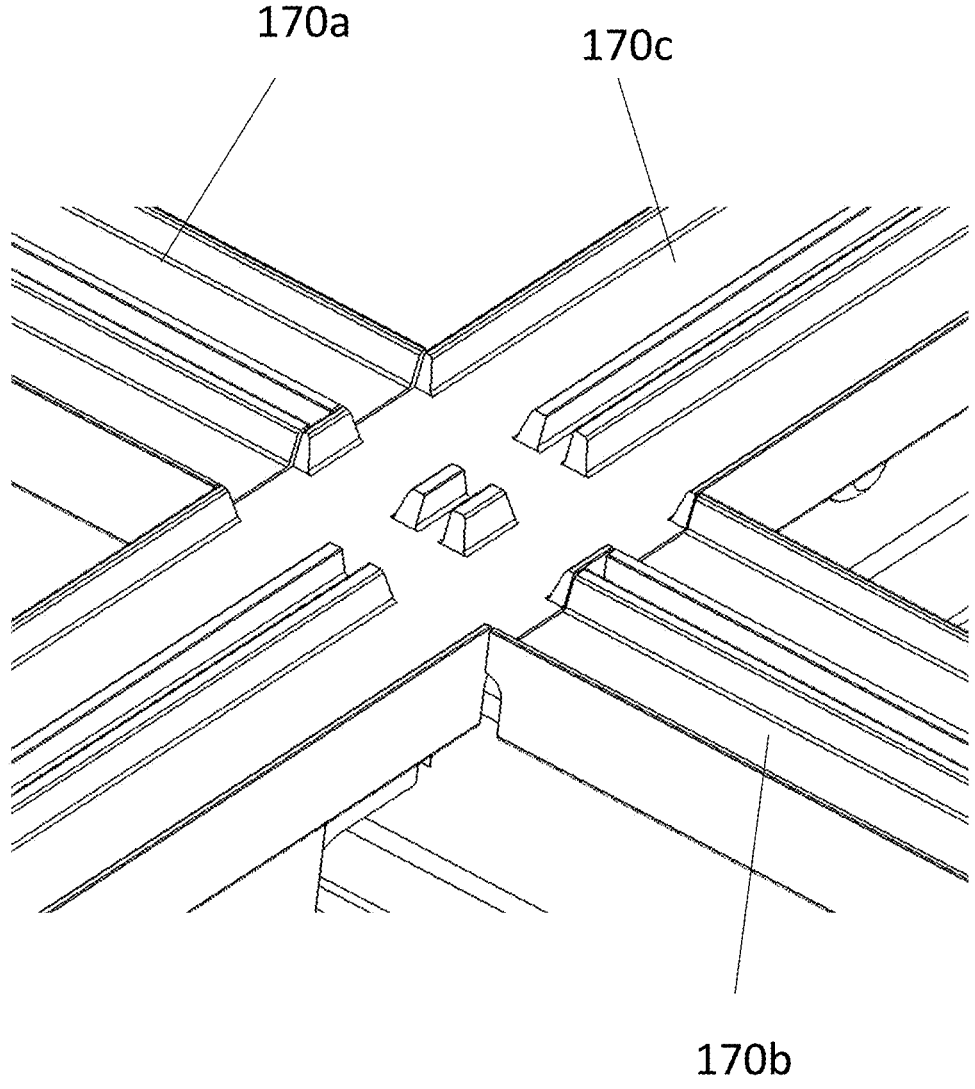
FIG. 26 is a perspective view of the arrangement of the track elements at the intersection where the grid elements cross according to an embodiment of the present invention.

Multiple track elements 170 are assembled to butt up against each other along the length of the track support elements. Individual tracks can follow a similar pattern to the track supports, e.g. lamellar pattern, or arranged in a different arrangement. FIG. 26 shows an assembly of three track elements 170*a*, 170*b*, 170*c* at a junction where the track elements 170*a*, 170*b*, 170*c* cross in the grid structure at an upright column. The length of each of the track elements are sized to extend or span across at least one upright column, e.g. a single upright column. The ends of the track elements 170*a*, 170*b* butt up against the side of an adjacent track element 170*c* at an upright column. The track elements 170 comprises a cut out or recess 172 as shown in FIG. 25 to accommodate the track support elements 160 at an upright column discussed above. Since the track elements 170 are sized to extend or span across a single upright in the grid structure, the cut out 172 is at the centre or formed midway of each of the track elements 170. The track elements 170 are assembled on the track support such that the track has a woven like or brick like appearance as viewed from the top of the grid, wherein adjacent parallel track elements in the first direction are staggered by at least one grid cell. Similarly, adjacent parallel track elements in the second direction are staggered by at least one grid cell.

Using the similar language discussed above with reference to the grid members. The track comprises a first set of tracks extending in a first direction and a second set of tracks extending in the second direction, the second set of tracks running transversely to the first set of tracks in a substantially horizontal plane. The first and the second sets of tracks are sub-divided into a plurality of track elements 170 such that each of the plurality of track elements 170 are arranged to extends or span across the top end of a single upright member. More specifically, the first set of tracks is sub-divided in the first direction into a first subset of tracks and a second subset of tracks extending in the first direction, the second subset of tracks is spaced apart from the first subset of the tracks in the second direction. The first subset of tracks is broken down or divided in the first direction into a first set of tracks elements 170 and the second subset of tracks is broken down or divided in the first direction into a second set of tracks elements. The first set of tracks elements is offset from the second set of tracks elements in the first direction by single grid cell. The same principle applies to a first set of track elements and a second set of tracks elements extending in the second direction.

The upright columns, braced tower, braced tower foot, grid structure comprising the track support and the track elements are assembled together as described above to form the grid framework structure according to an embodiment of the present invention.

Seismic Grid Framework Structure

While the current grid framework structure is adequate where the ground is relatively stable, i.e. having a spectral acceleration less than 0.33 g categorised as Type A and Type B events, this cannot be said where the grid framework structure is subjected to powerful seismic events generating strong lateral forces in excess of 0.55 g spectral acceleration categorised as a Type C or D seismic event. Such powerful seismic events compromise the structural fasteners joining the grid elements (e.g. track support elements) at the intersections, causing them to work their way loose or out of the cap plates to which they are bolted to. The result is the weakening or complete loss of structural integrity of the grid framework structure as the lateral forces no longer are able to be transferred safely down to the structural foundations. Failure may occur at the intersections of the grid members or track support elements making up the grid. The bracing towers described above used to maintain the structural integrity of the grid framework structure may not able to withstand the lateral forces as a result of powerful Type D seismic events well in excess of 0.55 g.

Figure 27:
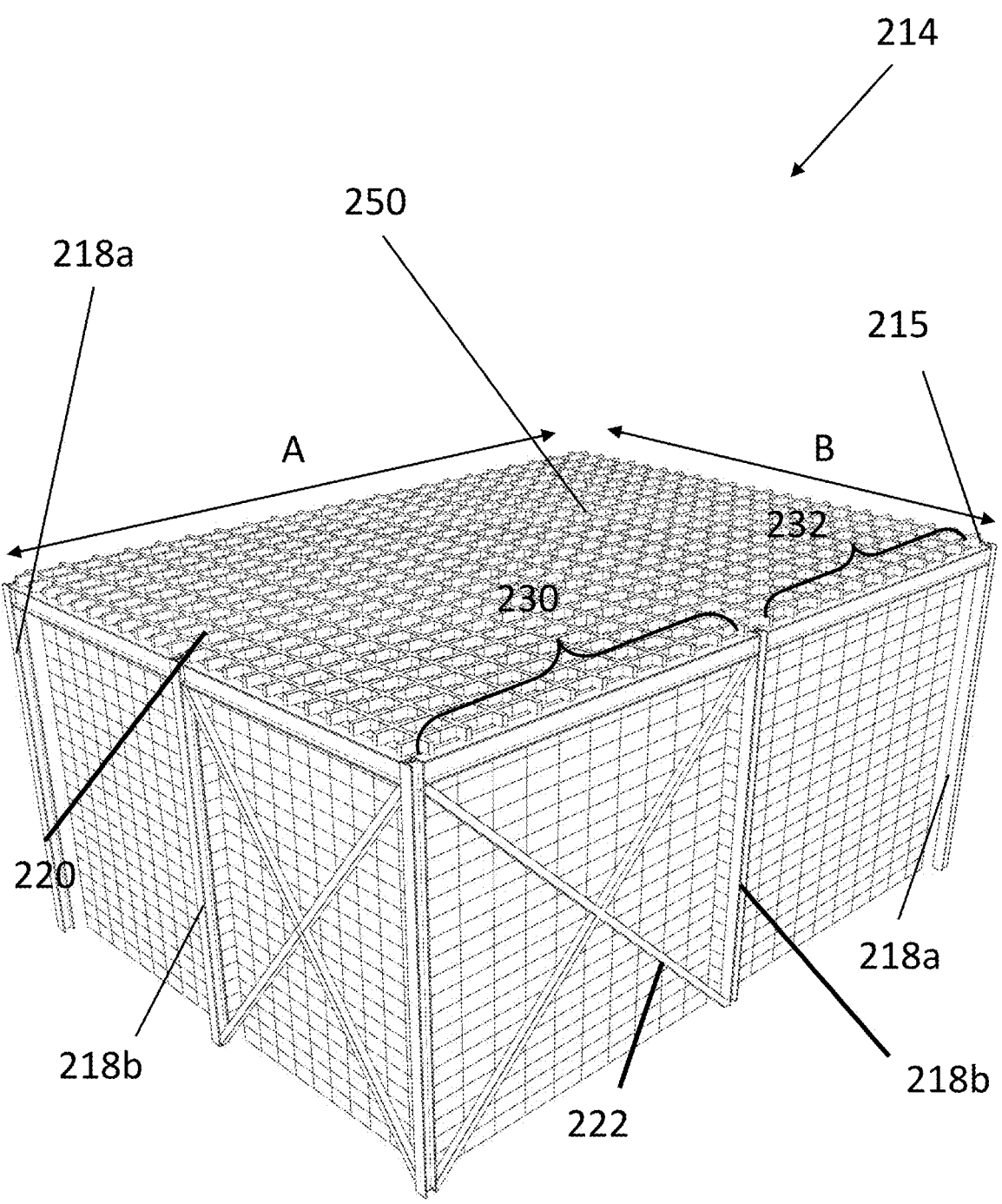
FIG. 27 is a perspective view of a seismic grid framework structure according to a first embodiment of the present invention.
Figure 28:
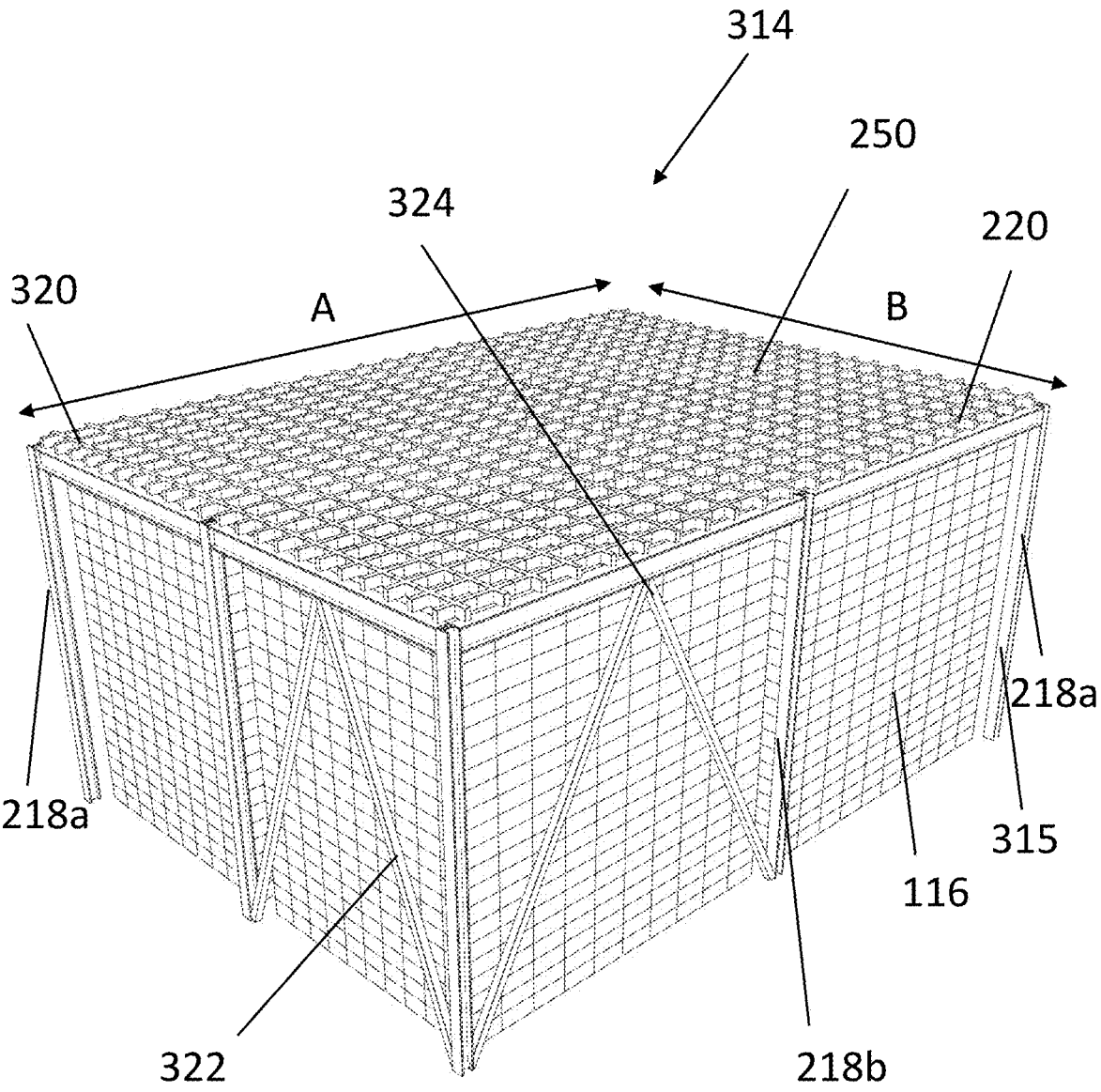
FIG. 28 is a perspective view of the seismic grid framework structure according to a second embodiment of the present invention.

The present invention as shown in FIGS. 27 and 28 provides a seismic restraint grid framework structure 214 and 314 comprising a structural restraint system otherwise known as a seismic force restraint system (SFRS) to maintain the structural integrity of the grid framework structure of the present invention during powerful seismic and storm events, i.e. the SFRS supports the grid framework structure of the present invention against strong lateral forces as a result of Type C and/or D seismic events. The restraint system of the present invention reduces or eliminates structural fastener failure such as the joints securing the grid elements to the upright columns via the cap plates at the intersections through breakage, loosening, detachment or rupture through structural components. The SFRS of the present invention comprises a perimeter bracing structure 215, 315 supported by a plurality of vertical frame columns 218, 318 for supporting the grid against lateral forces. The reference numerals 215 and 315 are used to describe the different types of perimeter bracing structure shown in FIG. 27 and FIG. 28. The perimeter bracing structure 215, 315 comprises at least one bracing member 220, 320, 222, 322 extending from the plurality of vertical frame columns 218. For the purpose of the present invention, the term "support" is construed to cover any form of mechanical connection between the SFRS and the grid. For example, lateral forces generated at the grid level are transferred at the periphery of the grid 250 to the SFRS of the present invention. Additionally, for the purpose of the present invention, the at least one bracing member 220, 320, 222, 322 can be at least one horizontal frame beam between the vertical frame columns 218 and/or at least one diagonal bracing member 222, 322 between the vertical frame columns 218. For the purpose of the present invention, the term "vertical frame column" and "vertical support frame column" are used interchangeably in the description to represent the columns 218 supporting the bracing members 220, 320, 222, 322. A vertical frame column 218 is different to the vertical upright columns 116 supporting the grid discussed above and are spaced apart by one or more spacers 74. The vertical frame column 218 forms part of the SFRS together with the perimeter bracing structure of the present invention. The SFRS can be envisaged to form an exoskeleton around the grid framework structure.

Figure 29:
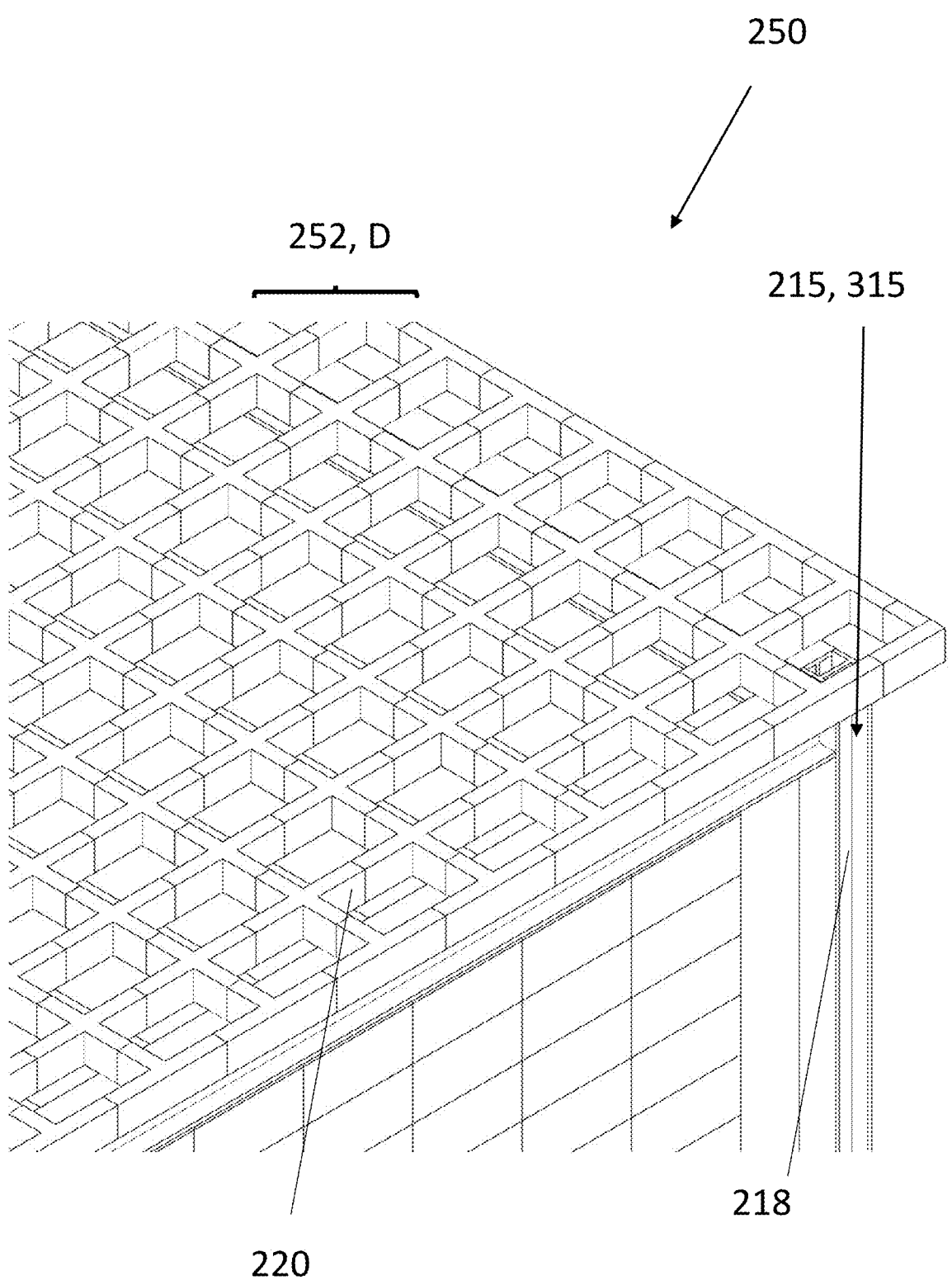
FIG. 29 is a perspective view showing the grid being supported at the border of the seismic grid framework structure shown in FIG. 27 and FIG. 28 according to an embodiment of the present invention.

The grid 250 comprises an outer zone or border 252 around the periphery of the grid 250 (see FIG. 29). FIG. 29 shows an expanded view of the seismic restraint grid framework structure of the present invention at one of the corners of the SFRS 215, 315 supporting the grid framework structure. The grid 250 is supported by the perimeter bracing structure 215, 315 at or within the border or outer zone 252 of the grid 250. In one embodiment of the present invention, the perimeter bracing structure 215, 315 is arranged around the periphery of the grid 250 and/or the grid framework structure. In a preferred embodiment of the present invention, the grid 250 is supported by the perimeter bracing structure 215, 315 at or within the border or outer zone 252 of the grid 250 such that a portion of the border or outer zone 252 overhangs the perimeter bracing structure 215, 315. In the particular embodiment of the present invention, the border or outer zone 252 of the grid 250 constitutes an outer portion of the grid 250 having a width of at least one grid cell, more preferably a single grid cell such that the outer portion of the grid 250 overhangs the perimeter bracing structure 215, 315 when the grid 250 is supported at the borders or outer zone 252 of the grid 250.

As shown in FIG. 29, the outer zone or border 252 of the grid spans or extends across the perimeter bracing structure 215, 315 at the edges of the grid framework structure. More specifically, the outer zone or border 252 of the grid spans across the at least one bracing member 220 such that a portion of the grid overhangs the perimeter bracing structure 215, 315.

The at least one bracing member 220 is the at least one horizontal frame beam extending between the vertical frame columns 218. Here, the at least one horizontal frame beam 220 is inwardly positioned from the edge of the grid 250 such that the outer zone or border 252 of the grid spans or extends across the at least one horizontal frame beam 220.

Figures 33, 34:
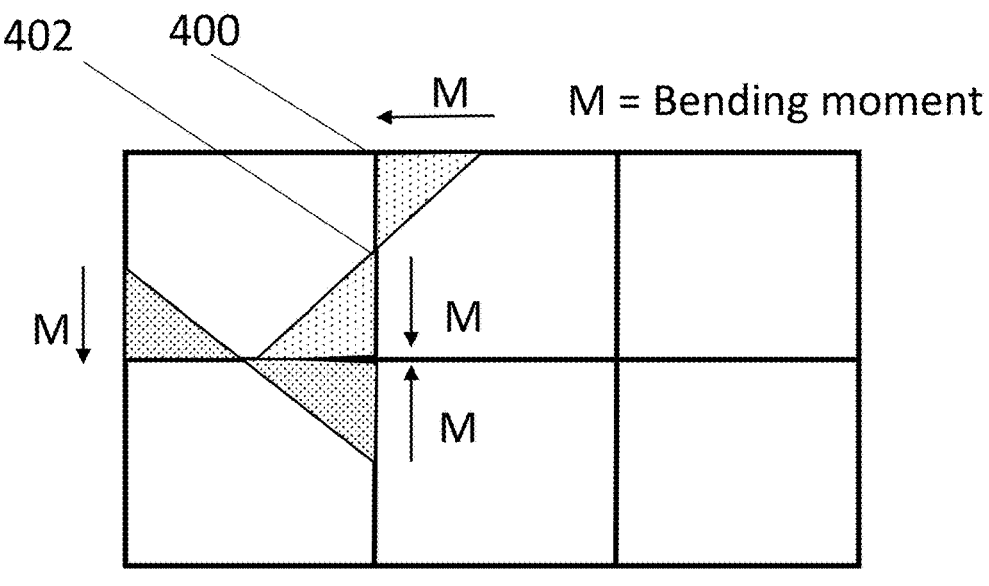
FIG. 33 is the distribution of the bending moments across the grid when functioning as a Vierendeel truss.
FIG. 34 is a schematic view of the arrangement of sub-frames making up the grid of the seismic grid framework structure according to an embodiment of the present invention

By supporting the grid 250 at the border or outer zone 252 of the grid such that a portion of the grid 250 overhangs the perimeter bracing structure 215, 315 rather than being supported at the edge of the grid mitigates the bending moments at the edge of the grid affecting the joints connecting the grid 250 to the perimeter bracing structure 215, 315 of the present invention. This is because the bending moments is greatest at the edges of the grid 250 where the grid members intersect and decreases between the intersections, i.e. within the grid cells or mid-cell. This is further explained below with reference to FIG. 33 showing the distribution of the bending moments across the grid. In FIG. 33, it can be seen that the bending moments is maximum at the edge of the grid where the grid elements intersect and decreases to a minimum between the intersections. In the particular embodiment of the present invention shown in FIG. 29, the width D of the border or outer zone 252 around the grid constitutes a single grid cell. Ideally, the grid 250 is supported mid-cell within the border or outer zone 252 of the grid 250 by the at least one bracing member 220 of the perimeter bracing structure 215, 315 where the bending moments is the weakest rather than at the edges of the grid 250.

Whilst it is ideal to support the grid 250 mid-cell at the border or outer zone of the grid, the present invention is not limited to the grid being supported mid-cell at the border or the outer zone of the grid and the border or outer zone of the grid can be construed to also constitute the edges of the grid 250 such that the grid 250 is supported around the peripheral of the grid by the perimeter bracing structure of the present invention.

The SFRS can be imagined to form an exoskeleton around the grid framework structure of the present invention. In the particular embodiment of the present invention, the perimeter bracing structure 215, 315 is supported by at least one vertical frame column 218a at the corners of the grid framework structure and braced by at least one horizontal frame beam 220 extending from the corners of the grid framework structure. In the particular embodiment of the present invention as shown in FIG. 27 and FIG. 28, four vertical frame supporting columns 218a are arranged at four corners of the grid framework structure to form a 3 dimensional exoskeleton, e.g. cuboid structure, having a top face and four side faces. As the SFRS forms an exoskeleton around the periphery of the grid framework structure of the present invention, the vertical frame support columns 218a at the corners of the grid framework structure can be termed perimeter frame columns for ease of explanation of the SFRS of the present invention. In the particular embodiment of the present invention, four horizontal frame beams 220 are mounted to the top of each of the four perimeter frame columns 218a so as to extend from each corner of the SFRS frame. The horizontal frame beams 220 can envisaged to represent the top chords that connects two vertical frames columns 218a at their top ends of the perimeter bracing structure 215, 315 and can be termed a perimeter frame beam.

At least two of the vertical frame columns 218a, 218b are joined together by at least one diagonal bracing member 222, 322 to form a braced frame to provide lateral support for the grid framework structure in the front and/or the back direction. The braced frame is a structural system which is designed to resist earthquake forces. The diagonal bracing members 222, 322 are designed to work in tension and compression, similar to a truss and are designed to resist lateral loads in the form of axial stresses, by either tension or compression. A braced frame can be arranged around the periphery of the grid framework structure or at least one face of the grid framework structure and designed to absorb the bulk of the lateral forces experienced by the grid framework structure.

Any type of braced frame commonly known in the art to provide lateral support to the grid and/or grid framework structure is applicable in the present invention. In the particular embodiment of the present invention shown in FIGS. 27 and 28, the braced frame can be a K-brace where two diagonal braces 222 meet at a peak 324 on the horizontal frame beam 320 as shown in FIG. 28 or a cross-brace where two diagonal braces 222 cross each other to form an X as shown in FIG. 27. Further detail of the K-brace and the cross brace is discussed below. Bracing at least two of the vertical frame columns 218a, 218b at the top of the vertical frame columns 218a, 218b by at least one horizontal frame beam 220, 320 forms at least one drag strut or collector commonly known in the art. A drag strut or collector is where the at least two vertical frame columns 218a, 218b are braced by the horizontal frame beams 220, 320 at the top of the two vertical frame columns 218a, 218b and functions to collect and transfer diaphragm shear forces to the vertical frame columns.

Each of the plurality of vertical frame columns 218a, 218b can be solid supports of C-shape or U shape cross section, double C or double U. Preferably, each of the plurality of vertical frame columns 218a, 218b are solid supports of I-shape comprising upper and lower beam flanges. At least two of the vertical frame columns 218a, 218b are rigidly joined together by the at least one bracing member 220, 320, e.g. a diagonal bracing member 222, 322 and/or a horizontal frame beam. Each of the at least two of the vertical frame columns 218a, 218b has a top end and a bottom end; the bottom end is anchored to a concrete foundation using one or more anchor bolts. Various methods commonly known in the art to anchor the bottom end of the vertical frame columns to the concrete foundation to provide lateral support to the braced frame against powerful seismic event is applicable in the present invention.

Multiple braced frames of the SFRS can be disposed around the periphery of the grid framework structure (i.e. around each face of the grid framework structure) to form a unitary frame body as shown in FIG. 27 and FIG. 28, i.e. the SFRS forms an exoskeleton supporting the grid framework structure against strong lateral forces as a result of Type C or Type D seismic events. Alternatively, at least one braced frame can be disposed to at least one face of the grid framework structure. The braced frame of the present invention can be disposed to at least one of the four side faces of the cuboid. In the particular embodiment shown in FIG. 27, 28, a braced frame is disposed at each of the four side faces of the cuboid. The perimeter frame columns 218*a* at the corners of the grid framework structure are braced by at least one horizontal frame beam 220, 320 extending longitudinally from the top of each of the four perimeter frame columns 218*a* to form a substantially rectangular or square perimeter frame in the horizontal plane surrounding the periphery of the grid.

At least one 218*b* of the plurality of vertical frame columns 218*a*, 218*b* can be disposed intermediate of or between two vertical frame columns 218*a* at the corners of the grid framework structure so as to divide the exoskeleton into a braced frame where at least two vertical frame columns 218*a*, 218*b* are braced by at least one diagonal brace 222, 322 and a drag strut or collector 232. A drag strut or collector 232 is where the at least two vertical frame columns 218*a*, 218*b* are braced by the horizontal frame beams 220, 320 at the top of the two vertical frame columns 218*a*, 218*b* and functions to collect and transfer diaphragm shear forces to the vertical frame columns 218*a*, 218*b*. In the particular embodiment of the present invention shown in FIGS. 27 and 28, the SFRS 215, 315 comprises a braced frame where at least two of the plurality of vertical frame columns 218*a*, 218*b* are braced by at least one diagonal brace 222, 322 and a horizontal frame beam 220, 320 to form a drag strut. Also shown in FIG. 27 and FIG. 28, the at least one diagonal bracing member 222, 322 is disposed to one side of the intermediate vertical support column 218*b* to form the braced frame 230 and the drag strut 232 is disposed to the other side of the braced frame. Bracing between the vertical frame columns at the corner of the SFRS and the intermediate vertical support column by at least one diagonal bracing member at each face of the SFRS around the grid framework structure is dependent on the nature of the seismic event, i.e. whether it is a Type C or Type D seismic event. For a more robust restraint system to cater for Type D seismic events, a braced frame comprising at least one diagonal brace according to the present invention is disposed around the periphery of the grid framework structure.

Figure 30:
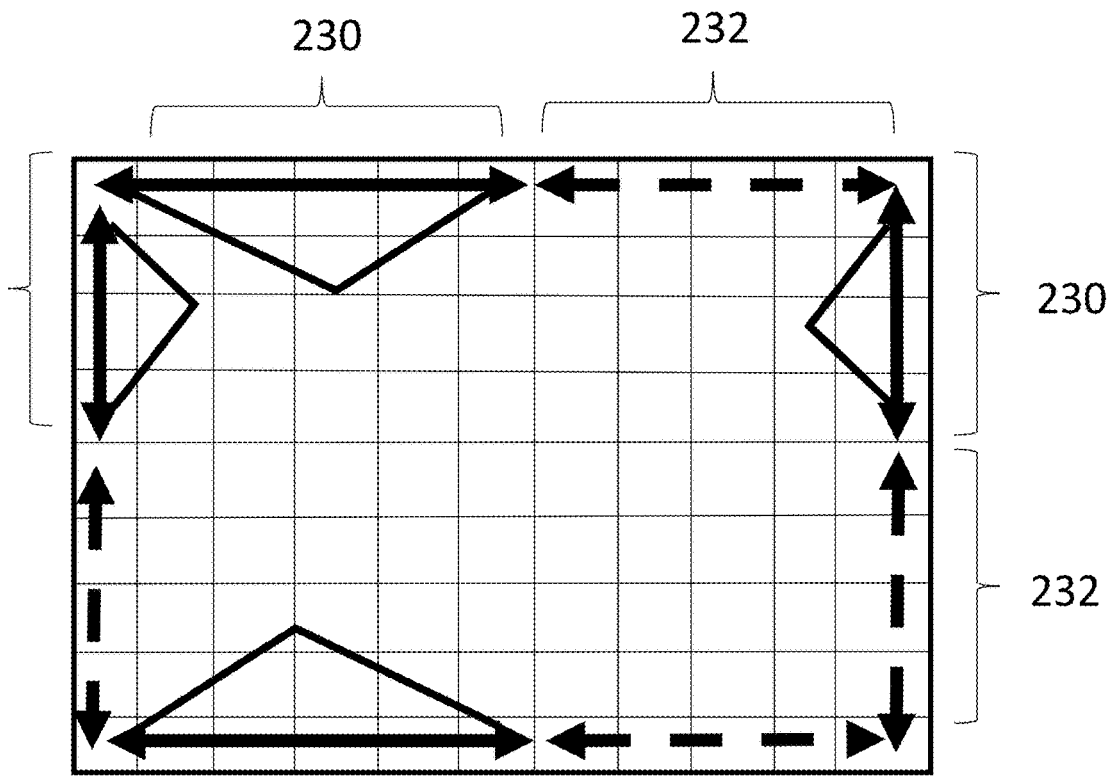
FIG. 30 is a top plan view of the seismic grid framework structure showing the arrangement of braces according to a first embodiment of the present invention.

A schematic top view of the seismic grid framework structure according to the present invention incorporating the SFRS around the periphery the grid framework structure is shown in FIG. 30. The triangles around the periphery of the grid framework structure represents the braced frame 230 comprising at least one diagonal bracing member 222, 322. The dashed lines to the other side of the braced frame 230 around the periphery of the grid framework structure represents the drag strut 232 whereby the vertical frames columns is braced by the horizontal frame beam 220, 320. In the particular embodiment of the present invention in FIGS. 27 and 28, the intermediate vertical support columns 218*b* is shared between the braced frame 230 and the drag strut 232. Similarly, the peripheral frame column 218*a* at the corner of the SFRS is shared between adjacent braced frame 230 comprising the at least one diagonal bracing member 222, 322 or a drag strut 232.

Figure 31:
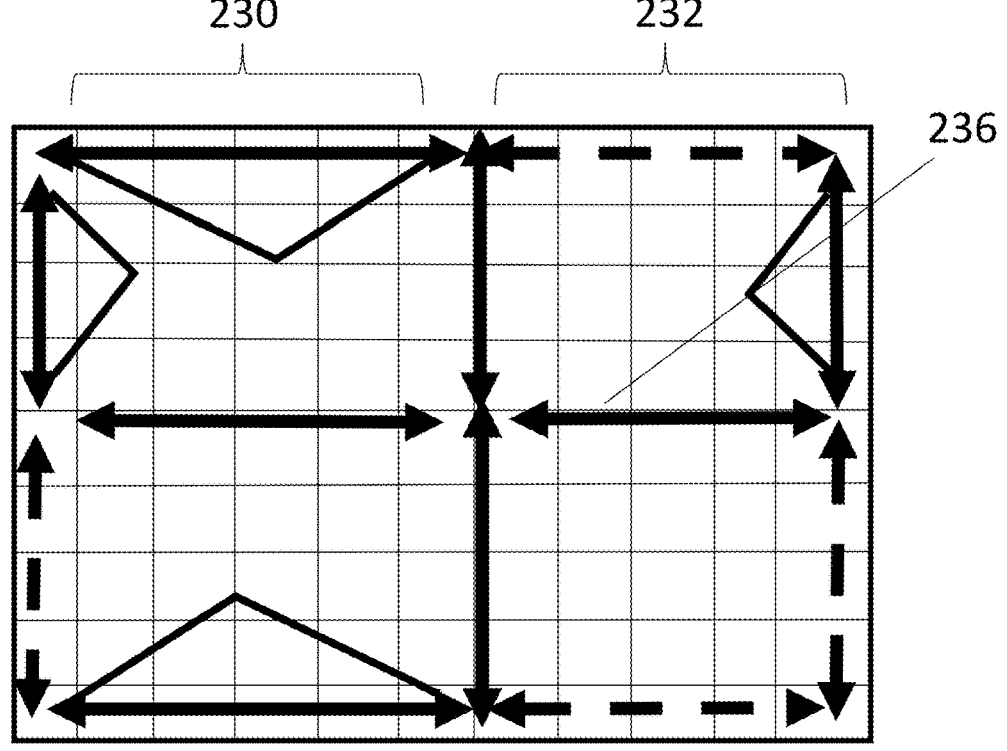
FIG. 31 is a top plan view of the seismic grid framework structure showing the arrangement of the braces according to another embodiment of the present invention.

In an alternative embodiment shown in FIG. 31, the SFRS further comprises one or more internal restraint systems 236 within the body of the grid framework structure. The additional restraint system 236 comprises one or more pairs of vertical frame columns 218 joined together at their upper ends by at least one bracing member 220, 320, 222, 322 shown as solid lines internally within the grid framework structure in FIG. 31. The at least one bracing member can be a horizontal bracing beam 220, 320 at the top of the pairs of vertical frame columns 218*a*, 218*b* and/or a diagonal bracing member 222, 322. However, as the additional restraint system 236 within the grid framework structure occupies grid cells that can potentially be used to store containers, a balance has to be made between the number of internal restraint systems that a grid framework structure can occupy and the availability of grid cells in the grid framework structure to store one or more containers. The preferable option would be for the SFRS 215, 315 of the present invention to be concentrated around the periphery of the grid framework structure to form an exoskeleton. The foot of each of the vertical frame columns 218*a*, 218*b* are anchored to a concrete foundation such that lateral forces absorbed by the SFRS are transferred to the floor.

Where the braced frame comprises a K-brace, two diagonal brace members 322 are arranged so that a first end of each of the diagonal brace members 322 constituting a lower end are arranged at the bottom ends of the vertical frame columns 218*a*, 218*b*. In the particular embodiment of the present invention, the first end of each of the diagonal bracing members 322 are arranged at the bottom end of the perimeter frame column 218*a* at the corner of the grid framework structure and the bottom end of the intermediate vertical frame column 218*b* (see FIG. 28). The two diagonal brace members 322 are inclined upwardly so that a second end of each of the diagonal brace members 322 constituting an upper end meet together at a peak or apex 324 at a point on the horizontal frame beam 320, 220. During a powerful seismic event, the two diagonal brace members 322 absorbs the bulk of the lateral forces from the grid framework structure as they are placed under compression and therefore, represents a sacrificial component of the seismic grid framework structure. Thus, the diagonal bracing members 322 and possibly, the braced frame 230 of the SFRS are easily replaceable after a strong seismic event.

Where the braced frame comprises a cross-brace (see FIG. 27), a first diagonal brace member and a second diagonal member 222 are formed in an X shape, each of the first diagonal brace member and second diagonal brace member 222 have opposing ends. The vertical frame columns 218*a*, 218*b* are joined together by the cross brace such that outer ends of the vertical frame columns 218*a*, 218*b* is rigidly connected to the opposing ends of the first and second diagonal brace members 222. Using the terminology of the present invention, the cross brace is disposed between the perimeter frame column 218*a* at the corner of the grid framework structure and the intermediate vertical frame column 218*b* such that the outer ends of the perimeter frame columns 218*a* and the vertical frame column 218*b* are connected to the opposing ends of the first and second diagonal brace members 222. As with the K-brace, the bracing members of the cross brace are placed under compression during a powerful seismic event and therefore, represents a sacrificial component of the seismic grid framework structure. As the bulk of the bending moments of the grid framework structure during a powerful seismic event are transferred to the SFRS 215, 315, the braced frame of the SFRS gives way first before the structural integrity of the grid framework structure fails. In other words, during a powerful seismic event, the structural restraint system or the SFRS or components of the exoskeleton is/are sacrificed before the structural integrity of the grid framework structure fails. As the SFRS of the present invention surrounds and supports the grid framework structure, components of the SFRS are easily replaceable.

The ends of the bracing members 220, 320, 222, 322 are rigidly connected to the vertical frame columns 218a, 218b of the SFRS by one or more bolts or welds. To provide structural rigidity of the SFRS to absorb strong lateral forces, the vertical frame columns 218a, 218b including the perimeter frame columns are bolted to the horizontal perimeter frame beams 220, 320 using a plurality of bolts. The vertical frame columns 218a, 218b including perimeter frame columns and the horizontal frame beams 220, 320 are generally I—beams that includes top and bottom beam flanges. The vertical frame columns 218a, 218b including the perimeter frame columns are bolted to the horizontal frame beam 220, 320 at the beam flanges. Shims can be disposed between beam flanges of the perimeter frame columns 218a and the horizontal frame beams 220, 320 otherwise known as perimeter frame beams and secured together by suitable bolts through slotted holes in the beam flanges. In comparison to the vertical uprights columns or members 116 supporting the grid of the grid framework structure, components of the SFRS such as the perimeter frame columns and the horizontal frame beams are more substantial in dimension and weight, and largely composed of steel. For the avoidance of doubt, the vertical upright columns or upright columns 116 are spaced apart within the grid framework structure by one or more spacers and support the grid elements at the intersections where the grid elements cross.

Maximum lateral forces developed during strong seismic events are generally experienced by the grid at the top of the grid framework structure which is subjected to maximum deflection, i.e. during a powerful seismic event, causing the grid to experience side-to-side lateral forces. Typically, the bending moments of the each of the grid members in the grid are concentrated at the intersections where the grid elements (grid elements make up the grid members) cross at the vertical upright column 116. As the grid elements are bolted together and secured to the vertical upright columns 116 via cap plates 150, strong lateral forces at the intersections cause fasteners (e.g. cap plate) which are largely bolted together to loosen or even break. Whilst the bolts at the intersections can be tightened, this represents a laborious task considering the number of vertical upright columns 116 in a given grid framework structure. What is required is a rigid joint at the intersection where the grid members cross at the vertical upright columns 116.

Figure 32:
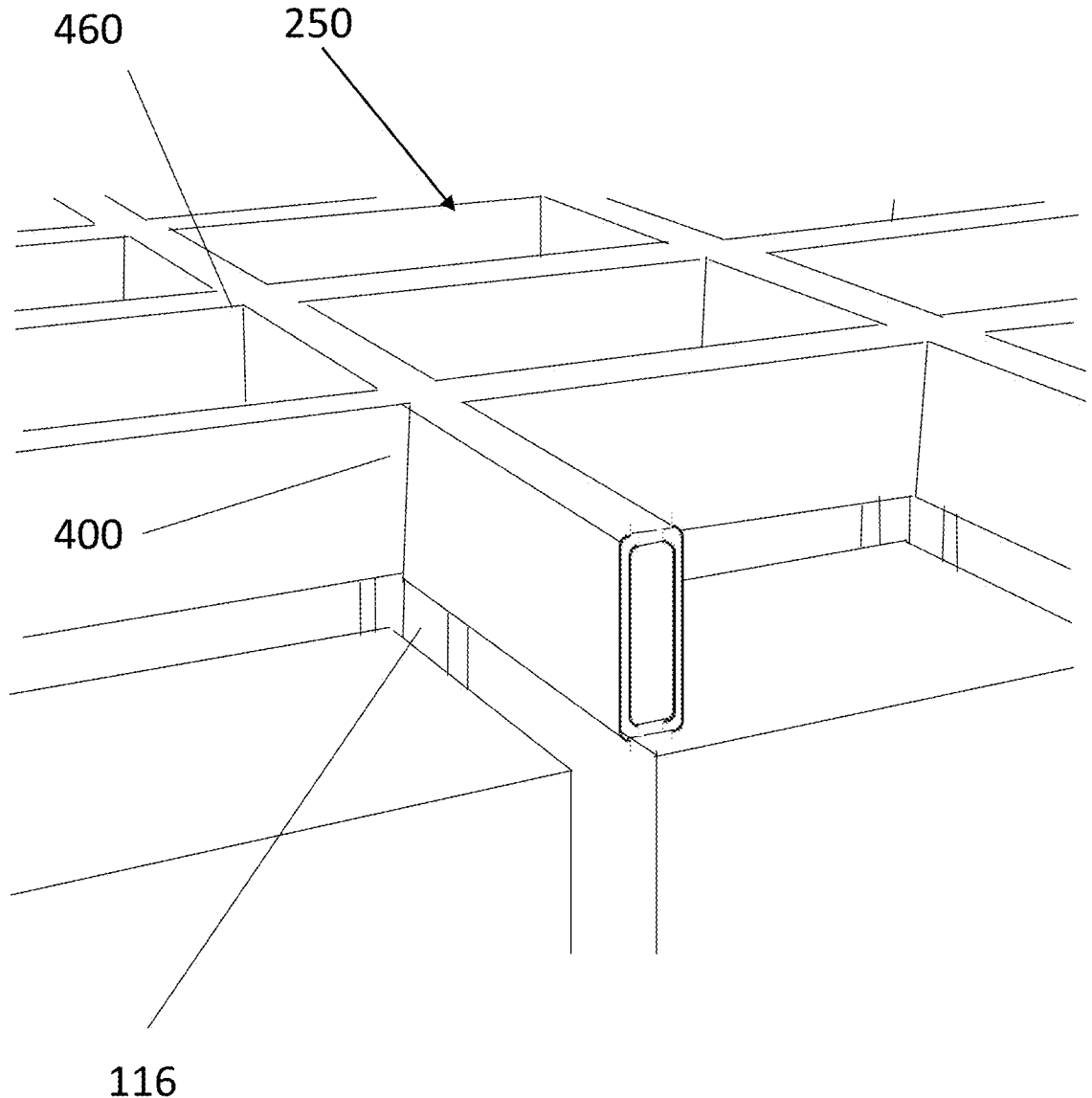
FIG. 32 is a perspective cross-sectional view of the seismic grid framework structure showing the cross-sectional profile of the grid members according to an embodiment of the present invention.

In an aspect of the present invention, the grid elements are welded together at the intersections 400 instead of being bolted together to provide a more rigid and sturdy joint than can be provided by bolting alone (see FIG. 32). Thus, lateral forces generated in the grid are transferred as bending moments at the joints where the grid members cross at each of the upright columns. In accordance with one important aspect of the present invention and using the terminology of the grid structure discussed above, the grid elements in the grid are rigidly connected together to form at least one Vierendeel truss. As commonly known in the art, a Vierendeel truss comprises chords separated by web members formed as a series of rectangular frames. The rectangular openings of Vierendeel trusses make the Vierendeel trusses ideally suited for a load handling device to move one or more containers stored below the trusses, i.e. the grid of the present invention functions as at least one Vierendeel truss assembly.

Depending on the direction of the lateral forces, the chords resists compression or tension. Vierendeel trusses achieves stability by the rigid connection of the web members to the chords. As there are no diagonal braces, Vierendeel trusses transfer shear from the chords by bending moments at the joints as well as between the chords and web members. The distribution of the bending forces across the grid can be represented by the schematic diagram shown in FIG. 33. As can be seen in FIG. 33, maximum bending moments M are concentrated at the joints 400 where the grid members or grid elements cross or intersect at the vertical upright columns. By the use of a rigid joint at the intersections or nodes of the grid members, the grid of the present invention behaves similarly to a Vierendeel truss whereby shear along the grid members are transferred by bending moments at the intersections or nodes. The rigid joint 400 at the intersections is provided by welding the grid elements where they cross. Since the intersections or nodes of the grid are rigidly connected together, the intersections are able to resist shear forces and bending moments developed at the intersections. As the grid of the present invention lies in a horizontal plane, the Vierendeel truss extends across the grid and depending on the direction of the lateral forces, each of the grid elements behaves either as a chord under compression or tension or a web.

In comparison to the grid of the grid framework structure discussed above with reference to FIG. 23 where the grid elements comprises back to back C sections, the grid 250 of the seismic grid framework structure of the present invention comprise tubular beams (see FIG. 32). In practice, back-to-back C sections which are bolted together are considered too weak to work in a seismic region. Tubular beams 460 offer improved rigidity and strength in comparison to the back-to-back C sections. The tubular cross-sectional profile of the grid members 460 offer resistance to bending moments in multiple directions. The tubular beams 460 making up the grid members also allows the grid members to be easily welded together at the joints 400 where the grid members cross at the intersections to from a rigid joint with little or no play. Welding at the joints offer superior rigidity in comparison to bolts which are more susceptible to loosening.

The borders of the grid 250 are rigidly connected to the horizontal frame beams 220, 320 that extend from the vertical or peripheral frame columns 218a, 218b of the SFRS at the corners of the grid framework structure such that bending moments experienced by the grid members as a result of strong lateral forces are transferred to the SFRS which is reinforced by one or more bracing members 220, 320, 222, 322, e.g. diagonal frame braces (braced frames). The distribution of the bending moments across the grid structure can be envisaged by the schematic diagram shown in FIG. 33. Since maximum bending moments are concentrated at the intersections 400 where the grid elements cross at the upright columns 116, it is advantageous that the grid functions as a single unitary body. In comparison to bolting the grid elements to the cap plate at the intersections discussed above, welding the grid elements together at the intersections in the seismic grid framework structure presents a new problem of the need to handle the entire grid which can comprise in excess of 40×40 grid cells and mount it onto the vertical upright columns 116 on site, i.e. in situ. Moreover, building regulation limits the amount of welding that can be performed on-site due to the risk of fires and exposure to welding fumes. Thus, welding the grid elements on site at the intersections does not appear to be a practical proposition.

Figures 35, 36:
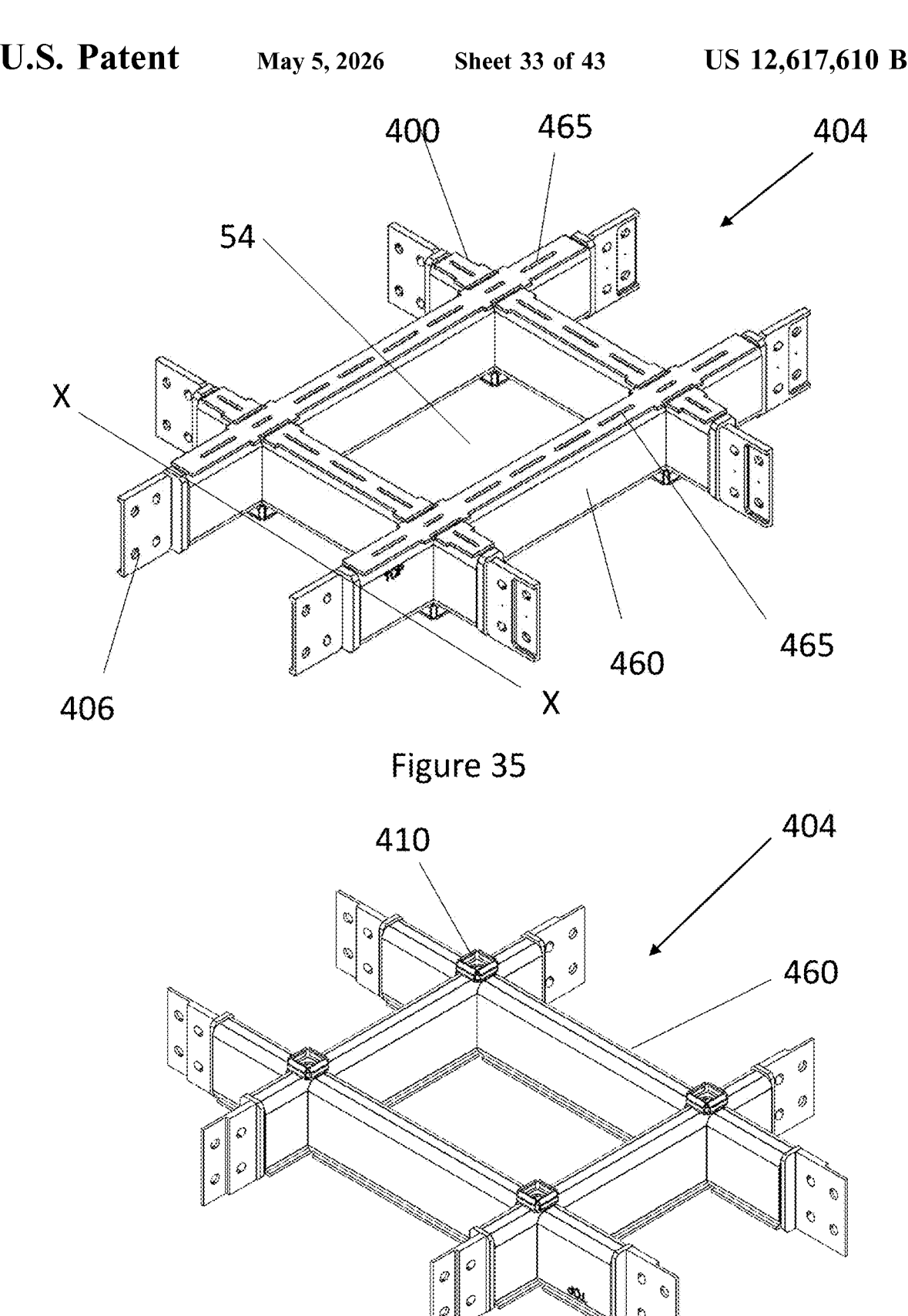
FIG. 35 is a schematic top view of a sub-frame of the grid of the seismic grid framework structure according to the embodiment of the present invention.
FIG. 36 is a schematic underside view of the sub-frame of the grid of the seismic grid framework structure according to the embodiment of the present invention.

Such a problem does not exist when the individual grid elements making up the grid are bolted together via cap plates 150 on site. To overcome this problem and to meet building regulations, the grid 250 of the present invention is sub-divided into a plurality of sub-frames 404 as shown in FIGS. 34, whereby one or more of the sub-frames 404 comprises at least one grid cell. Multiple sub-frames are assembled together to build the grid on site. To comply with building regulations, ideally individual sub-frames are bolted together as it is assembled on-site. FIG. 35 show an example of an individual sub-frame 404 forming part of the grid 250 according to an embodiment of the present invention.

Bolting the sub-frames together presents a problem as the joint represents a weak point in the grid that is susceptible to loosening or even breakage. To maintain the structural integrity of the grid, the position of the joint linking individual sub-frames together is carefully selected to prevent disruption of the grid to function as a Vierendeel truss. Locating the joints 402 between adjacent sub-frames 404, i.e. mid-cell between adjacent sub-frames, where the bending moments are at a minimum or weakest would mitigate external forces disturbing the joints linking the individual sub-frames together. Referring back to the distribution of the bending moments along the grid members shown in FIG. 33, bending moments are concentrated at the intersection 400 where the grid members cross at the upright columns and decreases to a minimum midway between the intersections 402. i.e. mid-cell. Locating the joints 402 halfway between the intersections 400 where the grid members (grid elements) cross mitigates excessive lateral forces affecting the linkage or joint between adjacent sub-frames. According to the present invention shown in in FIGS. 34 and 35, linkages 402 are formed halfway along the length of the grid elements 460 between adjacent sub-frames 404 whereby each adjacent sub-frame comprise at least one grid cell, i.e. joined mid-cell between adjacent sub-frames 404.

Extending or overhanging from the at least one grid cell are portions of the grid elements that are configured to join with portions of the grid elements of an adjacent sub-frame to complete a grid cell.

The linkages joining adjacent sub-frames together comprise a connection plate 406 that mate with a corresponding connection plate 406 of an adjacent sub-frame 404 to complete a grid cell 54. In the particular embodiment shown in FIG. 35, the connection plate 406 has a surface with the greatest surface area lying perpendicular to the horizontal plane in which the grid lies and comprises one or more holes to receive bolts. When adjacent sub-frames are brought together their corresponding connection plates 406 mate to complete a grid cell 54. Multiple sub-frames 404 are joined together to form the grid 250 according to the present invention.

Figures 37, 38:
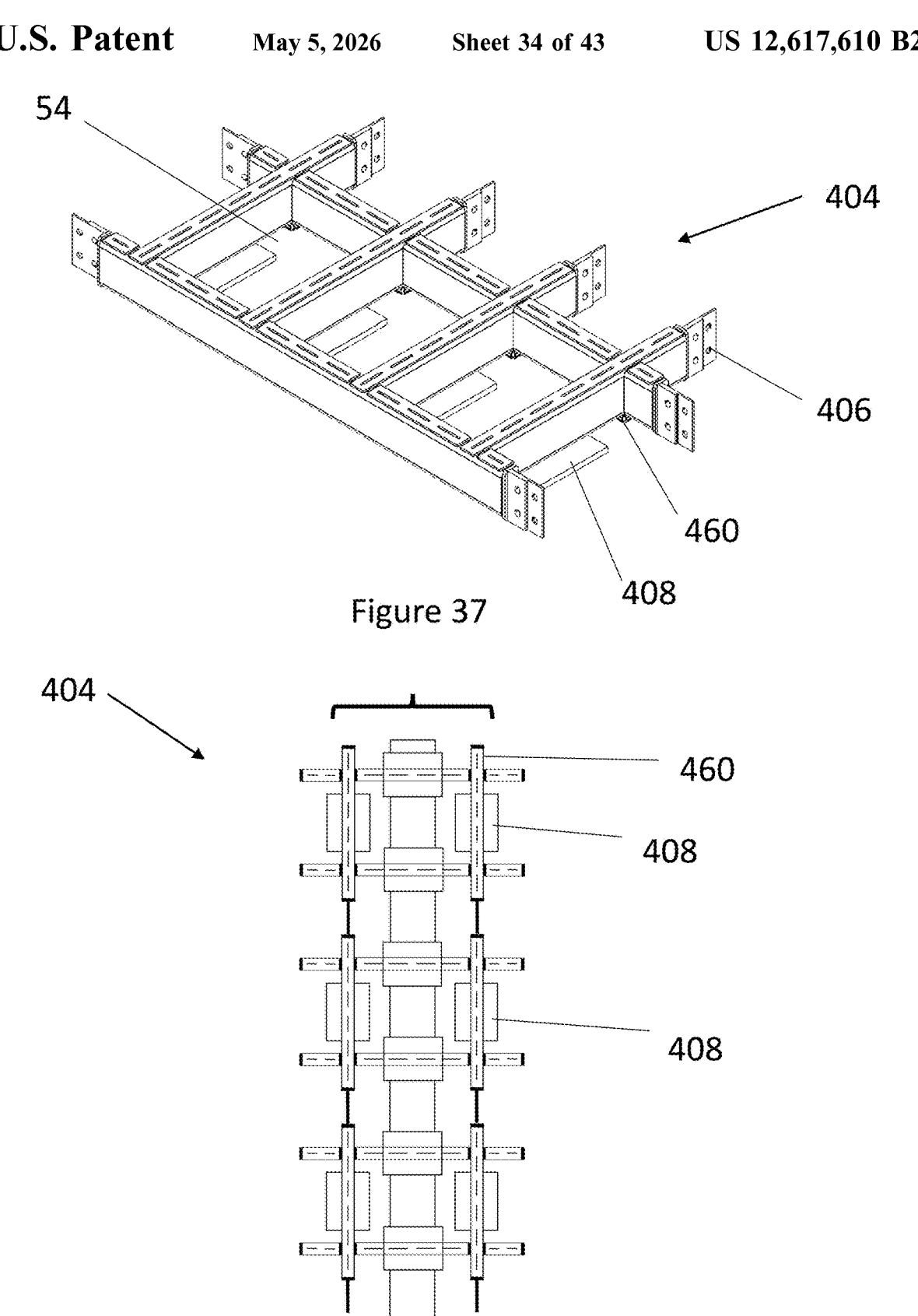
FIG. 37 is a schematic view of a sub-frame at the edge of the grid showing connection plates for connecting to the SFRS according to the embodiment of the present invention.
FIG. 38 is a top plan view of a sub-frame being supported by the SFRS according to the embodiment of the present invention.

In order to transfer the shear forces generated axially from the grid to the SFRS, the border or outer zone 252 of the grid 250 are rigidly connected to the horizontal frame beam 220, 320 of the SFRS which act as a bracing member between the vertical frame columns 218a, 218b. The horizontal frame beam 220, 320 can represent the chords of the Vierendeel truss assembly as shown in FIG. 34. To allow the border or outer zone 252 of the grid 250 to be connected to the horizontal frame beam 220, 320 of the SFRS, the sub-frames 404 at the borders or outer zone of the grid discussed above comprises connection plates or support plates 408 at the bottom of the sub-frames for connecting to the horizontal beam (see FIG. 37). The connection or support plates 408 can be welded to the bottom of the sub-frames 404 which are then subsequently bolted to the horizontal frame beam 220, 320 at the edges or periphery of the grid as shown in FIG. 38. The connection plates or support plates 408 are positioned mid-cell of one or more sub-frames 404 and constitutes the border or outer zone of the grid for supporting the grid to the periphery bracing structure 215, 315 of the present invention as shown in FIG. 38. The connection or support plates 408 are mounted to the grid elements mid-cell of the sub-frame 404. The sub-frames 404 are assembled together on the vertical upright columns 116 such that one or more sub-frames 404 at the edge of the grid is supported mid-cell by the SFRS of the present invention. In FIG. 38, the border or outer zone 252 of the grid has a width of a single grid cell. The connection plate or support plate 408 comprise one or more holes which align with corresponding holes formed in the top beam flange of the horizontal frame beam of the SFRS to receive one or more bolts (see FIG. 29).

As the seismic grid framework structure of the present invention does away with the cap plate 150 to join the grid elements together since the grid elements are welded together at the intersections, to interconnect the vertical upright columns 116 to the grid of the seismic grid framework structure of the present invention, the spigot 410 for connecting to the upright columns 116 are directly mounted to the underside of the sub-frames 404 at the junction where the grid elements cross (see FIG. 36). In the particular embodiment of the present invention, a spigot 410 is welded to the underside of the sub-frame at the junction where the grid elements 460 cross. As shown in FIG. 36, four spigots 410 can be seen mounted directly to the underside of the sub-frame 404 at the intersections where the grid elements cross. The sub-frame 404 is mounted to the vertical upright columns 116 such that the spigots protruding from the underside of the sub-frame 404 are received in the corresponding hollow centre sections 70 of the upright columns 116 (see FIG. 7) in a snap fit arrangement. As a result of assembling adjacent sub-frames of the present invention comprising at least one grid cell together in the seismic grid framework structure, the ability to adopt the lamellar pattern in the grid framework structure discussed above is lost. However, welding at the intersections where the grid elements 460 cross more than compensates for the loss of structural integrity derived from a lamellar pattern arrangement of the grid elements discussed above.

Figure 39:
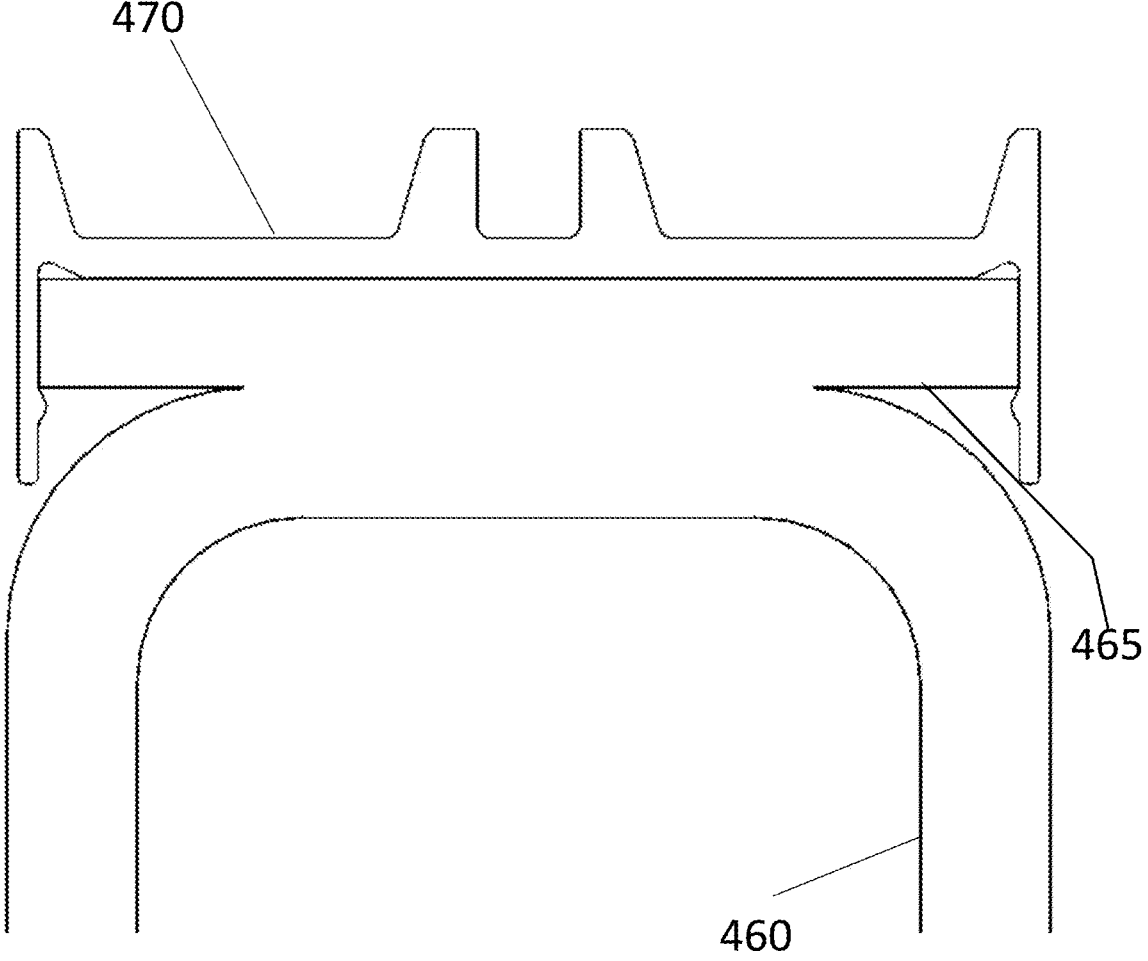
FIG. 39 is a cross-sectional view showing the engagement of the track to the track support of the grid element of the seismic grid framework structure according to an embodiment of the present invention.

As the grid elements 460 of the seismic grid framework structure are tubular or hollow, the surface of the grid elements are not ideally shaped to mount a track directly onto the grid elements, i.e. little engagement portions. To provide a track or rail for the load handling device to travel on the grid, a separate track support element 465 is mounted directly to the grid elements 465 (see FIG. 35). The track support element 465 allows a track or rail 470 to be fitted to the grid elements 460. Multiple track support elements 465 are distributed on the grid elements 460 of the sub-frames 404 having a profile that is shaped to receive a track. Thus, in comparison to the grid elements of the grid framework structure discussed above where the track support elements is integrated into the grid elements of the grid (back to back C sections having a profile to receive a track by a snap fit arrangement), the track support elements 465 of the seismic grid framework structure is separate to the grid elements 460. FIG. 35 shows a top view of the sub-frame 404 according to an embodiment of the present invention showing the track support elements 465 mounted directly to the tubular grid elements 460 and FIG. 39 shows a cross sectional view of the sub-frame showing the engagement of the track 470 to the grid element 460 by the track support element 465 according to an embodiment of the present invention. Like the track mounted to the grid element of the grid framework structure discussed above, the track 470 is fitted to the grid elements 460 in the seismic grid framework structure via the track support element 465 by a snap-fit and/or slid fit arrangement.

In the particular embodiment of the present invention, the track support elements 465 are welded to the grid elements 460. The seismic grid framework structure of the present invention is not restricted to the track support element being a separate component that is welded to the grid elements of the grid. The track support elements can be integrated into the body of the tubular grid elements 460. For example, the track support elements can be extruded together with the grid elements as a single body.

As the track 470 of the seismic grid framework structure is mounted to the grid elements 460 after the sub-frames 404 are assembled together to form the grid 250, the track 470 can adopt a similar lamellar pattern discussed above, where sets of tracks elements are arranged on the grid to have a woven-like or brick like appearance, i.e. the track elements are arranged in a staggered arrangement in the first axial direction and in the second axial direction (the first direction being perpendicular to the second direction) such that adjacent tracks elements in each of the first and the second direction are offset by at least one grid cell. Using the language discussed above with respect to the grid framework structure, a set of parallel tracks extend in the first direction and a set of parallel tracks extend in the second direction, the second direction being perpendicular to the first direction. A sets of tracks in the first direction is sub-divided into a first sub-set of tracks and a second sub-set of tracks, each of the first and second sub-set comprising at least one track. The second sub-set of tracks is spaced apart from the first sub-set of tracks in the second direction. Each of the first and second sub-set of tracks is divided into a plurality of track elements. The track elements are staggered in the first direction such that adjacent parallel track elements of the first and second sub-set of tracks are offset by at least one grid cell.

A similar analogy applies to the set of tracks in the second direction whereby tracks in the second direction are sub-divided into a first sub-set of tracks and a second sub-set of tracks, whereby each of the first and second sub-set of tracks comprise at least one track. Each of the first and the second sub-set of tracks in the second direction is sub-divided into a plurality of track elements. The second sub-set of tracks is spaced apart from the first sub-set of tracks in the first direction. The track elements are staggered in the second direction such that adjacent parallel track elements of the first and second sub-set of tracks are offset by at least one grid cell.

Since lateral forces developed during strong seismic events are largely absorbed by the SFRS of the present invention, in a first embodiment of seismic grid framework structure, the incorporation of the one or more braced towers discussed above within the grid framework structure of the present invention may not be necessary and can be removed, i.e. the seismic grid framework structure comprises a plurality of vertical or upright columns 116 spaced apart by one or more spacers discussed above—the grid framework structure is supported by the perimeter bracing structure of the present invention as an exoskeleton. However, the seismic grid framework structure of the present invention is not limited to removing the one or more braced towers within the grid framework structure and in a second embodiment of the present invention, the SFRS can support a grid framework structure comprising one or more braced towers of the present invention incorporated within the grid framework structure as discussed above, i.e. a sub-group of three upright columns lying in the same plane; two upright columns laterally disposed either side of a middle upright member, the two laterally disposed upright members are rigidly connected to the middle upright members by a plurality of diagonal braces.

In another aspect of the present invention, the seismic grid framework structure of the present invention can be modularised such that adjacent modules 514 in an assembly of two or more modules or modular frames share at least a portion of the SRFS 215, 315 of one or more neighbouring modular frames. Each of the modules 514 comprise a seismic grid framework structure 215, 315 discussed above with reference to FIG. 27 or FIG. 28 such that each of the modules 514 comprise a predetermined number of grid cells and the perimeter bracing structure 215, 315 supported by a plurality of vertical frame columns 218*a,b* of the present invention further supporting the grid. An assembly of two or modules can be assembled together to increase the storage capacity of the overall seismic grid framework structure wherein adjacent modules in the assembly share at least a portion of the perimeter bracing structure of the present invention, i.e. a first modular frame shares at least a portion of the perimeter bracing structure of a second modular frame, whereby the first modular frame is adjacent the second modular frame. In other words, adjacent modules share a common bracing member 220, 320, 222, 322 supported by at least two vertical frame columns 218*a*. The bracing member includes but are not limited to the horizontal frame beam 220, 320 and/or the diagonal bracing member 222, 322.

Sharing of the at least a portion of the SFRS by adjacent modules can be envisaged in the top plan view shown in FIG. 40. Four modular grids are shown in FIG. 40 sharing portions of the SFRS of adjacent modular grids. In FIG. 40, a common braced frame 230 of the SFRS shown as a triangular drawing is shared between adjacent modular grids 514 (a to d). Also the drag strut 232 shown as a dashed line in FIG. 40 is shared between adjacent modules 514 (a to d) such that adjacent modules share a common drag strut 232. As adjacent modules share at least a portion of the SFRS between adjacent modules, the grid from adjacent modules are connected to a common horizontal frame beam 220, 320 such that lateral forces generated within the grid of adjacent modules are transferred to the common horizontal frame beam 220, 320. Since the grid is supported at the borders of the grid in a manner that a portion of the grid overhangs from the SFRS, the grids from adjacent modules can be joined together by connecting the overhangs from adjacent modules. Connection of the grids between adjacent modules can adopt the same linkages joining adjacent modules together discussed above in respect to FIG. 35 in which the overhangs at the edge of the grid comprising connection plates or support plates 406 that mate with corresponding connection plates or support plates 406 of a grid of an adjacent module to complete a grid cell.

Also shared between adjacent modules are the vertical frame columns 218*a*, 218*b* supporting the at least one bracing member 220, 320, 222, 322. By sharing portions of the SFRS between adjacent modules, the external bracing structures of adjacent modules 514 work together in tandem as a unitary body to deflect lateral forces. Putting it another way, joining grids 250 from adjacent modules by a common bracing member 220, 320, 222, 322, e.g. horizontal frame beam, the multiple adjacent grids 250 can function together to form at least one Vierendeel truss such that lateral forces are transferred across the multiple grids to the vertical frame columns 218*a*, 218*b* at the periphery of the modules. The perimeter bracing structure 215, 315 shared between adjacent modules 514 also provide internal bracing within the assemblage of the modules 514. The internal bracing includes adjacent modules sharing a common braced frame 230 and/or a common drag strut 232.

Figure 41:
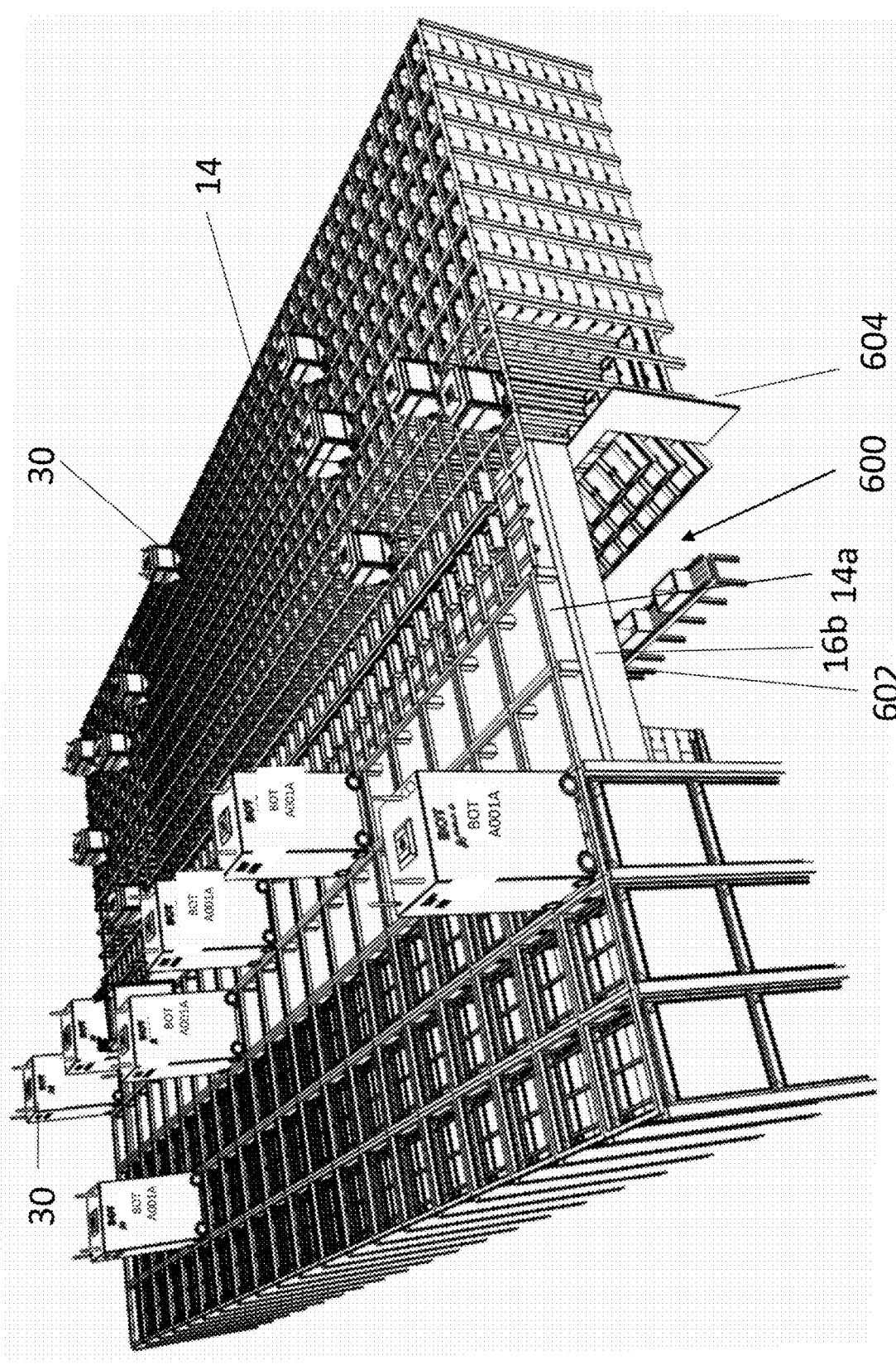
FIG. 41 is a schematic view of a known fulfilment centre showing a mezzanine between adjacent grid framework structures.

In a known fulfilment centre as shown in FIG. 41, items and stock required to fulfil customer orders are located in containers or storage bins 10, the containers or storage bins can be arranged along aisles. On the opposite side of the aisle from the containers or storage bins, a conveyor system is located, the conveyor system carrying customer delivery bins or containers. The conveyor system is arranged so as to pass a proportion of the delivery bins or containers moving on a backline conveyor through pick stations, via station containers, where items ordered by a customer are transferred by an operative from a storage bin or container to a customer delivery bin or container. When a customer delivery container is located at a picking station 600 on the conveyor system, it is paused and an operator selects a required item from a storage bin or container and places it in the customer delivery bin or container. In a known robotic picking station, the storage bin or containers is lifted from a stack containing inventory items needed to fulfil a customer order by a load handling device 30. Once lifted by the load handling device 30, the storage bin or container is delivered by the load handling to an output port above or adjacent a pick station 600. At the pick station, the required inventory item or items may be manually or robotically removed from the storage bin or container and placed in a delivery container, the delivery container forming part of the customer order, and being filled for dispatch at the appropriate time.

A known fulfilment centre also include various other stations including but are not limited to a charge station for charging the recharge battery powering the load handling devices on the grid, a service station to carry out routine maintenance of the load handling device. To accommodate any one of the stations or a combination thereof, a separate area 600 is provided adjacent the grid framework structure 14. Typically, the separate area is provided by incorporating a mezzanine 602 supported by vertical beams 604 in amongst adjacent grid framework structures 14 and is generally a standalone structure. The mezzanine 602 provides a tunnel to accommodate, for example, one or more pick stations and/or any one of the above described stations. FIG. 41 shows an example of a known ordering picking system comprising a grid framework structure either side of a tunnel created by a mezzanine 602 for accommodating a pick station. The grid 14a from adjacent grid framework structures 14 extend across the top of the mezzanine 602 to connect to a grid either side of the mezzanine 602. As is apparent from FIG. 41, the grid structure 14a at the top of the mezzanine 602 is shallower than the grid framework structure either side of the mezzanine 602, i.e. can only accommodate one or two layers of containers in a stack. As shown in FIG. 41, the grid 14a that extends across the mezzanine is supported by vertical columns 16b mounted to the mezzanine and are shorter than the vertical columns either side of the mezzanine. The shorter vertical columns 16b are sized to accommodate only small number of containers in a stack, e.g. one or more containers deep, so as to ensure that the grid lies in a substantial horizontal plane across the mezzanine, i.e. the grid level is maintained across the mezzanine. Also shown in FIG. 41, the mezzanine 602 is supported by separate vertical beams 604. The vertical beams 604 supporting the mezzanine butts up against the grid framework structure 14 either side of the mezzanine 602. Thus, a separate standalone framework is necessary to accommodate a mezzanine in a known fulfilment centre.

Figure 42:
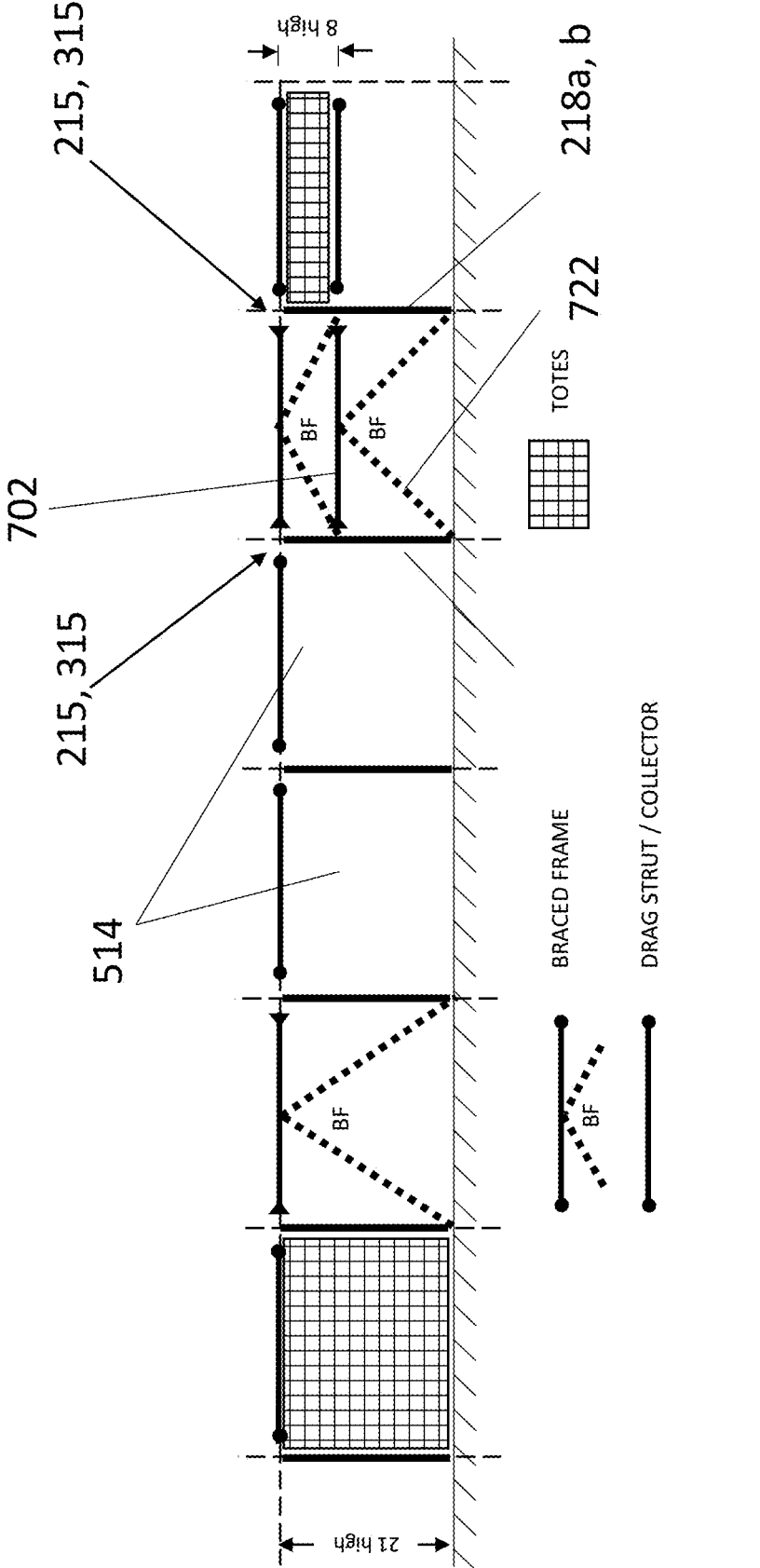
FIG. 42 is a cross-sectional view of modular grid framework structures incorporating an integrated mezzanine according to an embodiment of the present invention.

The seismic grid framework structure of the present invention allows a mezzanine 702 to be integrated into the perimeter bracing structure 215, 315 and the vertical frame columns 218 of the present invention. The ability to modularise the seismic grid framework structure discussed above allows the mezzanine 702 to share at least a portion of the SFRS of adjacent modules, i.e. share a common braced frame 230 and/or drag strut 232 with adjacent or neighbouring modules. A cross sectional view of an assembly of modules 514 incorporating a mezzanine 702 integrated within the assembly is shown in FIG. 42. As can be seen in FIG. 42, the mezzanine 702 shares the perimeter bracing structure 215, 315 and vertical frame columns 218 of adjacent modules 514 such that the mezzanine 702 is supported by vertical frame columns 218a, b supporting adjacent modules 514. Adjacent modules 514 can be a grid framework structure storing one or more containers or storage bins in a stack. In comparison to the known mezzanine discussed with reference to FIG. 41, the mezzanine of the seismic grid framework structure is integrated within the SFRS of the present invention so that separate vertical support columns to support the mezzanine are not necessary.

To create the mezzanine of the present invention, vertical frame columns 218a, b supporting the grid frame structure of adjacent or laterally disposed modules 514 are connected together by one or more bracing members, e.g. horizontal frame beams to create a mezzanine floor and one or more diagonal bracing members 722. The vertical support (frame) columns supporting the mezzanine floor can be braced to provide more support to the mezzanine structure as shown in FIG. 42. The combination of the SFRS incorporating the grid framework structure and the mezzanine provide a single framework surrounding the assembly.

Figure 43:
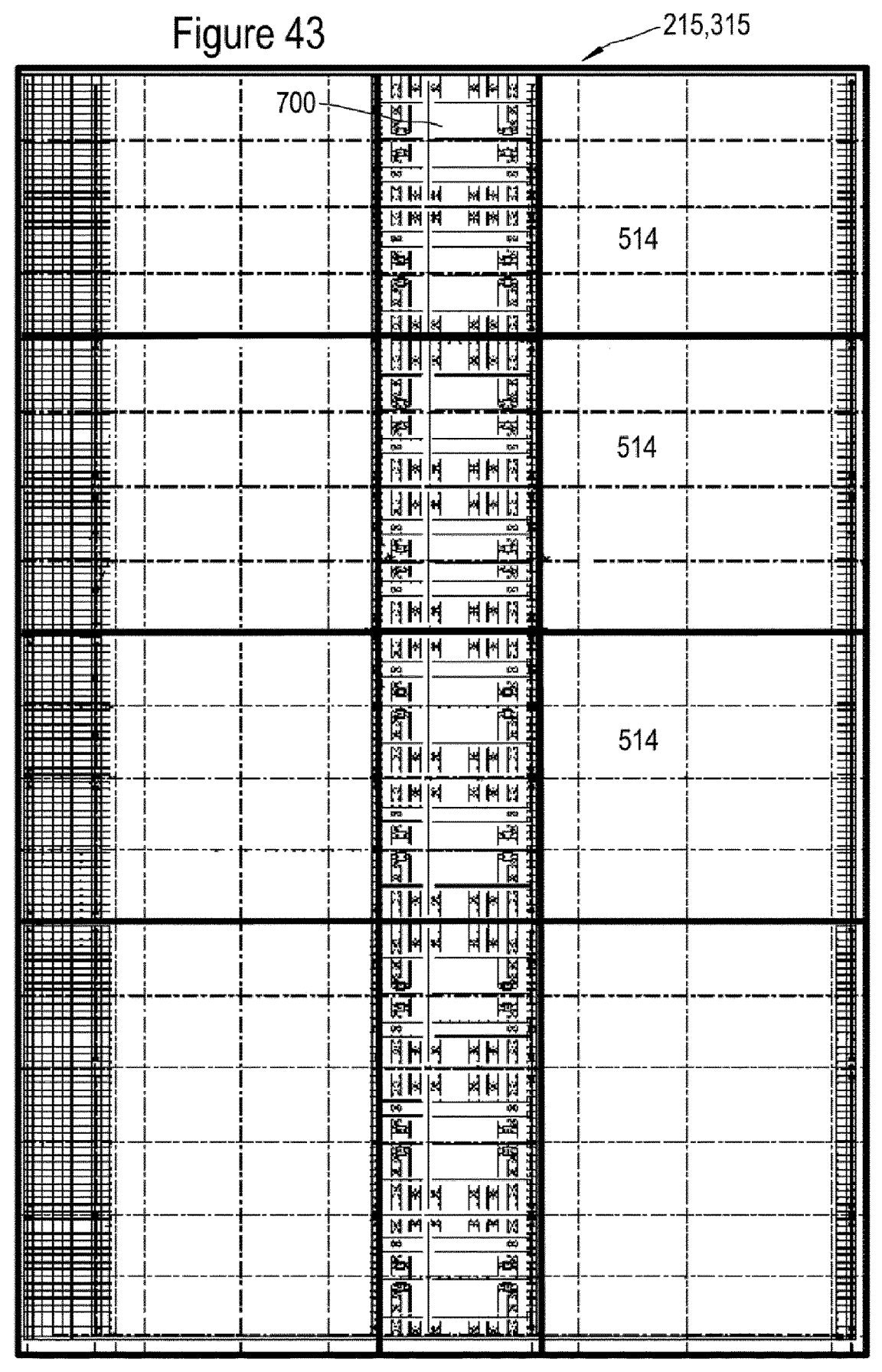

The SFRS of the present invention is versatile in that the perimeter frame structure 215, 315 is flexible to integrate various other structures to the SFRS simply by linking the perimeter frame structures and vertical frame columns of adjacent modules together using one or more bracing members, e.g. horizontal frame beams, thereby integrating additional perimeter frame structures to support a grid and/or an integrated mezzanine. A top plan view of an assembly of modules, each comprising the seismic grid framework structures of the present invention either side of a mezzanine structure 700 to accommodate a station is shown in FIG. 43. As can be seen in FIG. 43, the mezzanine 700 is integrated into the SFRS 215, 315 either side of the mezzanine 700 such that the SFRSs of individual modules or modular frames 514 are shared to provide an integrated SFRS encompassing the modules and the mezzanine.

There are several advantages of integrating the mezzanine structure 700 into the SFRS (FIG. 42), as compared to prior art structures such as the one shown in FIG. 41. An integrated mezzanine and SFRS removes design complexity, and requires fewer parts in the SFRS. The vertical frame columns are shared between the SFRS and the mezzanine, so no separate vertical beams 604 are required to support the mezzanine. No bracing is required for the mezzanine. The less complex design of an integrated SFRS and mezzanine has the further benefit of faster installation time and reduced costs.

Since the space underneath the mezzanine may accommodate pick stations, service stations for maintenance of the load handling devices, or other facilities used by human operatives, it is essential that the mezzanine structure 700 adheres to high standards of safety and complies with all relevant regulations. If the mezzanine 702 is rigidly connected to the SFRS it behaves more like a building structure, in which case there may be further requirements to ensure safety and regulatory compliance, such as cast-in-place floor fixings. An integrated design may therefore not be suitable for use in all territories.

Figure 44:
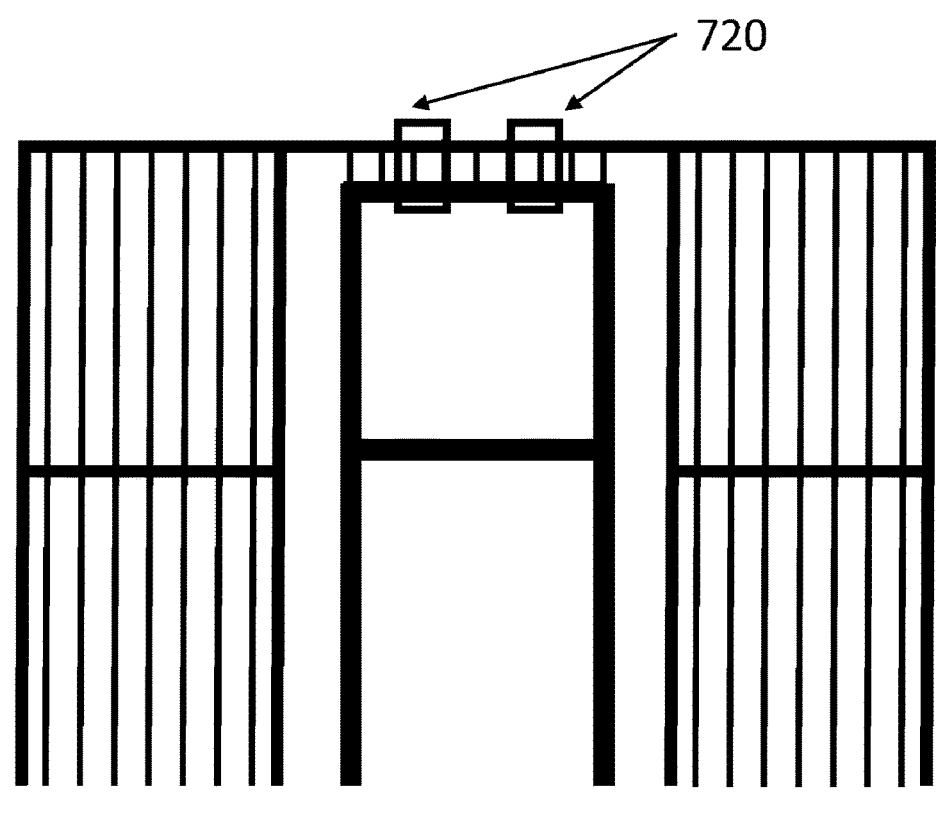
FIG. 44 illustrates a mezzanine connected to the supporting structure by one or more movement joints according to an embodiment of the present invention.

An alternative to an integrated SFRS and mezzanine structure is to isolate the mezzanine 702 from the SFRS, so that the mezzanine and SFRS can move independently during seismic activity rather than being rigidly connected and therefore constrained to move together. This can be achieved by supporting the grid above the mezzanine 702 by a movement joint 720, transferring load from the grid to the SFRS. As a result, the mezzanine is a standalone structure that is independently moveable relative to the SFRS FIG. 44 illustrates the grid framework structure and SFRS. The mezzanine 702 is connected to the supporting structure by one or more movement joints 720.

A movement joint is a joint between two parts of a structure, which allows the parts to move relative to one another while remaining connected. The SFRS is connected to the mezzanine in the sense that the grid that extend across the mezzanine from adjacent grid framework structures is mounted to the mezzanine by one or more of the moveable joints 720. As discussed above with reference to FIG. 41, the grid extending across neighbouring grid framework structures permits one or more load handling devices to move across the mezzanine. The SFRS of the current invention may include one or more movement joints between the SFRS and the mezzanine. The movement joint is positioned between the vertical columns and the horizontal members of the grid structure in the mezzanine.

Figure 45:
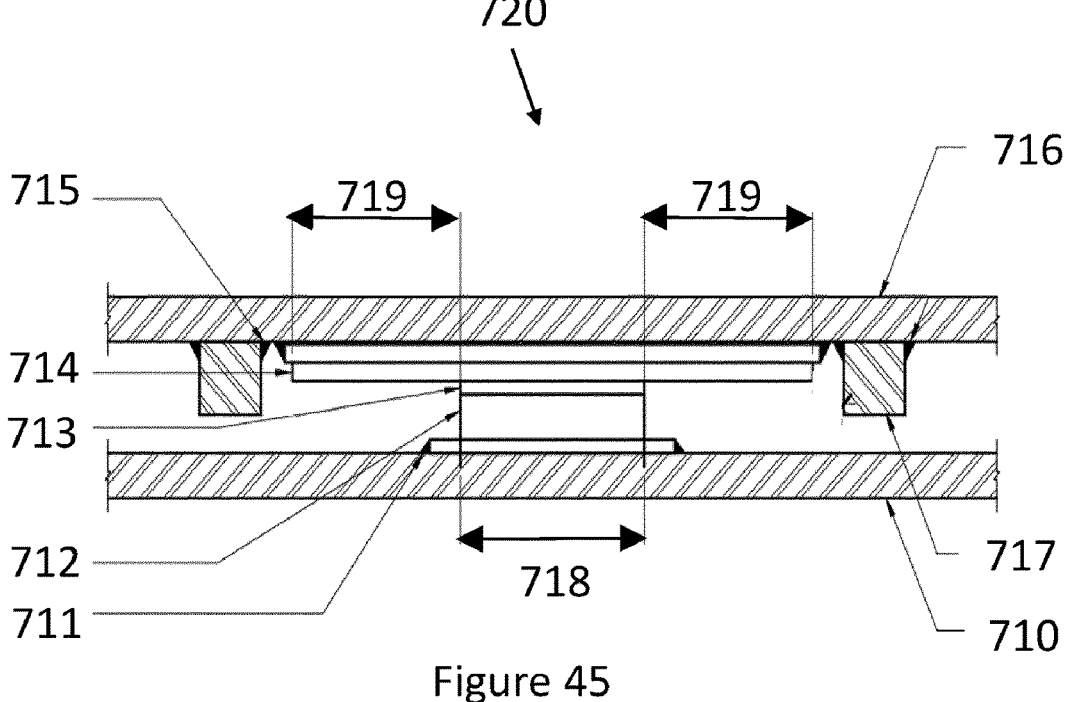
FIG. 45 illustrates one possible embodiment of a movement joint.

A sliding bearing is one kind of movement joint. FIG. 45 illustrates one possible embodiment of a sliding bearing. A lower plate 710 is mounted on top of an upright column 116 (not shown). The lower plate 710 is attached to a lower backing plate 711. A pad 712 is adhered to the lower backing plate, and in turn a lower bearing pad 713 is adhered to the pad 712. The lower bearing pad 713 is configured to be in contact with and slide relative to an upper bearing pad 714. The bearing pads 713, 714 may be made of Teflon, PTFE, or other suitable material. The upper bearing pad 714 is adhered to an upper backing plate 715, which is attached to an upper plate 716. A guardrail 717, during operation, restricts the motion of the lower bearing pad 713 relative to the upper bearing pad 714 such that the bearing pads 713, 714 remain in contact. The lower bearing pad 713 and the upper bearing pad 714 are configured to be in contact along a contact length 718 during operation. A movement length 719 is the range of movement either side of the central position. It will be appreciated that the contact length 718 and the movement length 719 illustrate the range of motion in a first dimension, but the movement joint may also permit relative motion in a second dimension substantially perpendicular to the first.

The lower plate 710 may be mounted on top of an upright column 116. The upper plate 716 may be attached to the underside of the grid extending across the mezzanine.

It will be appreciated that there are alternative methods of attaching the upper plate 716 to the underside of the grid. Two options are described here.

Figure 46:
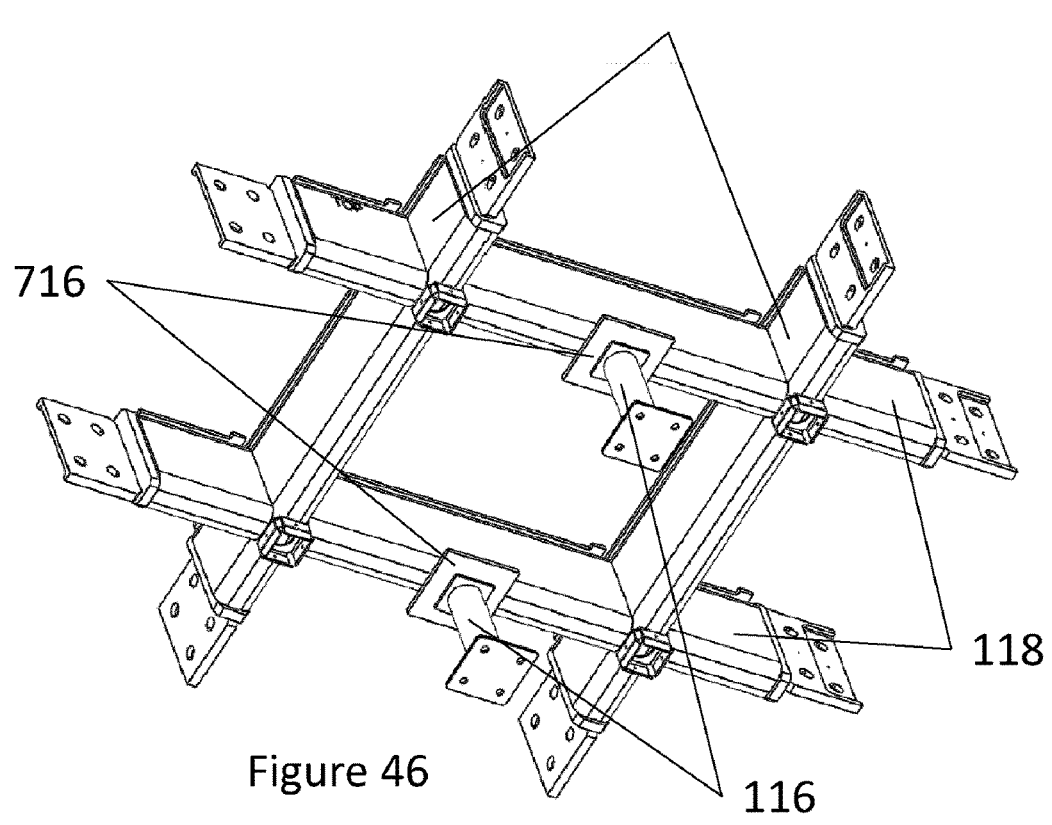
FIG. 46 illustrates a possible configuration of the movement joint connected to the mezzanine.

FIG. 46 illustrates a movement joint 720 where the upper plate 716 of the movement joint is attached directly to the underside of a grid member 118, 120. The lower plate 710 is mounted on top of a vertical column 116. Advantageously, this is a simple configuration with few extra parts. For example, the upper plates 716 can be connected to the underside of the grid members by welding. The grid cells adjacent to the movement joint 720 may not be used for storage.

Figure 47:
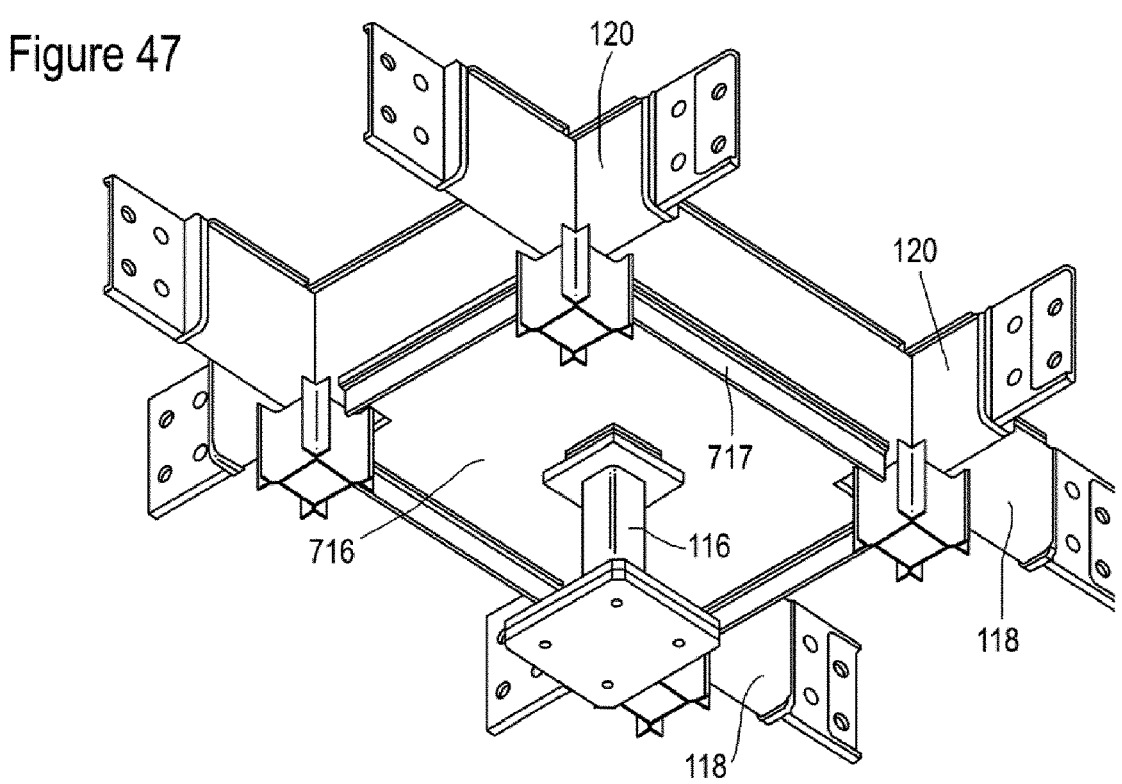
FIG. 47 illustrates a different configuration of the movement joint connected to the mezzanine.

FIG. 47 illustrates a movement joint 720 where the upper plate 716 of the movement joint 720 extends across the breadth and width of a grid cell 54. Advantageously, this configuration allows a greater contact length 718 and a greater movement length 719 than the configuration of FIG. 46, resulting in a greater contact area and greater range of relative motion between the mezzanine and the SFRS. The lower plate 710 is mounted on top of a vertical column 116.

Figure 48:
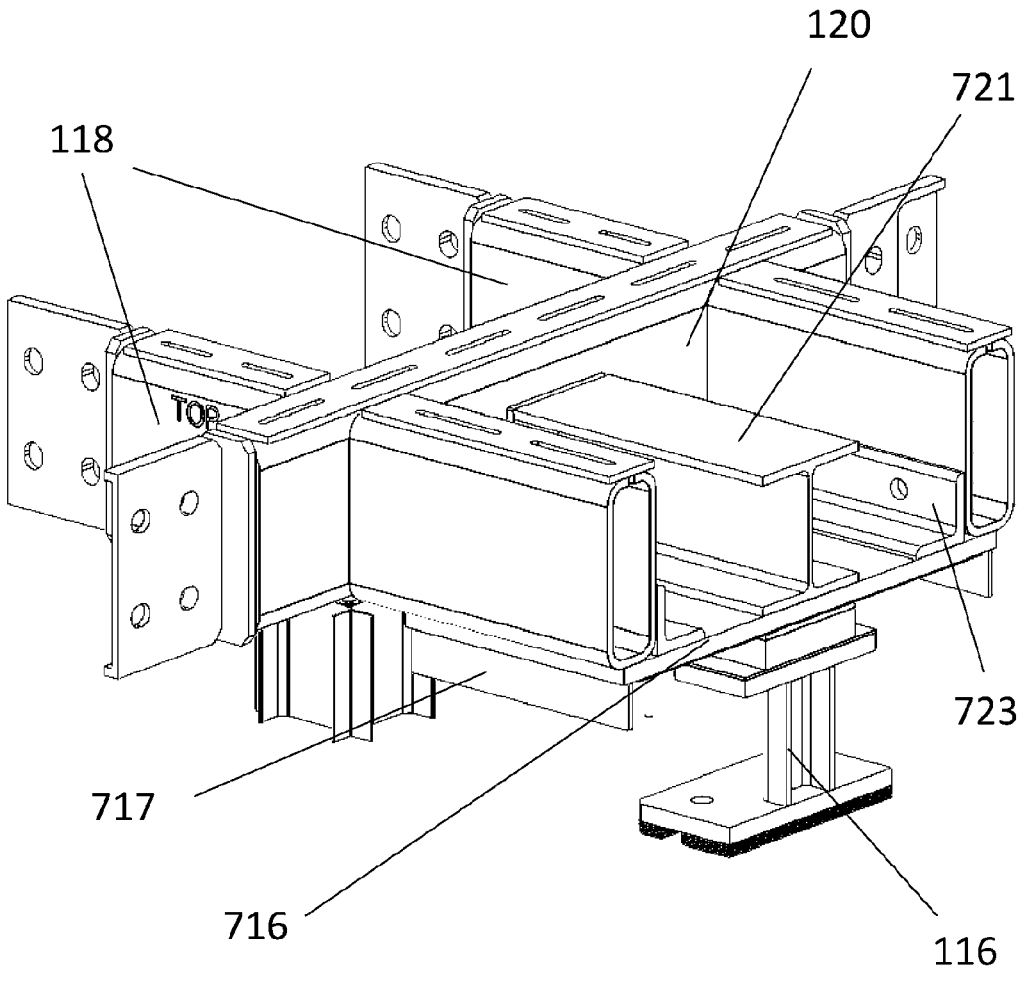
FIG. 48 illustrates a different view of the configuration of FIG. 47.

FIG. 48 illustrates a top view of the movement joint of FIG. 47. The upper plate 716 of the movement joint is reinforced with a beam 721 to reinforce and stiffen the upper plate 716. The beam 721 is illustrated here as an I-beam, but other types of beam can also be used. The upper plate 716 is attached to the horizontal grid members 118, 120 by means of brackets 723, which are bolted to the upper plate 716 and the grid members 118, 120. Although this configuration has the disadvantage that it requires more parts and more assembly operations than the configuration of FIG. 46, a movement joint can be placed in every alternate grid cell, leaving the grid cells in between the movement joints free to be utilised for storage.

The advantage of isolating the grid above the mezzanine from movement as a result of movement from a neighbouring grid framework structure can be applied to the grid framework structure described with reference to FIG. 6 and the SFRS described above to isolate ground movement from the grid mounted thereon. For example, one or more movement joints 720 discussed above can be interposed between the grid members and the vertical columns at the intersections of the grid members. The movement joint can be placed between the cap plate and the top of the vertical columns. Thus, the grid is isolated from movement of the vertical uprights as a result of ground movement by the one or more movement joints. Ground movement can be as a result of a seismic event to simply from a passing vehicle, e.g. train. Equally, one or more movement joints can be interposed between the grid members and the vertical columns in the SFRS arrangement described with reference to FIGS. 27 and 28. In an event of ground movement, the one or more movement joints interposed between the vertical columns and the grid will dampen the ground movement. Moreover, any induced oscillation of the grid will help to counteract and absorb the kinetic energy development during oscillation of the vertical columns and/or containers stored therein as a result of ground movement.

Due to the versatility of the SFRS of the present invention, other structures can be integrated into the SFRS of the present invention. To prevent a load handling device overrunning the grid, crash barriers are mounted around the edge of the grid to absorb the impact when a load handling device hits the crash barrier. Due to the weight of a load handling device which can be in excess of 100 kg, the crash barriers need to be mounted and supported by a separate structure comprising separate vertical support frames adjacent the grid. The structure supporting the crash barrier is not fixedly attached to the grid framework. This is so the crash barrier do not impart damage to the grid framework structure should a load handling device inadvertently crash into the crash barrier. Detail of the crash barrier known in the art is further discussed in WO2017/153563 (Ocado Innovation Limited). In WO2017/153563 (Ocado Innovation Limited), the structure supporting the crash barrier needs to absorb the impact from one or more load handling devices and comprises one or more bracing assemblies.

However, since the SFRS is functioned to restrain the grid framework structure in an event of a powerful seismic event, the SFRS is versatile to accommodate one or more crash barriers, i.e. the crash barrier can be mounted directly to the perimeter bracing structure. The SFRS of the present invention can be sufficiently robust to absorb the impact from one or more load handling device hitting the crash barrier mounted directly to the perimeter bracing structure of the SFRS. Thus, unlike known grid structures where the crash barrier is mounted to a separate framework structure adjacent the grid framework structure carrying the load handling device, the crash barrier can be integrated into the SFRS of the present invention.

Figure 49:
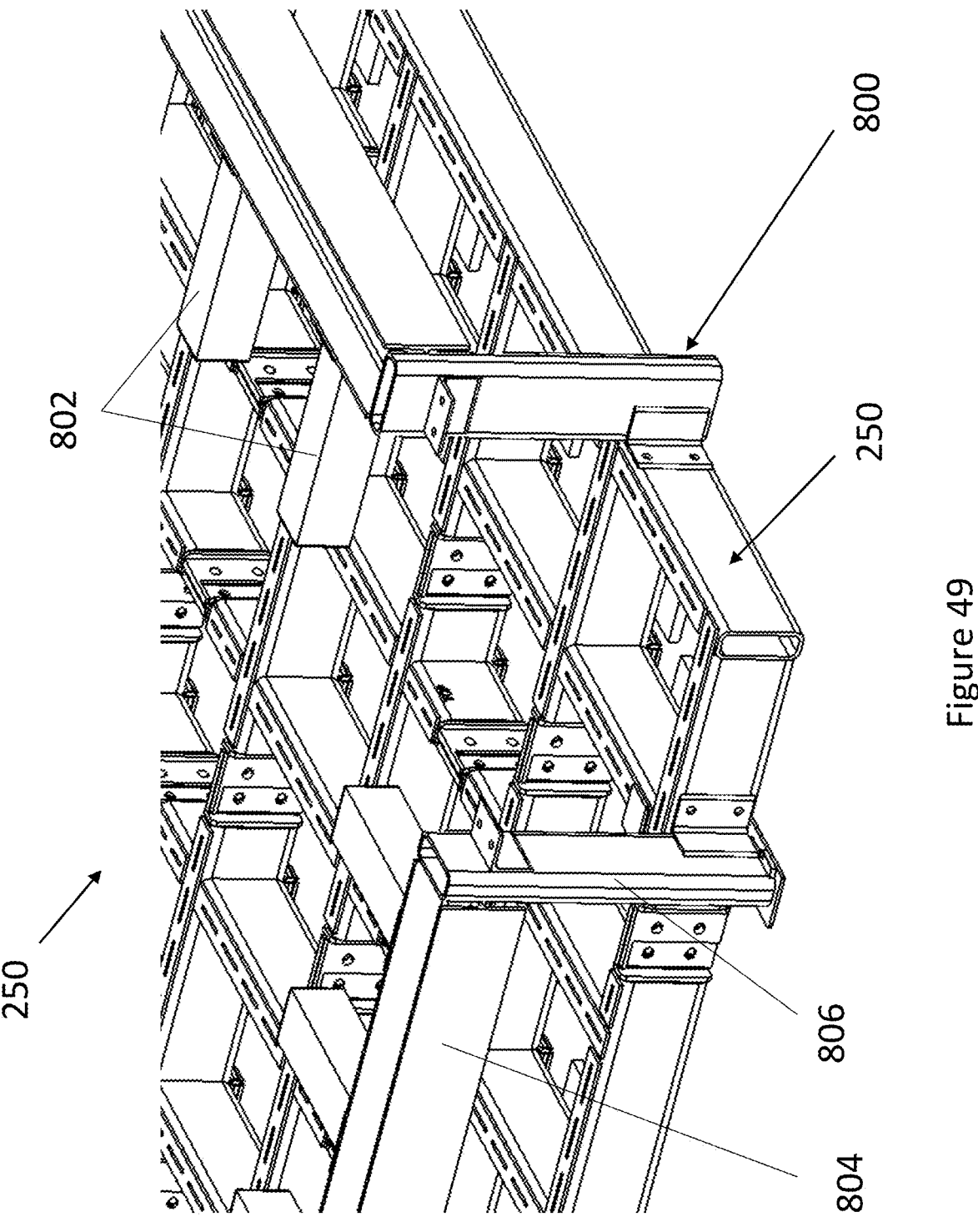
FIG. 49 is a perspective view of a crash barrier at the edge of the grid according to an embodiment of the present invention.

Welding the grid elements 460, which are largely tubular beams, together creates a rigid structure that is able to absorb a certain degree of impact. Due to the structural rigidity and strength of the grid 250 of the seismic grid framework structure of the present invention, which is largely attributable to the perimeter bracing structure supporting the grid and the vertical frame columns, the grid is sufficiently stable to carry or mount a crash barrier without disrupting the structural integrity of the grid structure in the event of a load handling device crashing into the crash barrier. In a particular embodiment of the present invention, a crash barrier is mounted directly to the grid 250, i.e. at the edge of the grid. The crash barrier 800 is located at various positions around the edge of the grid 250 and is configured to absorb shocks when a load handling device inadvertently overruns the grid. In the particular embodiment of the present invention shown in FIG. 49, the crash barrier 800 comprises one or more impact absorbers 802 mounted to a crash beam 804 positioned around the edge of the grid 250. The impact absorber 802 is composed of a material that is configured to dissipate energy when impacted and thereby, help to mitigate excessive damage to the load handling device in an event of a crash. Examples of materials that dissipate energy when impacted include but are not limited to a resilient material, e.g. rubber, or a sacrificial material such as sacrificial honeycomb aluminium. In the particular embodiment of the present invention shown in FIG. 49, the one or more impact absorbers 802 has a honeycomb structure composed of aluminium that is configured to collapse when impacted. The one or more impact absorbers 802 are mounted to a frame which is subsequently mounted to the grid 250. The frame comprises the crash beam 804 mounted to the edge of the grid 250 via one or more posts 806. The one or more impact absorbers 802 are mounted to the crash beam 804 so as to extend inwardly to overhang or span over one or more grid cells. Should a load handling device inadvertently travel towards the edge of the grid, to prevent a load handling device inadvertently overrunning the edge of the grid 250, the load handling device crashes into the crash barrier 800. As the grid 250 in the seismic grid framework structure is largely composed of tubular beams 460 (See FIG. 32) that are rigidly connected together to resist lateral forces in a seismic event, the crash barrier 800 of the present invention can be mounted directly to the grid 250 as shown in FIG. 49.

Various modifications and variations of the illustrative embodiments, as well as other embodiments of the grid framework structure, which are apparent to persons skilled in the art, are deemed to lie within the scope of the present invention as defined by the claims. For example, in the case where the seismic grid framework structure is modularised to comprise an assembly of two or more modules or modular frames, each of the modules or modular frames comprising a predetermined number of grid cells and the perimeter bracing structure 215, 315 of the present invention supporting the grid as discussed above, the two or more of the modules or modular frames can share a common crash barrier having features discussed with reference to FIG. 49. In this case, the crash barrier 800 is mounted to the edge of an assembly of the two or more modules or modular frames, i.e. at least partially surrounds an assembly of two or more modules or modular frames.

The invention claimed is:

1. A grid framework structure for supporting a load handling device operative to move one or more containers, the grid framework structure comprising:
   a plurality of upright columns arranged to form a plurality of vertical storage locations for one or more containers to be stacked between the upright columns and be guided by the upright columns in a vertical direction;
   wherein the plurality of upright columns are interconnected at their top ends by a first set of grid members extending in a first direction and a second set of grid members extending in a second direction, the second set of grid members running transversely to the first set of grid members in a substantially horizontal plane to form a grid structure having a plurality of grid cells; and wherein:
   the first and the second set of grid members are subdivided into a plurality of grid elements such that adjacent grid elements extending in the first direction or the second direction are offset with respect to each other in the horizontal plane by at least one grid cell; and
   wherein the first set of grid members is sub-divided into a first subset of grid members and a second subset of grid members extending in the first direction, the second subset of grid members being spaced apart in the second direction from the first subset of grid members, the first subset of grid members being sub-divided into a first set of grid elements of the plurality of grid elements, and the second subset of grid members being sub-divided into a second set of grid elements of the plurality of grid elements, wherein the first set of grid elements is offset from the second set of grid elements in the first direction by at least one grid cell.

2. The grid framework structure of claim 1, wherein each of the plurality of grid elements is arranged to extend or span across a top end of a single upright column.

3. The grid framework structure of claim 1, wherein the plurality of upright columns are interconnected at their top ends to support an end of a first grid element of the plurality of grid elements extending in the first direction and a center of a second grid element of the plurality of grid elements extending in the second direction.

4. The grid framework structure of claim 1, wherein each of the plurality of grid elements of the first and the second set of grid members comprise:
   interlocking features that are arranged to interlock with each other at the top ends of the plurality of upright columns.

5. The grid framework structure of claim 4, wherein each of the plurality of grid elements of the first set of grid members extending in the first direction interlock with corresponding grid elements of the second set of grid members extending in the second direction by a hook receivable in a corresponding opening.

6. The grid framework structure of claim 5, wherein each of the plurality of grid elements of the first set of grid members and the second set of grid members comprise:

at least one hook at their distal or opposing ends, and an opening substantially mid-way along a length of the grid element.

7. The grid framework structure of claim 1, wherein a length of each of the plurality of grid elements of the first set of grid members extending in the first direction is substantially a same length, and a length of each of the plurality of grid elements of the second set of grid members extending in the second direction are substantially a same length, and wherein the length of each of the plurality of grid elements of the first set of grid members is different to the length of each of the plurality of grid elements of the second set of grid members.

8. The grid framework structure of claim 1, comprising:
a cap plate secured to the top end of each of the plurality of upright columns, said cap plate being shaped as a cross having four perpendicular ends, each of the four perpendicular ends being configured for connecting with at least one of the plurality of grid elements, the cap plate being arranged to connect to at least one grid element extending in the first direction and in the second direction.

9. The grid framework structure of claim 8, wherein each of the plurality of upright columns has a cross-section comprising:
a hollow center section and four corner sections, and the cap plate comprises:
a spigot arranged to be snap fitted into the hollow center section.

10. The grid framework structure of claim 1, wherein the first and second set of grid members is an assembly of back-to-back C-beams.

11. The grid framework structure of claim 10, wherein each of the grid elements of the first and second sets of grid members comprises:
a first C-beam element, and a second C-beam element, each of the first and the second C-beam elements having at least one interlocking feature at one its distal end, the first and second C-beams being arranged back to back to form the grid element such that the at least one interlocking feature is at the distal ends of each of the grid elements.

12. The grid framework structure of claim 1, wherein the first and the second sets of grid members support a first and a second set of tracks, respectively.

13. The grid framework structure of claim 12, wherein each of the first and the second set of tracks are respectively mounted to the first and the second set of grid members in a snap-fit configuration.

14. The grid framework structure of claim 13, wherein the first and the second of tracks are sub-divided into a plurality of track elements such that each of the plurality of track elements is arranged to extend or span across the top end of a single upright column.

15. The grid framework structure of claim 14, wherein adjacent track elements, extending in the first direction or the second direction, are offset with respect to each other in the horizontal plane by at least one grid cell.

16. The grid framework structure of claim 15, wherein the first set of tracks is sub-divided into a first subset of tracks and a second subset of tracks extending in the first direction, the second subset of tracks spaced apart in the second direction from the first subset of tracks, the first subset of tracks being sub-divided into a first set of track elements, and the second subset of tracks being sub-divided into a second set of track elements, wherein the first set of track elements is offset from the second set of track elements in the first direction by at least one grid cell.

17. The grid framework structure of claim 15, wherein each of the plurality of track elements of the first and the second sets of tracks comprise:
interconnecting features such that each of the plurality of track elements of the first set of tracks is arranged to interconnect with corresponding track elements of the second set of tracks at the top ends of the plurality of upright columns.

18. The grid framework structure of claim 17, wherein each of the track elements of the first and the second sets of tracks comprise:
a cut-out that is arranged to cooperate with ends of corresponding track elements of the first and second set of tracks at the top ends of the plurality of upright columns.

19. A storage system comprising:
i) a grid framework structure as recited in claim 1;
ii) a plurality of stacks of containers arranged in storage columns located below the grid, wherein each storage column is located vertically below a grid cell;
iii) a plurality of load handling devices for lifting and moving containers stacked in the stacks, the plurality of load handling devices being configured to be remotely operated to move laterally on the grid above the storage columns to access the containers through substantially rectangular frames of the grid framework structure, each of said plurality load handling devices comprising:
a) a wheel assembly for guiding the load handling device on the grid;
b) a container-receiving space arranged to be located above the grid; and
c) a lifting device arranged to lift a single container from a stack into the container-receiving space.

20. The storage system of claim 19, comprising:
panelling to restrict access to the grid framework structure.

21. The storage system of claim 19, wherein the grid framework structure comprises:
a first grid framework structure and a second grid framework structure, where the first grid framework structure is at an ambient controlled temperature and the second grid framework structure is at a chilled temperature which is colder than the ambient controlled temperature.

22. A fulfilment system comprising:
the storage system of claim 21, wherein each of the first grid framework structure and the second grid framework structure comprises:
a pick station having a container transport assembly for transporting one or more containers to an access station where contents of the containers can be accessed.

* * * * *